(12) United States Patent
Cazenave et al.

(10) Patent No.: US 12,653,102 B2
(45) Date of Patent: Jun. 16, 2026

(54) LOUVER LOADING DETECTION FOR MEASURING CROP TRAJECTORY

(71) Applicant: DEERE & COMPANY, Moline, IL (US)

(72) Inventors: Blain J. Cazenave, Vacherie, LA (US); John A. Dighton, Napoleonville, LA (US)

(73) Assignee: Deere & Company, Moline, IL (US)

( * ) Notice: Subject to any disclaimer, the term of this patent is extended or adjusted under 35 U.S.C. 154(b) by 420 days.

(21) Appl. No.: 18/210,439

(22) Filed: Jun. 15, 2023

(65) Prior Publication Data

US 2024/0415058 A1     Dec. 19, 2024

(51) Int. Cl.
*A01D 45/10*        (2006.01)
*A01D 41/127*       (2006.01)

(52) U.S. Cl.
CPC ........... *A01D 45/10* (2013.01); *A01D 41/127* (2013.01)

(58) Field of Classification Search
CPC .............. A01D 43/063; A01D 43/0631; A01D 2033/005; A01D 34/006; A01D 41/127; A01D 41/1217; A01D 41/1271; A01D 41/1272; A01D 45/10
See application file for complete search history.

(56) References Cited

U.S. PATENT DOCUMENTS

| | | |
|---|---|---|
| 3,325,982 A | 6/1967 | Fogels et al. |
| 4,426,826 A | 1/1984 | Wesselmann |

| | | | |
|---|---|---|---|
| 5,092,110 A | * | 3/1992 | Dommert ............... A01D 45/10 |
| | | | 56/16.5 |
| 5,953,891 A | | 9/1999 | Leigers et al. |
| 6,272,819 B1 | * | 8/2001 | Wendte .............. A01D 41/1274 |
| | | | 56/11.9 |
| 9,456,547 B2 | | 10/2016 | Cazenave et al. |
| 10,492,370 B2 | | 12/2019 | Sechinato |
| 12,102,033 B2 | * | 10/2024 | Dugas .................. A01D 34/006 |
| 2015/0327438 A1 | * | 11/2015 | Cazenave .............. A01D 45/10 |
| | | | 56/51 |

(Continued)

OTHER PUBLICATIONS

Austoft Cane Harvesters, Austoft 9000 Series, Case IH brochure, https://www.caseih.com/en-us/unitedstates/products/harvesting/austoft-cane-harvesters, 6 pages, publicly available as early as May 24, 2022.

*Primary Examiner* — Adam J Behrens
(74) *Attorney, Agent, or Firm* — Taft Stettinius & Hollister LLP; Stephen F. Rost

(57)        ABSTRACT

A cleaning arrangement for separating a billet material from an extraneous plant matter in a sugarcane harvester includes a cleaning chamber defining an inlet for the billet material and the extraneous plant matter, a first outlet for the extraneous plant matter, and a second outlet for the billet material. A fan is positioned within the cleaning chamber and configured to generate an airflow to direct the extraneous plant matter toward the first outlet. A billet deflector is located between the inlet and the first outlet and configured to direct the billet material toward the second outlet. An actuation mechanism is coupled to the billet deflector and is controllable to adjust the position of the billet deflector. A sensor is configured to generate a signal. A controller is programmed to activate the actuation mechanism to adjust the position of the billet deflector based on the signal.

19 Claims, 35 Drawing Sheets

(56) References Cited

U.S. PATENT DOCUMENTS

| | | | | |
|---|---|---|---|---|
| 2016/0084813 A1* | 3/2016 | Anderson | G01N 33/025 | |
| | | | 702/5 | |
| 2017/0202143 A1* | 7/2017 | Garton | G05B 15/02 | |
| 2019/0037770 A1* | 2/2019 | Dugas | A01D 45/10 | |
| 2019/0082600 A1 | 3/2019 | Nicora et al. | | |
| 2019/0373814 A1 | 12/2019 | Murray et al. | | |
| 2020/0120870 A1* | 4/2020 | Hammer | G01L 9/0005 | |
| 2020/0337232 A1* | 10/2020 | Blank | A01M 7/0089 | |
| 2020/0337235 A1* | 10/2020 | Blank | A01M 21/043 | |
| 2022/0151139 A1* | 5/2022 | Dugas | G06T 7/0004 | |
| 2022/0174878 A1 | 6/2022 | Cazenave | | |
| 2023/0135915 A1* | 5/2023 | Cleodolphi | A01D 45/10 | |
| | | | 56/10.2 A | |
| 2023/0148473 A1* | 5/2023 | Cazenave | A01D 45/10 | |
| | | | 460/1 | |

* cited by examiner

Figure 9:
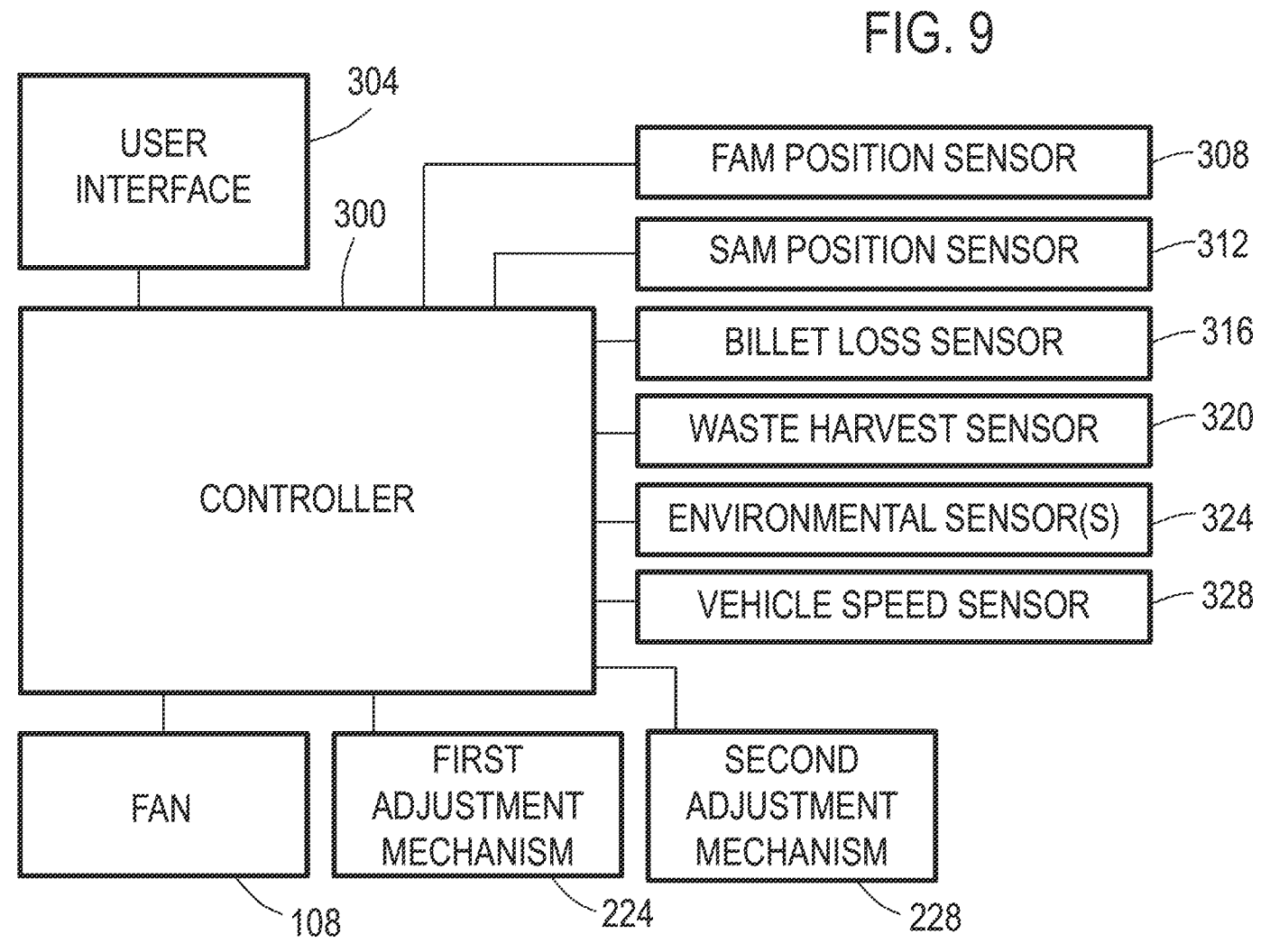

FAM POSITION SENSOR — 308

SAM POSITION SENSOR — 312

BILLET LOSS SENSOR — 316

WASTE HARVEST SENSOR — 320

ENVIRONMENTAL SENSOR(S) — 324

VEHICLE SPEED SENSOR — 328

USER INTERFACE — 304

CONTROLLER — 300

SECOND ADJUSTMENT MECHANISM — 228

FIRST ADJUSTMENT MECHANISM — 224

FAN — 108

Zone Impact Averages

Threshold

FIG. 12A

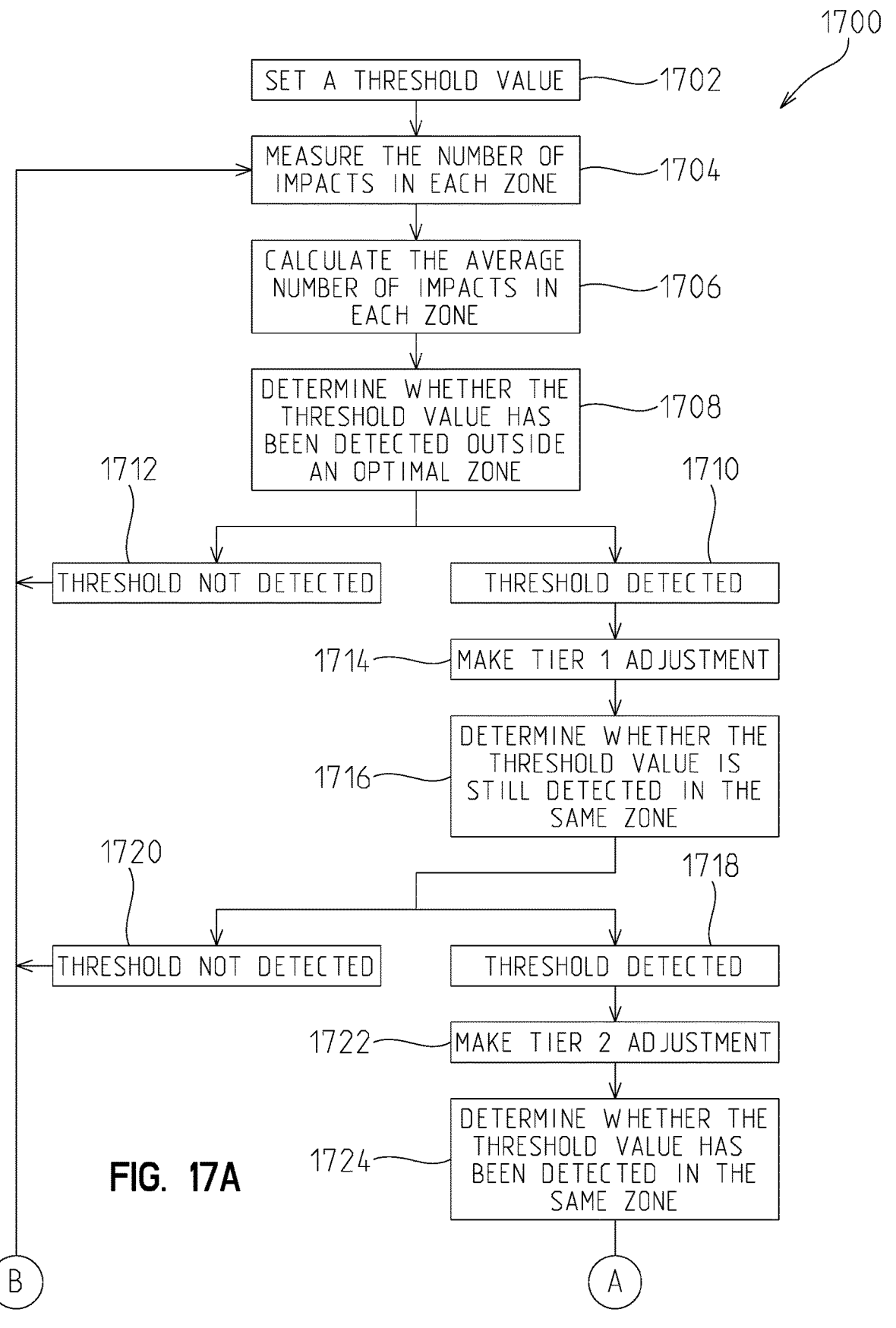

1700

SET A THRESHOLD VALUE —1702

MEASURE THE NUMBER OF IMPACTS IN EACH ZONE —1704

CALCULATE THE AVERAGE NUMBER OF IMPACTS IN EACH ZONE —1706

DETERMINE WHETHER THE THRESHOLD VALUE HAS BEEN DETECTED OUTSIDE AN OPTIMAL ZONE —1708

1712

1710

THRESHOLD NOT DETECTED

THRESHOLD DETECTED

1714— MAKE TIER 1 ADJUSTMENT

1716— DETERMINE WHETHER THE THRESHOLD VALUE IS STILL DETECTED IN THE SAME ZONE

1720

1718

THRESHOLD NOT DETECTED

THRESHOLD DETECTED

1722— MAKE TIER 2 ADJUSTMENT

1724— DETERMINE WHETHER THE THRESHOLD VALUE HAS BEEN DETECTED IN THE SAME ZONE

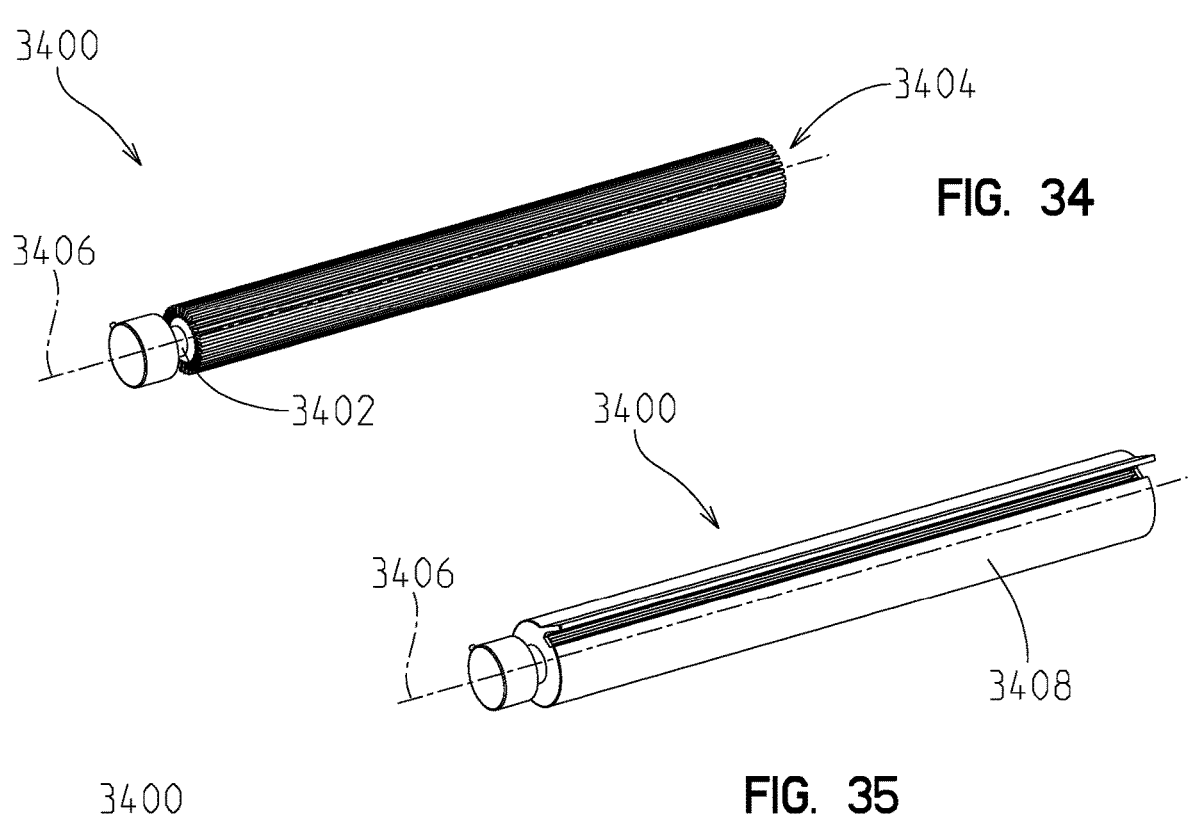
FIG. 34
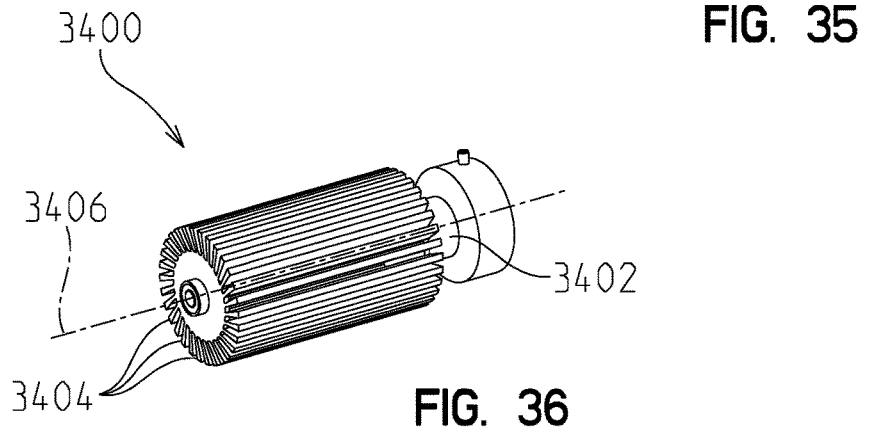
FIG. 35
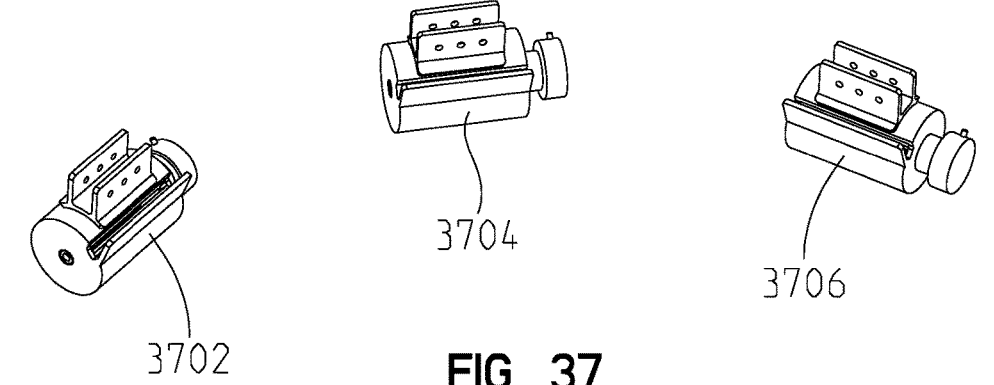
FIG. 36
FIG. 37

LOUVER LOADING DETECTION FOR MEASURING CROP TRAJECTORY

FIELD OF THE DISCLOSURE

The present disclosure relates to a sugarcane harvester and more particularly to a cleaning arrangement of a sugar cane harvester that assists in separating sugarcane billets from leaves, dirt, and other trash.

BACKGROUND

A sugarcane harvester severs sugarcane plants from the ground with a base cutter assembly and transports the severed plants to a set of chopping drums that chop the severed plant into smaller billets. The billets are sent through a cleaning arrangement to separate the billets from non-billet material such as leaves, dirt, and other trash. Passing through the cleaning system, the billets are then discharged, for example, to be transported or stowed in a trailing vehicle.

SUMMARY

In one implementation of the present disclosure, a sugarcane harvester includes a chopper to chop stalks of sugarcane into billets and discharge the billets into a cleaning chamber, an extractor to induce a flow of air in the cleaning chamber to extract crop residue from billets discharged from the chopper, a louver positioned on an opposite side of the cleaning chamber from the chopper to deflect billets, one or more impact sensors mounted to the louver to detect billet impact on the louver and configured to generate one or more billet impact signals, and a controller in communication with the one or more impact sensors. The controller is configured to receive the one or more billet impact signals, assess loading of the billet deflector relative to predetermined criteria, and execute a corresponding response strategy.

In one example of this implementation, the one or more billet impact signals corresponds to a location on the louver. In a second example, the louver comprises an impact surface to which the one or more impact sensors are mounted, the impact surface defining a plurality of zones. In a third example, a number of the one or more impact sensors in each of the plurality of zones is different. In a fourth example, a number of the one or more impact sensors in each of the plurality of zones is the same.

In a fifth example, the one or more billet impact signals identifies a zone on the impact surface. In a sixth example, the one or more billet impact signals corresponds to a number of impacts in each zone on the impact surface. In a seventh example, the controller is configured to assess the number of impacts in each of the plurality of zones over a given period of time. In an eighth example, the controller is configured to compare the number of impacts in each of the plurality of zones over a given period of time to a threshold.

In a ninth example, the controller is configured to determine if the number of impacts exceeds the threshold in an optimal zone or a non-optimal zone, where the optimal zone is one of the plurality of zones and the non-optimal zone is another of the plurality of zones. In a tenth example, the controller is configured to make no adjustment to the harvester as the response strategy when the number of impacts exceeds the threshold in the optimal zone.

In an eleventh example, the controller is configured to make an adjustment to the harvester as the response strategy when the number of impacts exceeds the threshold in the non-optimal zone. In a further example, the adjustment to the harvester includes one or more of adjusting an angle or length of a deflector, fan speed, chopper speed, harvester speed, a manifold pressure, nozzle orientation, or nozzle operation.

In another implementation of the present disclosure, a sugarcane harvester includes a chopper configured to chop stalks of sugarcane into crop billets for discharge into a cleaning chamber; a housing forming the cleaning chamber, the housing comprising an inlet; a fan configured to produce a primary flow of air to flow through the inlet and into the housing to separate crop residue from the crop billets discharged from the chopper; a louver positioned on an opposite side of the cleaning chamber from the chopper to direct the crop billets into a basket for collection; a billet deflector disposed in the housing and configured to deflect crop billets from the chopper towards the louver; a plurality of sensors coupled to an impact surface of the louver and configured to detect impact between the impact surface and the crop billets, the sensor configured to generate a bill impact signal; and a controller in communication with the plurality of sensors. The controller is configured to receive the bill impact signal from the one or more sensors, assess loading of the louver relative to predetermined criteria, and execute a corresponding response strategy.

In one example of this implementation, the impact surface defines a plurality of zones including at least one optimal zone and at least one non-optimal zone. In another example, the controller is configured to compare the number of impacts of crop billets in each of the plurality of zones over a given period of time to a threshold; the controller is configured to make an adjustment to the harvester as the response strategy when the number of impacts exceeds the threshold in the non-optimal zone. In yet another example, the adjustment to the harvester comprises one or more of adjusting an angle or length of the billet deflector, fan speed, chopper speed, harvester speed, a manifold pressure, nozzle orientation, or nozzle operation.

In a further implementation of this disclosure, a method of controlling impact of crop billets on a louver located in a housing of a cleaning chamber of a sugarcane harvester includes providing the chopper, a billet deflector, a fan, a plurality of sensors coupled to an impact surface of the louver, and a controller; chopping stalks of sugarcane by the chopper into crop billets and discharging the crop billets into a cleaning chamber of the sugarcane harvester; deflecting the crop billets by the billet deflector in the cleaning chamber towards the louver; blowing air into the cleaning chamber via the fan to separate crop residue from the crop billets; sensing, via a plurality of sensors, impact by the crop billets on an impact surface of the louver; communicating, via at least one of the plurality of sensors, a billet impact signal to the controller; determining a number of impacts of crop billets on a plurality of zones on the impact surface; comparing the number of impacts of crop billets on each of the plurality of zones to a threshold; and triggering a response by the controller to control the impact of the crop billets on the impact surface of the louver.

In one example of this implementation, the method includes detecting, by the controller, the number of impacts of crop billets in an optimal zone of the plurality of zones on the impact surface of the louver exceeds the threshold, determining, by the controller, not to make any adjustment to the sugarcane harvester as the response. In another example, the method includes detecting, by the controller, the number of impacts of crop billets in a non-optimal zone of the plurality of zones on the impact surface of the louver exceeds the threshold, determining, by the controller, to make any adjustment to the sugarcane harvester as the response, and adjusting one or more of adjusting an angle or length of the billet deflector, fan speed, chopper speed, harvester speed, a manifold pressure, a nozzle orientation of an air attachment, or an operation status of a nozzle of an air attachment.

BRIEF DESCRIPTION OF THE DRAWINGS

FIG. 2C is a perspective view of the billet deflector.

FIG. 9 is a schematic representation of a control system.

FIG. 12A is a schematic illustrating an example of a number of sensed impact of crop billet with the louver based on different zones.

FIG. 34 is a perspective view of another implementation of the supplemental air attachment without a cover.

FIG. 35 is a perspective view of the supplemental air attachment of FIG. 34 including a cover.

FIG. 36 is a perspective view of another implementation of the supplemental air attachment without a cover.

FIG. 37 is an overhead view of three supplemental air attachments with covers.

DETAILED DESCRIPTION

Before any implementations of the disclosure are explained in detail, it is to be understood that the disclosure is not limited in its application to the details of construction and the arrangement of components set forth in the following description or illustrated in the accompanying drawings. The disclosure is capable of supporting other implementations and of being practiced or of being carried out in various ways. Also, it is to be understood that the phraseology and terminology used herein is for the purpose of description and should not be regarded as limiting.

Figure 1A:
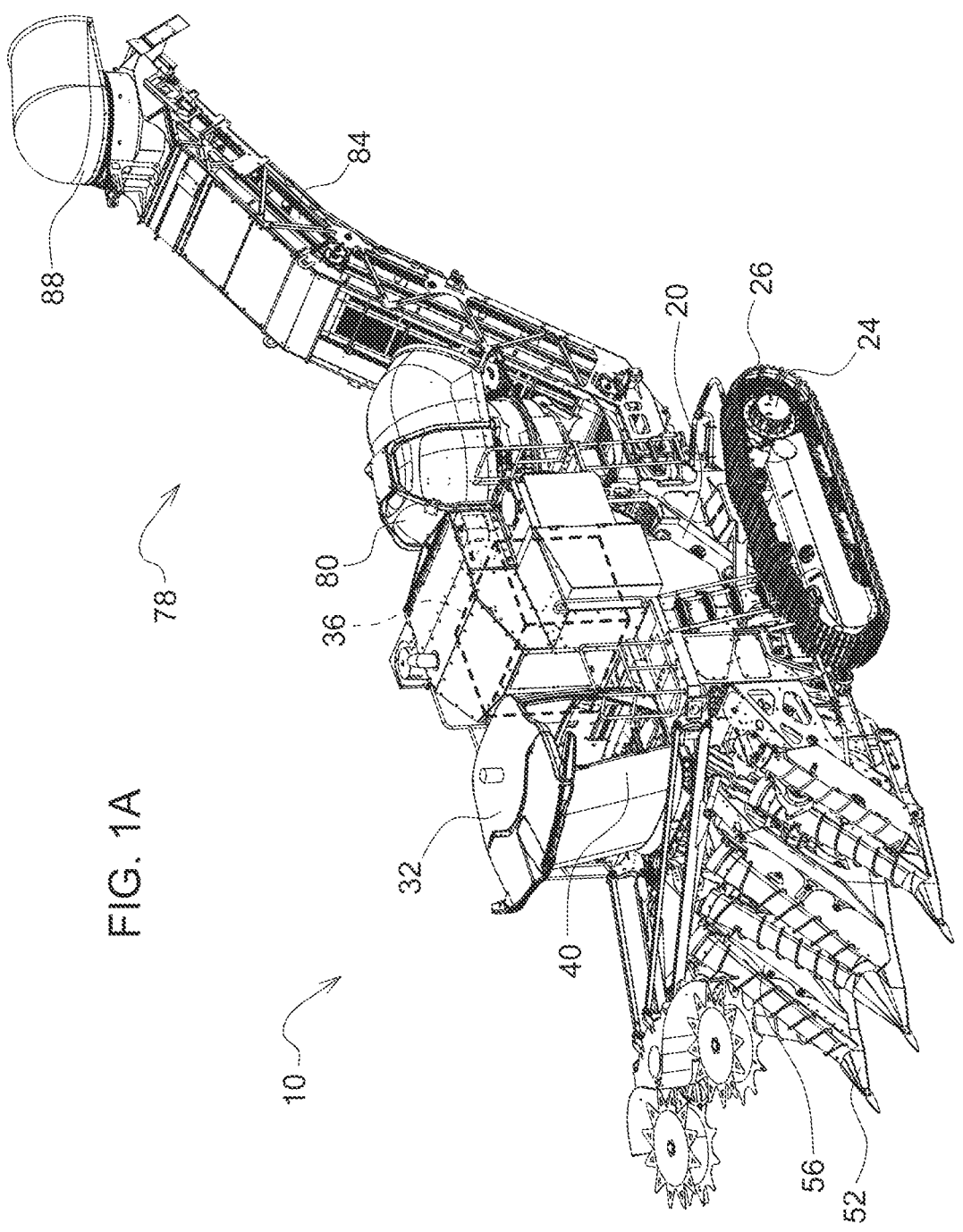
FIG. 1A is a perspective view of a sugarcane harvester.
Figure 1B:
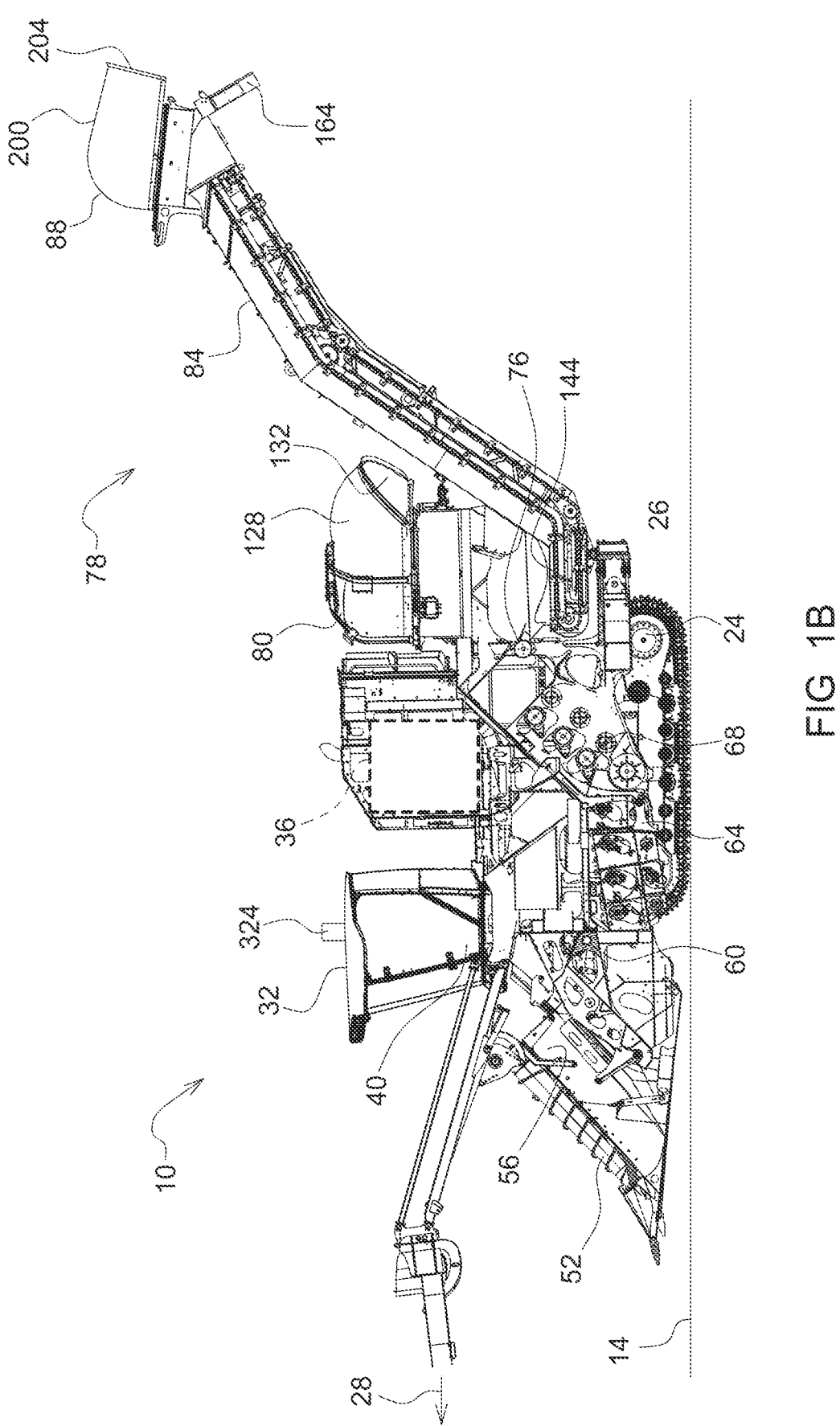
FIG. 1B is a side view of the sugarcane harvester of FIG. 1.

FIG. 1A illustrates a harvester 10, such as a sugarcane harvester, configured to harvest crop from a field 14. The illustrated harvester 10 includes a main frame 20 supported on one or more ground-engaging mechanisms such as wheels 24 or tracks that engage the field 14 in order to move the harvester 10 across the field 14 in a direction of travel 28 (FIG. 1B). In some implementations, the wheels 24 may include continuous tracks 26 or other traction devices. An operator's cab 32 is mounted on the frame 20 above a prime mover 36, such as an engine. The prime mover 36 may be an internal combustion engine or other such device for providing motive power. The harvester 10 includes a throttle control 40 (e.g., a lever, button, switch, pedal, etc.) for controlling a speed of the prime mover 36 and thus a speed of the harvester 10 (also referred to as the harvester speed). The harvester 10 includes a pair of crop lifters 52 mounted to the front of the frame 20, defining an inlet 56 for receiving the crop.

FIG. 1B illustrates a side view of the harvester 10 with some portions thereof removed. The crop lifters 52 cooperate with a knockdown roller 60 and a base cutter 64 to remove the crop from the field 14. Feed rollers 68 are disposed within the inlet 56 to feed the crop from the field 14 into the harvester 10. The feed rollers 68 operate at a feed speed. The harvester 10 further includes a chopper 76, and a cleaning arrangement or cleaning system 78 (also referred to herein as residue discharge system) including a primary separator 80 and/or a secondary separator 88. The harvester 10 also includes a conveyor 84 (also referred to herein as an elevator) connecting the primary separator 80 and the secondary separator 88.

Figure 1C:
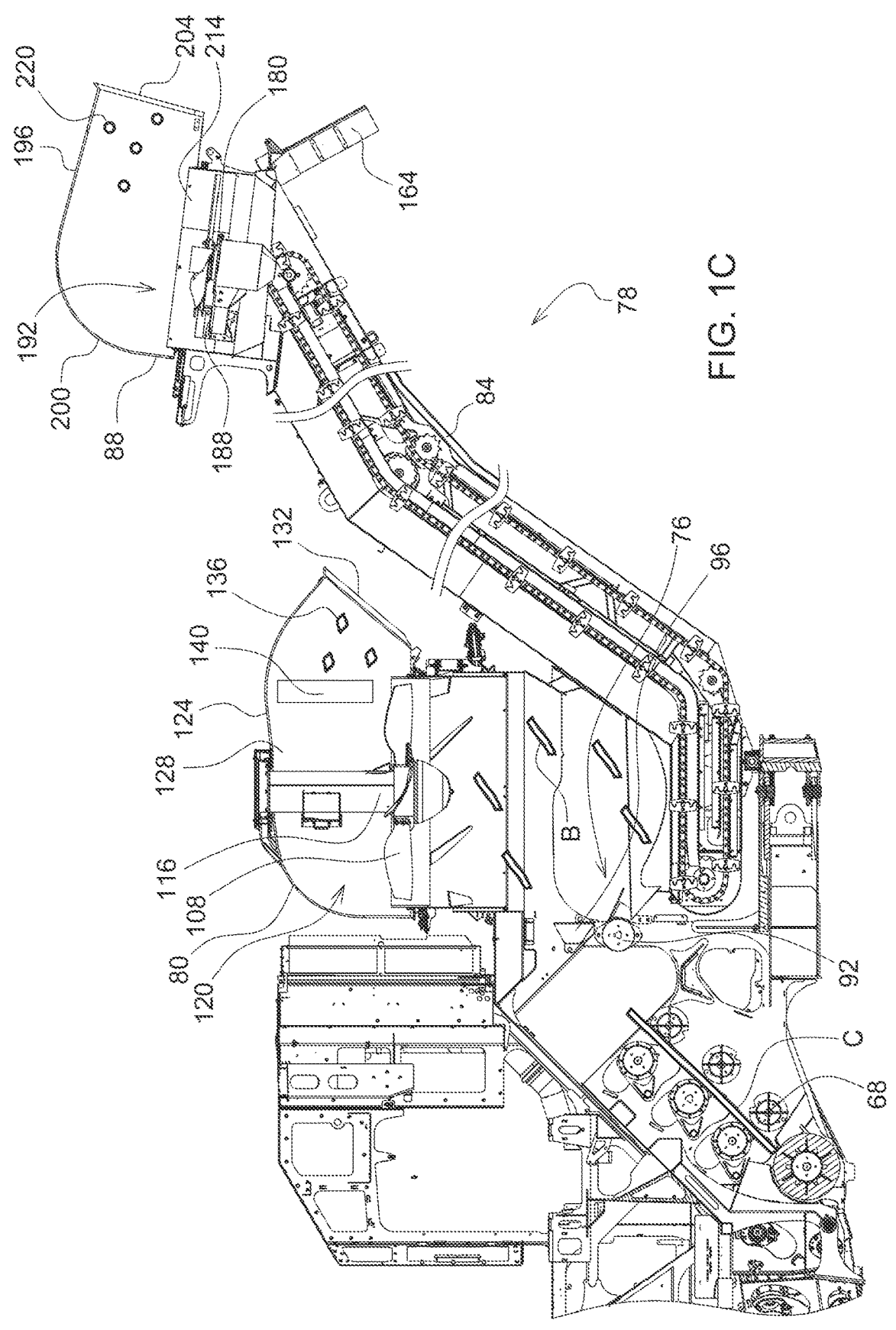
FIG. 1C is a cross-sectional side view of a portion of the sugarcane harvester of FIG. 1.

FIG. 1C illustrates the chopper 76 and the cleaning system 78 in more detail. The chopper 76 is disposed adjacent the feed rollers 68 to cut the crop. The chopper 76 may include a set of chopper drums 92 driven by a motor. The chopper drums 92 include a blade 96 for cutting the stalks of the crop. In one implementation, the chopper 76 may include counter rotating drum cutters with overlapping blades. In other implementations, the chopper 76 may include any suitable blade or blades for cutting the stalks of crop. The chopper 76 cuts the stalks of crop, referred to as cane C, into crop billet B, which includes pieces of the stalk. The crop also includes dirt, leaves, roots, and other plant matter, which is collectively referred to herein as extraneous plant matter, or crop residue. The chopper 76 operates at a chopper speed, which may be adjusted to change a size and weight of the resulting chopped crop pieces. The chopper 76 directs a stream of the cut crop, including crop billet B and extraneous plant matter, to the cleaning system 78 and specifically to the primary separator 80.

The cleaning system 78 is generally configured to distinguish between the billet B and the extraneous plant matter. (The extraneous plant matter may be referred to herein as residue, especially when ejected from the cleaning system 78). The cleaning system 78 is generally operable at an adjustable cleaning speed. The primary separator 80 is coupled to the frame 20 and disposed downstream of the chopper 76 for receiving cut crop from the chopper 76. The primary separator 80 generally separates the extraneous plant matter from the crop billet B by way of any suitable mechanism for cleaning the cut crop, such as a fan, a source of compressed air, a rake, a shaker, or any other mechanism that distinguishes various types of crop parts by weight, size, shape, etc. in order to separate extraneous plant matter from crop billet. In the illustrated implementation, the primary separator 80 includes a primary fan 108 driven at a primary fan speed by a primary motor 116. The primary fan speed can be varied by controlling the primary motor 116. Thus, in the illustrated implementation, the cleaning speed may include the primary fan speed; however in other implementations, the cleaning speed may include air speed (e.g., of released compressed air or any other pressurized air), rake speed, shaker speed, etc. The primary separator 80 further includes a primary cleaning chamber 120 generally defined by a primary cleaner housing 124.

The primary separator 80 includes a primary hood 128 coupled to the main frame 20. The primary hood 128 may have a domed shape, or other suitable shape, and includes a primary opening 132 (also referred to herein as first outlet) angled out from the harvester 10 and facing slightly down towards the field 14. The hood directs separated extraneous plant matter through the primary opening 132 to the outside of the harvester, back onto the field 14. In some implementations the primary separator 80 includes a primary shredder 140 that shreds the residue into smaller pieces (primary residue 136), which can be selectively activated by an operator. The separated crop, including mostly crop billet B, is directed to an outlet of the cleaning chamber 120 and is deposited in a basket 144 disposed below the primary separator 80.

With continued reference to FIG. 1C, the conveyor 84 is coupled to a rear of the frame 20 for receiving the separated crop from the basket 144. The conveyor 84 extends from the rear of the harvester 10 and terminates at a discharge opening 164 (also referred to herein as a second outlet) elevated to a height suitable for discharging cleaned crop into a vehicle. The second outlet 164 does not discharge the harvested material to the field, like the first outlet, but instead discharges the material to a collection vehicle. The secondary separator 88 is disposed adjacent the discharge opening 164 for cleaning the crop a second time before being discharged into the vehicle. The secondary separator 88 may include a fan, a compressed air source, a rake, a shaker, or other suitable device. In the illustrated implementation, the secondary separator 88 includes a secondary fan 180 driven at a secondary fan speed by a secondary motor 188. The secondary separator 88 includes a secondary cleaning chamber 192 defined by a secondary cleaner housing 196. The secondary cleaner housing 196 includes a secondary hood 200 having a secondary opening 204. The secondary crop cleaner is operable such that additional extraneous plant matter is discharged through the secondary opening 204 and the remaining separated crop is discharged through the discharge opening 164 and into the vehicle. In some implementations, the secondary separator 88 includes a secondary shredder 214 that shreds the residue into smaller pieces (secondary residue 220), which can be selectively activated by the operator.

Figure 2A:
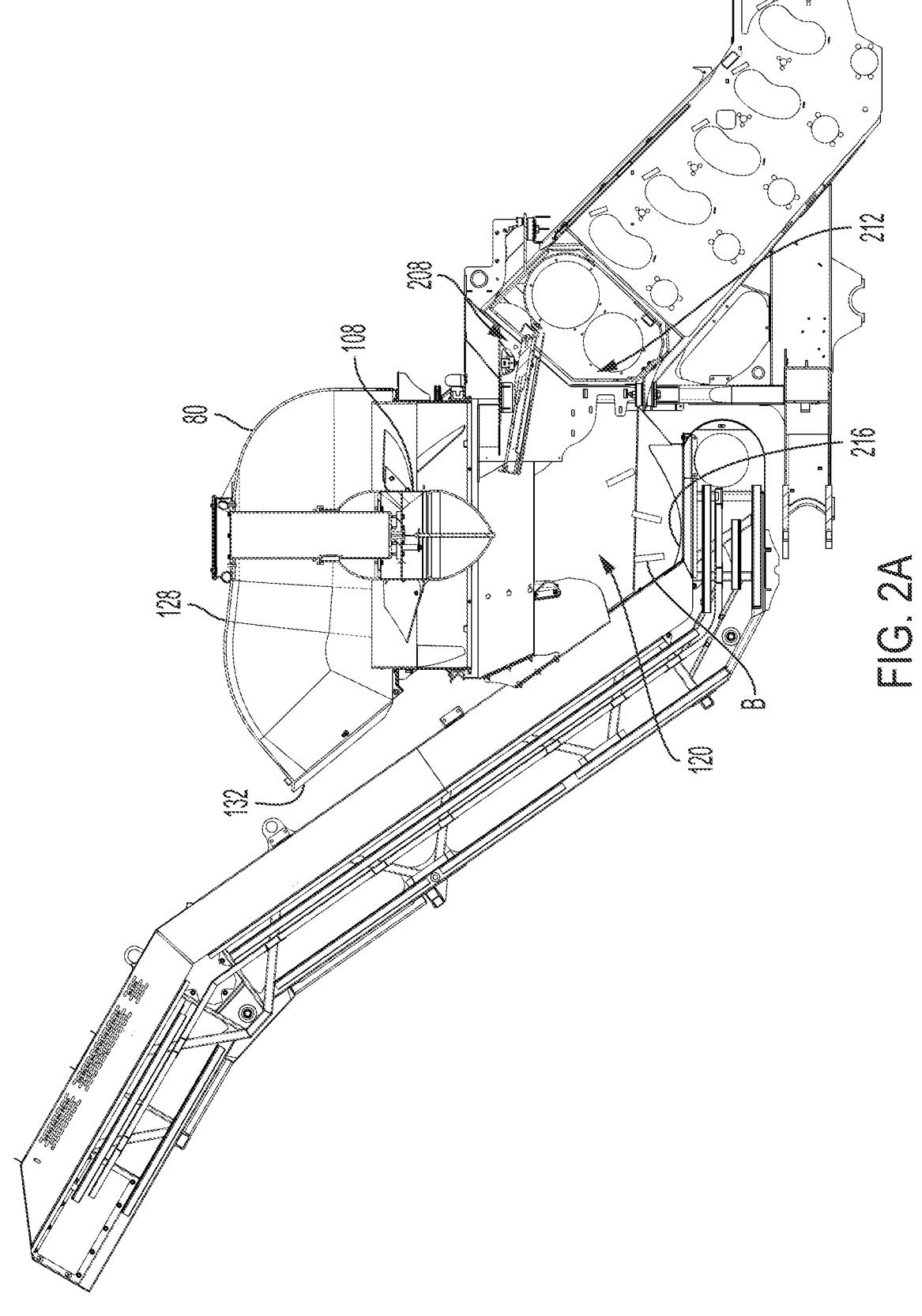
FIG. 2A is a cross-sectional view of a cleaning arrangement of the sugarcane harvester having a billet deflector.

FIG. 2A illustrates the primary separator 80, and more clearly illustrates a billet deflector 208 positioned at an outlet of the chopper 76, which coincides with an inlet 212 of the primary cleaning chamber 120. The billet deflector 208 is positioned within a flow path of the material entering the primary cleaning chamber 120 such that the material, such as the crop billet material B, impacts the billet deflector 208 and is physically redirected by the contact. The physical contact between the material and the billet deflector 208 (impacting the billet deflector 208 and moving across the billet deflector 208) directs the crop across the cleaning chamber and additionally promotes separation of the billet material B from the extraneous plant matter. Use of a billet deflector 208 decreases losses of crop billet B through the opening or outlet 132 in the hood 128 as the crop billet B is redirected in a direction away from the outlet 132. The crop billet B is directed instead toward a separate collection outlet 216 of the primary separator 80, through which the billet material B is directed to the basket 144, conveyor 84, and discharge opening 164 (shown in FIGS. 1B and 1C). The extraneous plant matter, being generally lighter and less dense than the crop billet material B, impacting the billet deflector 208 with less force and is drawn by the fan 108 through the opening 132, where it is scattered to the field 14.

Placement and orientation of the billet deflector 208 relative to the inlet 212 of the cleaning chamber 120 (in addition to other settings such as fan speed, crop condition, harvesting applications, etc.) factors into the billet loss through the outlet 132 in the hood 128. If the billet deflector 208 is positioned at a first angle or has a first length that does not substantially direct the billet material B away from the fan 108 and outlet 132, the amount of billet loss through the outlet 132 is greater than a second angle or has a second length that does substantially direct the billet material B away from the fan 108 and outlet 132. Similarly, the placement and orientation of the billet deflector 208 factors into the waste harvest of the extraneous plant matter through the collection outlet 216 to the basket 144. If the billet deflector 208 is positioned at the second angle or has the second length to minimize billet loss through the outlet 132, the fan 108 is unable to efficiently draw the extraneous plant matter through the outlet 132 in the hood 128, resulting in unwanted harvesting of the extraneous plant matter.

FIGS. 3-8 illustrate the billet deflector 208 positioned at various angles and extended/retracted to various lengths to modify the effect of the billet deflector 208 on the chopped billet material B and the extraneous plant matter. As shown in greater detail in FIGS. 2B and 2C, a first adjustment mechanism (FAM) 224 and a second adjustment mechanism (SAM) 228 are coupled to the billet deflector 208. As shown in FIGS. 3-8, the first adjustment mechanism 224 adjusts an angle of the billet deflector 208 relative to the frame 20, the inlet 212, and the fan 108. The second adjustment mechanism 228 adjusts a length of the billet deflector 208. The length and angle of the billet deflector 208 may be controlled together or separately and may be adjusted simultaneously or at distinct times.

Figure 2B:
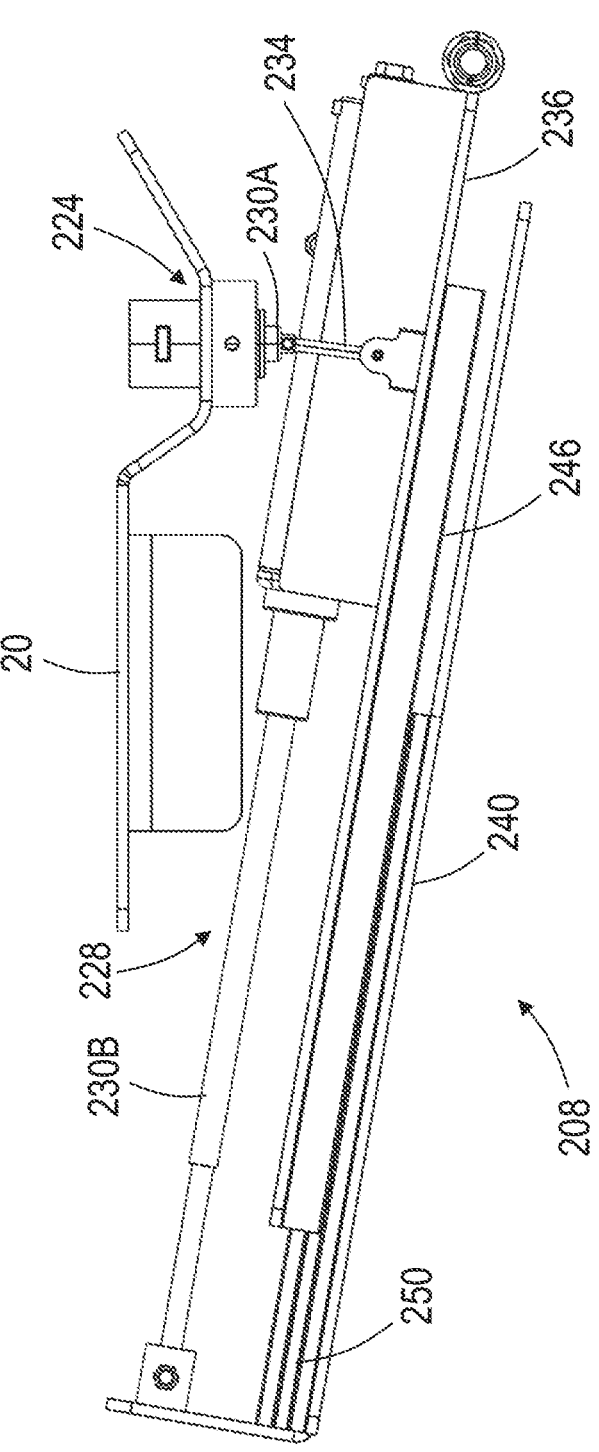
FIG. 2B is a side view of the billet deflector.
Figure 2C:
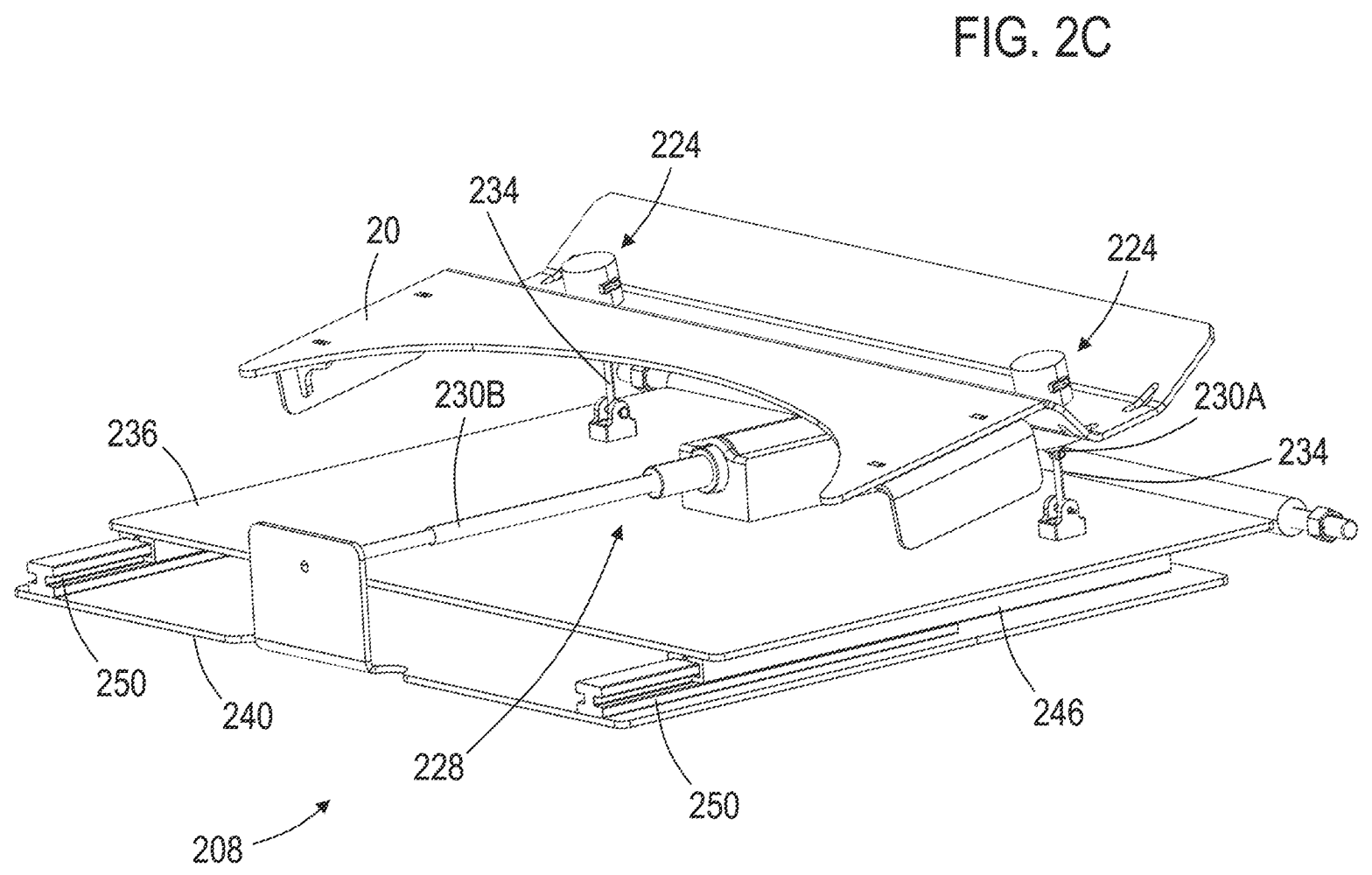

With continued reference to FIGS. 2B-2C, the first adjustment mechanism 224 includes a first linear actuator 230A coupled at a first end to the frame 20 of the harvester 10 and coupled to the billet deflector 208 at a second end. The first linear actuator 230A extends non-parallel with the billet deflector 208 and moves between an extended position and a retracted position to adjust the angle of the billet deflector 208. The first linear actuator 230A is located above the billet deflector 208. When the linear actuator 230A is retracted (upward), the billet deflector is rotated about the rotational axis 232 to increase the angle of the billet deflector 208. As shown in FIG. 2C, the first adjustment mechanism 224 includes two separate linear actuators 230A spaced apart from one another to share the load/weight of the billet deflector 208 and rotation of the billet deflector 208.

The second adjustment mechanism 228 includes a second linear actuator 230B coupled at a first portion 236 of the billet deflector 208 and coupled to a second portion 240 of the billet deflector 208 at a second end. The second adjustment mechanism/linear actuator 228 extends and retracts in a direction that is substantially parallel with the plane of the billet deflector 208. The separate first and second portions 236, 240 overlap one another when the billet deflector 208 is in a retracted position. The first and second portions 236, 240 are coupled to one another via, for example, tracks 246, 250, (or alternatively, fasteners and slots, etc.) and limited to linear in-plane translation relative to one another, as shown in FIGS. 3-7. As shown, the tracks 250 coupled to the second portion 240 of the billet deflector are I-shaped and slide within a slot of the tracks 246 coupled to the first portion 236. When the linear actuator 230B extends, the second portion 240 moves relative to the first portion 236 to increase the overall length of the billet deflector. The linear actuators 230A, 230B may be, for example, electrically powered solenoids, though in other implementations may be other electrical, pneumatic, or hydraulic systems capable of generating linear extension of the second portion 240 relative to the first portion 236 and capable of generating rotation of the billet deflector 208 (or rotation of one of the portions 236, 240 of the billet deflector 208). In some implementations, a single actuator may function to generate both the linear translation of the portion 240 and rotation of the deflector 208.

The various positions (e.g., lengths, angles, etc.) of the billet deflector 208, as shown in FIGS. 3-8, are only a few of the potential positions achievable, with the billet deflector 208 being adjustable to various angles between a maximum and minimum angle and various lengths between a maximum length and a minimum length. The illustrated implementations of FIGS. 3-8 identify how the material from the inlet 212 interacts differently with the billet deflector 208 depending on the position of the billet deflector 208. These descriptions assume similar harvesting conditions, such as similar material throughput. In operation, these harvesting conditions may be utilized as inputs for modifying the position of the billet deflector 208. As such, an impact force against the billet deflector 208 being greater at a first position relative to a second position assumes these similar harvesting conditions, though in normal use, the second position may be utilized when the material throughput is less such that the difference in the impact force is never realized in normal use. In some implementations, it is desirable that the separation of the billet material B and the extraneous plant matter is consistent, even in view of changing harvest conditions. To this end, the differences described below with respect to FIGS. 3-8 may be minimized by controlling the billet deflector 208 to account for these changes in harvest conditions.

Figure 3:
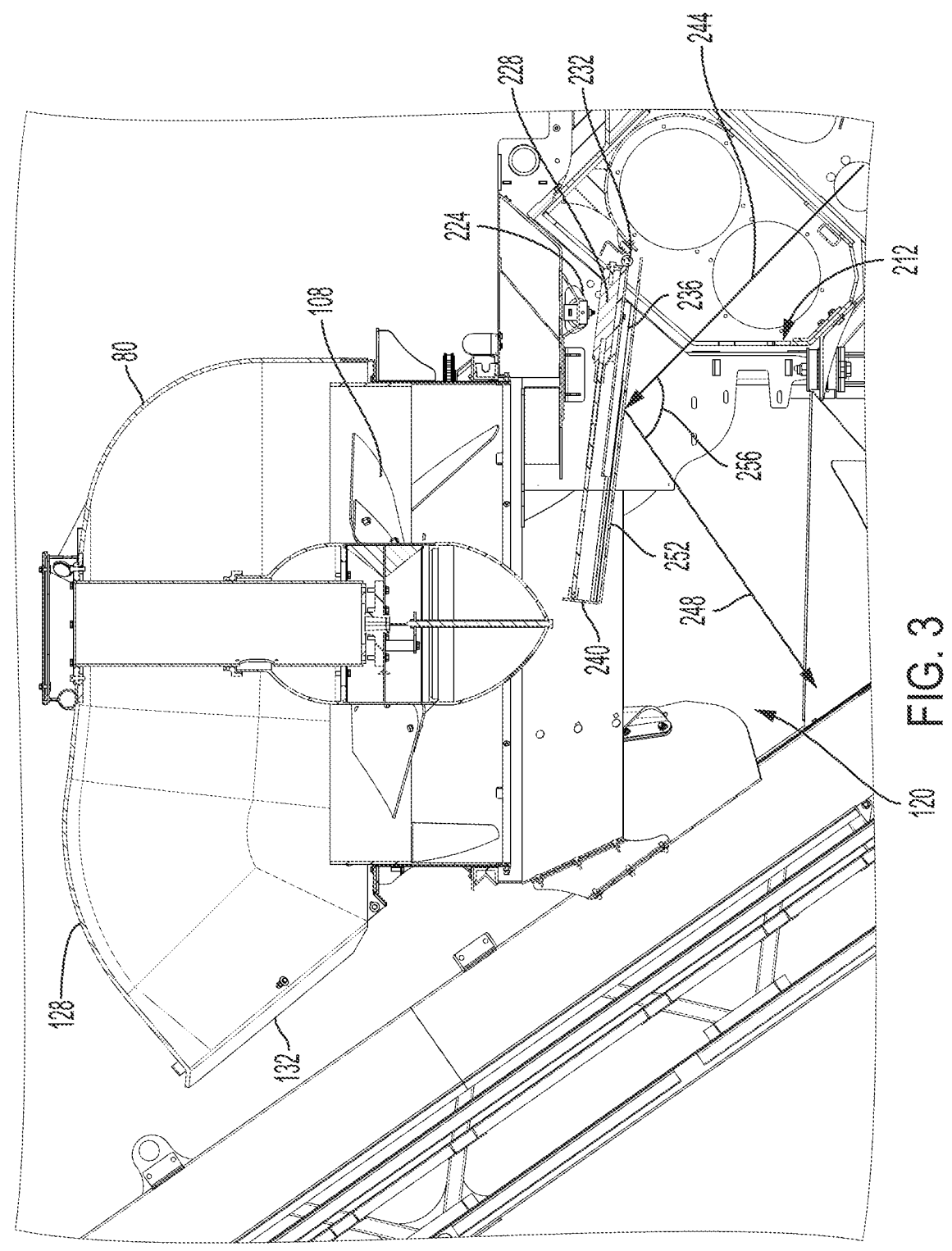
FIG. 3 is a cross-sectional view of the cleaning arrangement having the billet deflector in a first position and orientation.

FIG. 3 illustrates the billet deflector 208 in a first position and orientation that is lowered and fully extended. In the fully extended position, less extraneous plant matter is drawn through the outlet 132 (relative to a more retracted position) as the billet deflector blocks a greater percentage of the fan 108. Further, in the fully extended position, the harvested material interacts with the billet deflector 208 for a greater amount of time, which can increase the separation between the billet material B and the extraneous plant matter. Additionally, in the lowered position, the material through the inlet 212 of the cleaning chamber 120 impacts the billet deflector at a lesser angle of impact 256 (compared to a raised position shown in FIG. 4), thereby directing more material towards the collection outlet 216 and basket 144 and away from the outlet 132 of the hood 128. Stated another way, the chopped material enters the inlet 212 in a first direction 244 and the impact surface 252 (the lower surface of the billet deflector 208) against which the chopped material strikes is nearer perpendicular to the direction 244 than in the raised position (FIG. 4) such that the chopped material rebounds or deflects off of the impact surface 252 in a second direction 248 towards the collection outlet 216. As such, the position and orientation shown in FIG. 3 results in high yield (i.e., retention of crop that will be sent to the mill for harvesting) of the crop billet B through the collection outlet 216, but also results in relatively high waste harvest of the extraneous plant matter through the collection outlet 216.

Figure 4:
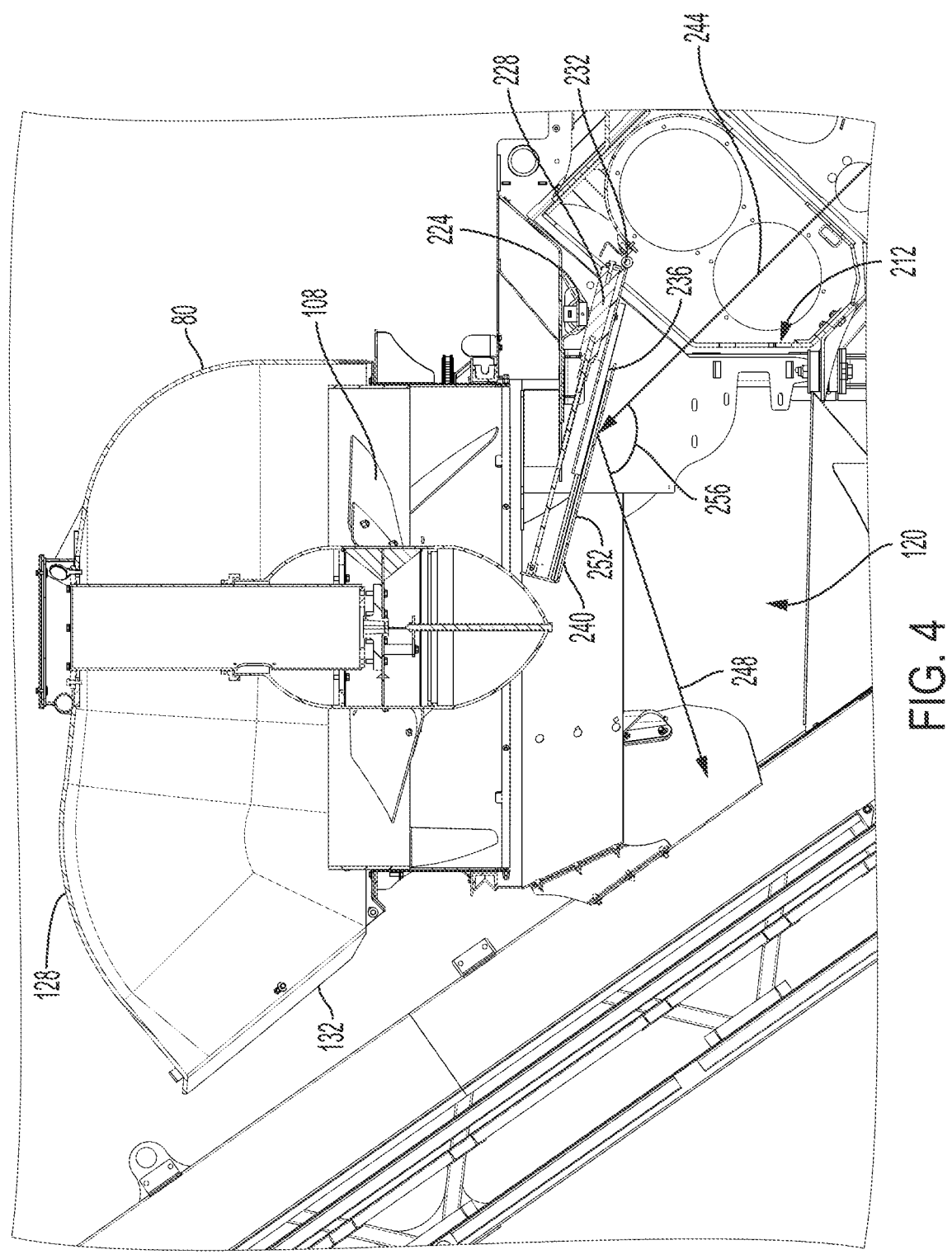
FIG. 4 is a cross-sectional view of the cleaning arrangement having the billet deflector in a second position and orientation.

FIG. 4 illustrates the billet deflector 208 in a second position and orientation that is raised and fully extended. In comparison to the position and orientation shown in FIG. 3, the raised position increases the angle of impact 256 such that the material is directed more closely to the outlet 132 of the hood 128 and the impact force is lessened such that the impact is more of a glancing blow with a shallow reflection angle than the lowered position shown in FIG. 3. As such, the position and orientation shown in FIG. 4 results in a potentially decreased yield of the crop billet B relative to the position and orientation shown in FIG. 3 (due to loss of crop billet B through the outlet 132), however, the arrangement also results in increased efficiency of the fan 108 to draw out the extraneous plant matter such that it results in decreased waste harvest through the collection outlet 216.

Figure 5:
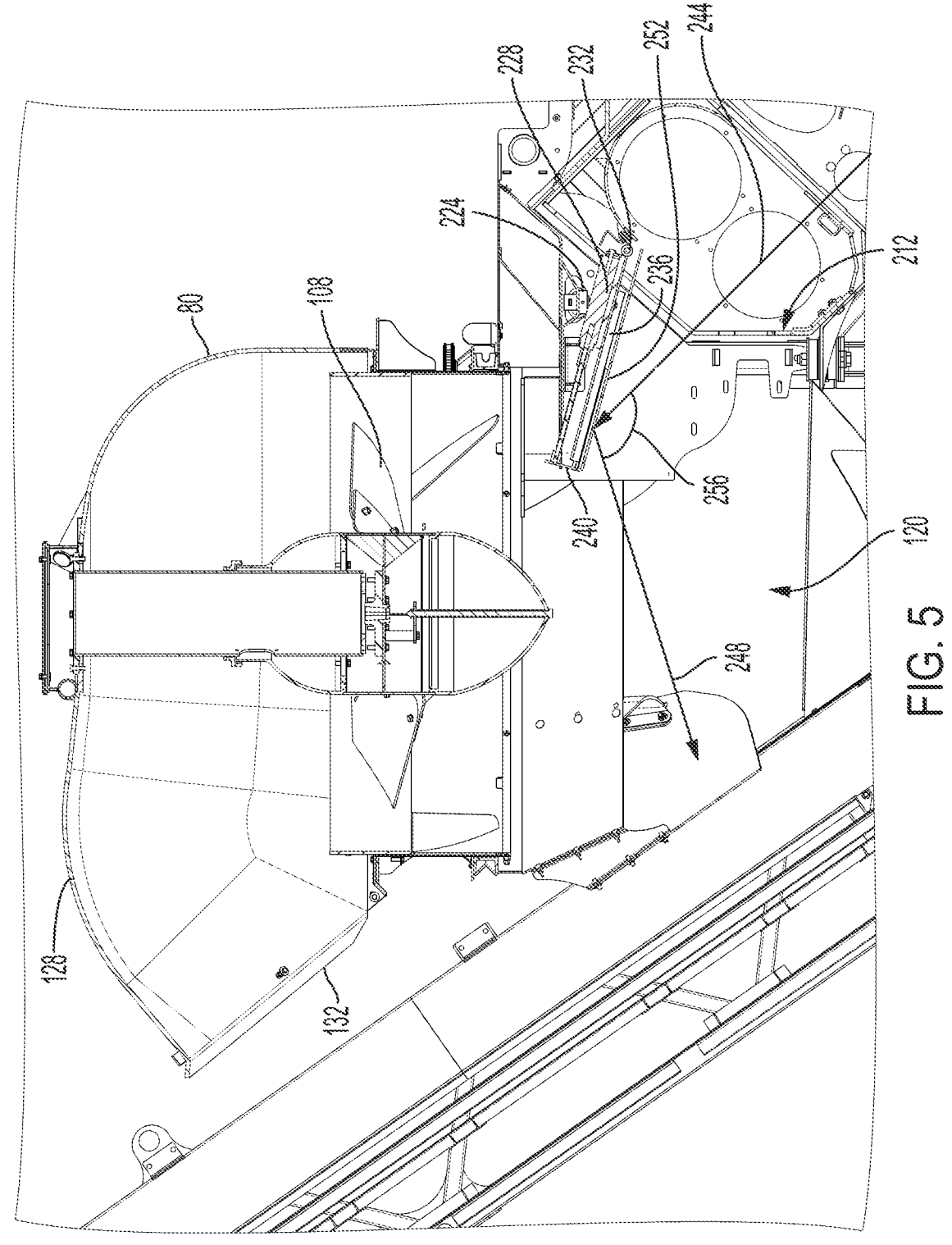
FIG. 5 is a cross-sectional view of the cleaning arrangement having the billet deflector in a third position and orientation.

FIG. 5 illustrates the billet deflector 208 in a third position and orientation that is raised and fully retracted. In comparison to the position and orientation shown in FIG. 4, the fully retracted position decreases the overall surface area of the impact surface 252 such that more material entering the inlet 212 bypasses the billet deflector 208 and instead passes to the outlet 132. As such, the position and orientation shown in FIG. 5 results in a potentially decreased yield of the crop billet B relative to the position and orientation shown in FIG. 4 (due to loss of crop billet B through the outlet 132), however, the arrangement also results in increased efficiency of the fan 108 to draw out the extraneous plant matter such that it results in decreased waste harvest through the collection outlet 216.

Figure 6:
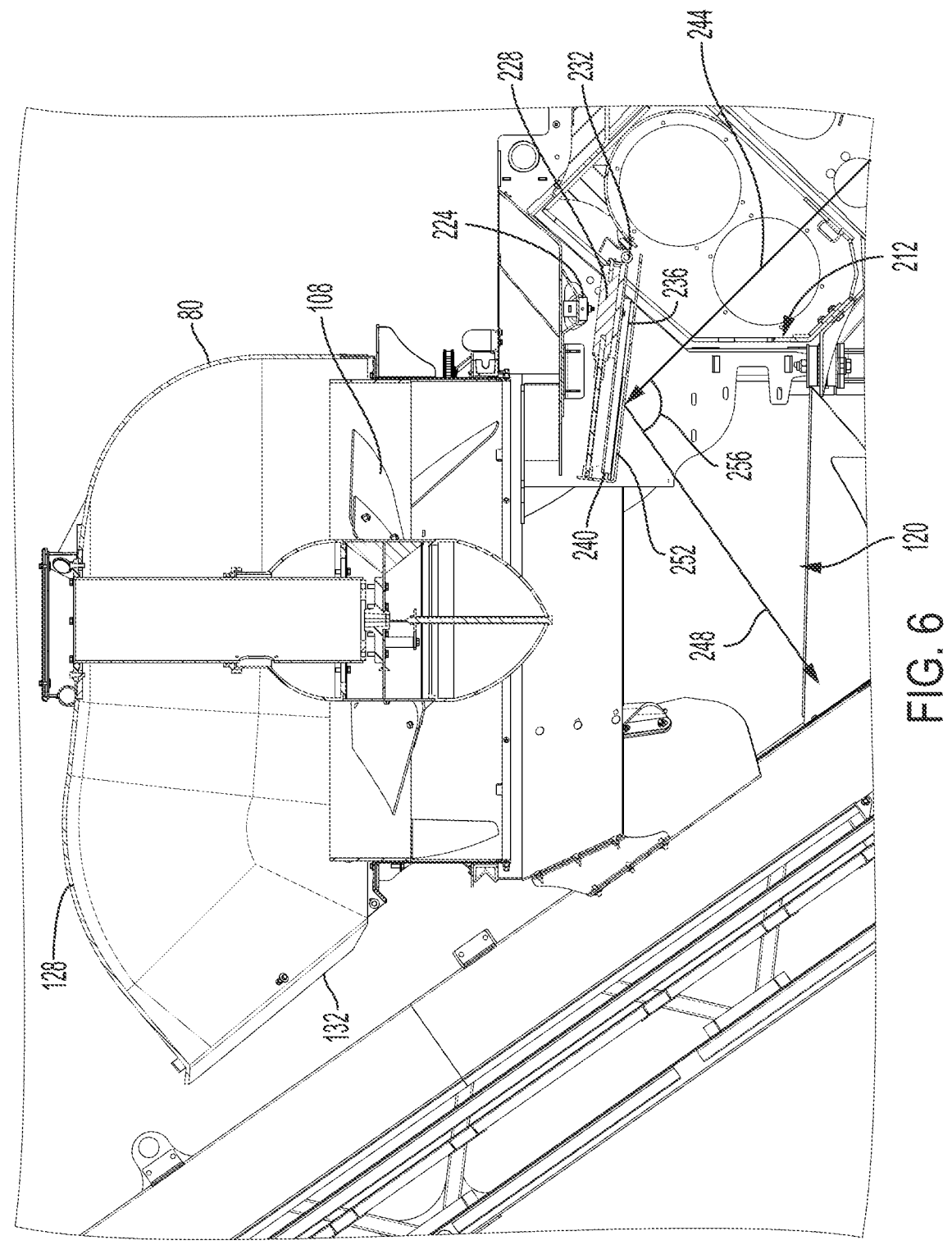
FIG. 6 is a cross-sectional view of the cleaning arrangement having the billet deflector in a fourth position and orientation.

FIG. 6 illustrates the billet deflector 208 in a fourth position and orientation that is lowered and fully retracted. This position and orientation has the benefits of the angle shown in FIG. 3 and the length shown in FIG. 5. The shorter length results in decreased waste harvest and the lower position results in a lesser angle of impact 256.

Figure 7:
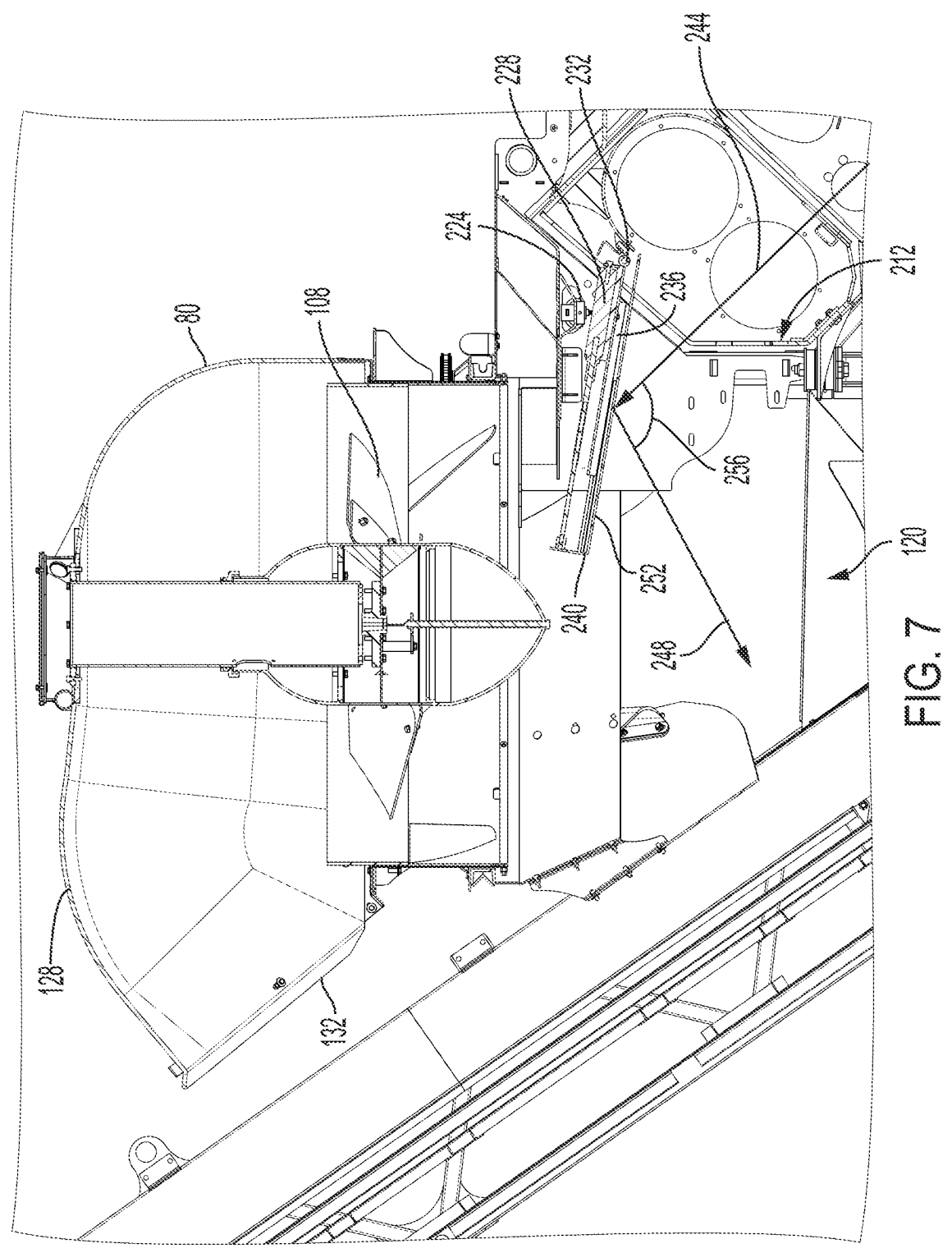
FIG. 7 is a cross-sectional view of the cleaning arrangement having the billet deflector in a fifth position and orientation.

FIG. 7 illustrates the billet deflector 208 in a fifth position and orientation that is between the first and second positions in terms of angle and length. The billet deflector 208 is adjustable to a plurality of different lengths between the maximum length and the minimum length by controlling the extension and retraction of the second adjustment mechanism 228. The billet deflector 208 is likewise adjustable to a plurality of different angles between the maximum angle and the minimum angle by controlling the extension and retraction of the first adjustment mechanism 224. FIG. 7 illustrates one of these plurality of positions.

Figure 8:
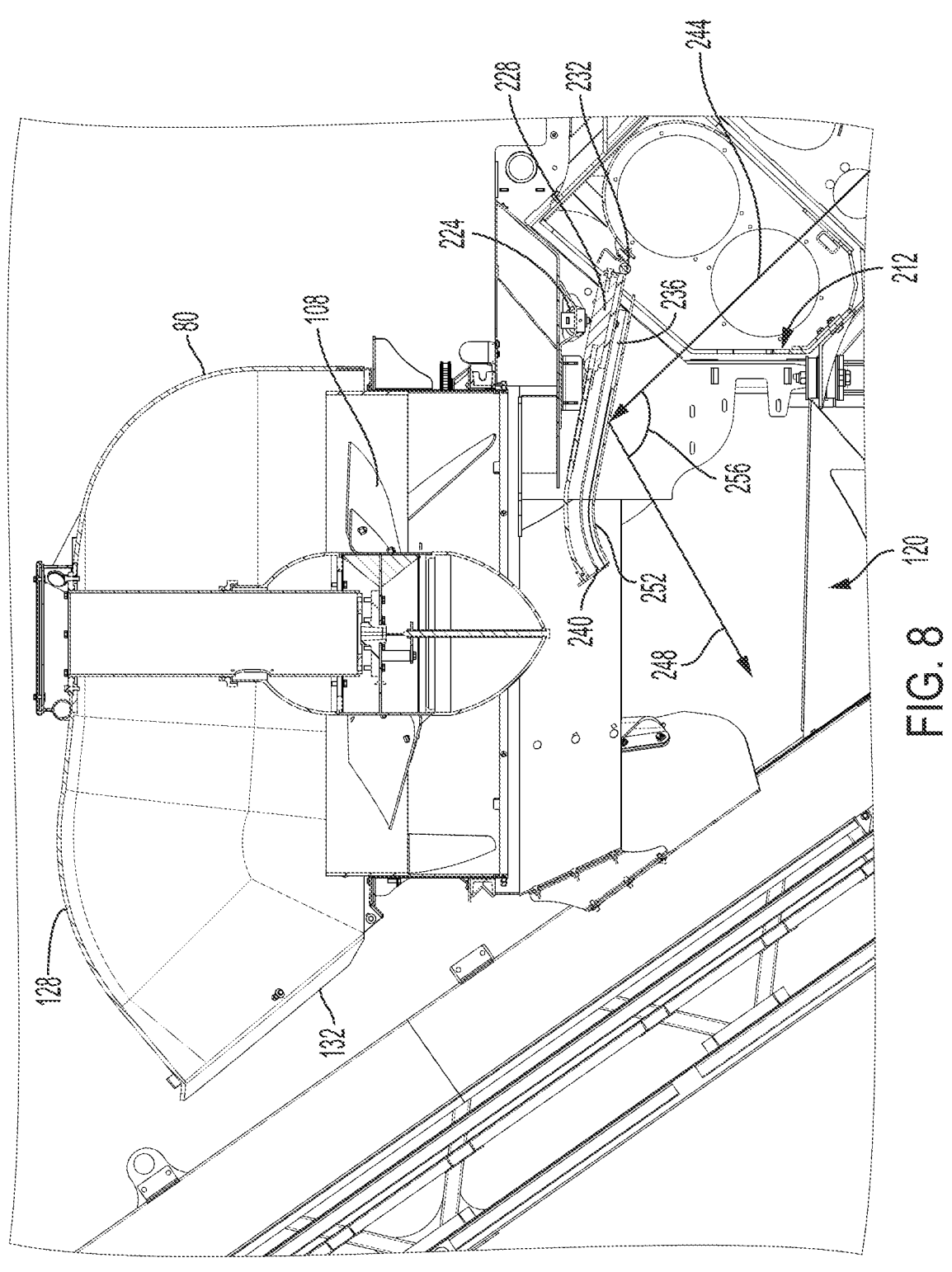
FIG. 8 is a cross-sectional view of the cleaning arrangement having the billet deflector in a sixth position and orientation.

FIG. 8 illustrates the deflector in a sixth position and orientation. The sixth position and orientation are similar to the fifth position, though additionally includes a bent distal end. As shown, in some implementations, modifying the position of the billet deflector 208 can include bending a portion of the billet deflector 208. In some implementations, the billet deflector 208 may be made of multiple distinct components or may be stressed to a curved position to further direct the crop billet B toward the collection outlet 216. The shape shown in FIG. 8 is only one of many non-linear shapes that may be generated in modifying the billet deflector 208. Other shapes include those with greater or less concavity, those that extend upward at the distal end, and those that provide increased or decreased aerodynamics of the material. For example, the billet deflector 208 may be shaped in a non-linear fashion to further break apart the billet material B from the extraneous plant matter.

Extending the deflector 208 into the cleaning chamber 120 assists in cane cleaning. The crop billet B and extraneous plant matter enter the inlet 212 of the cleaning chamber 120 as a mat of material and elongating the billet deflector allows the incoming mat of harvested material to travel at a closer proximity to the primary extractor fan 108 while still limiting or preventing the sugarcane loss at the fan 108. Airflow generated by the fan 108 has a greater velocity at locations near or closer to the blades of the fan 108 such that material extraction is increased the closer the material is to the fan 108. Increasing the length of the deflector 208 moves the material closer to the blades of the fan 108, exposing the cane mat to higher air velocities, and increasing the separation between the billet material B and the extraneous plant matter while preventing the billets B from being extracted.

Additionally, the higher trajectory of the incoming material and the increased length of the deflector 208 allows for the material to travel across the cleaning chamber 120 at a greater height within the cleaning chamber 120 for a greater length of time, thereby increasing the extraction of extraneous plant matter through the outlet 132. By providing the material the ability to flow across the cleaning chamber 120 at differing trajectories based on the position of the billet deflector 208, the flight time or air time of the material can be increased or decreased to affect billet loss and extraneous plant matter harvest. The increased length of the deflector 208 additionally physically blocks the billets from being extracted out of the hood 128 at higher trajectories.

The separation of the mat from the inlet 212 into billet material B and extraneous plant matter is a dynamic process that occurs based on the movement of the material through the inlet 212, the impact of the material against the billet deflector 208 and the walls of the cleaning chamber 120, and the airflow generated by the fan 108. The longer that the material remains in motion and exposed to increased air velocities, the more extraneous matter that will be extracted out of the chamber 120 into the field. The conditions that dictate an improved material flow include, but are not limited to crop density, field conditions, and harvesting speeds. By modifying the position of the billet deflector 208, the harvester 10 is configured to adapt to different field/harvesting environments.

Figure 10:
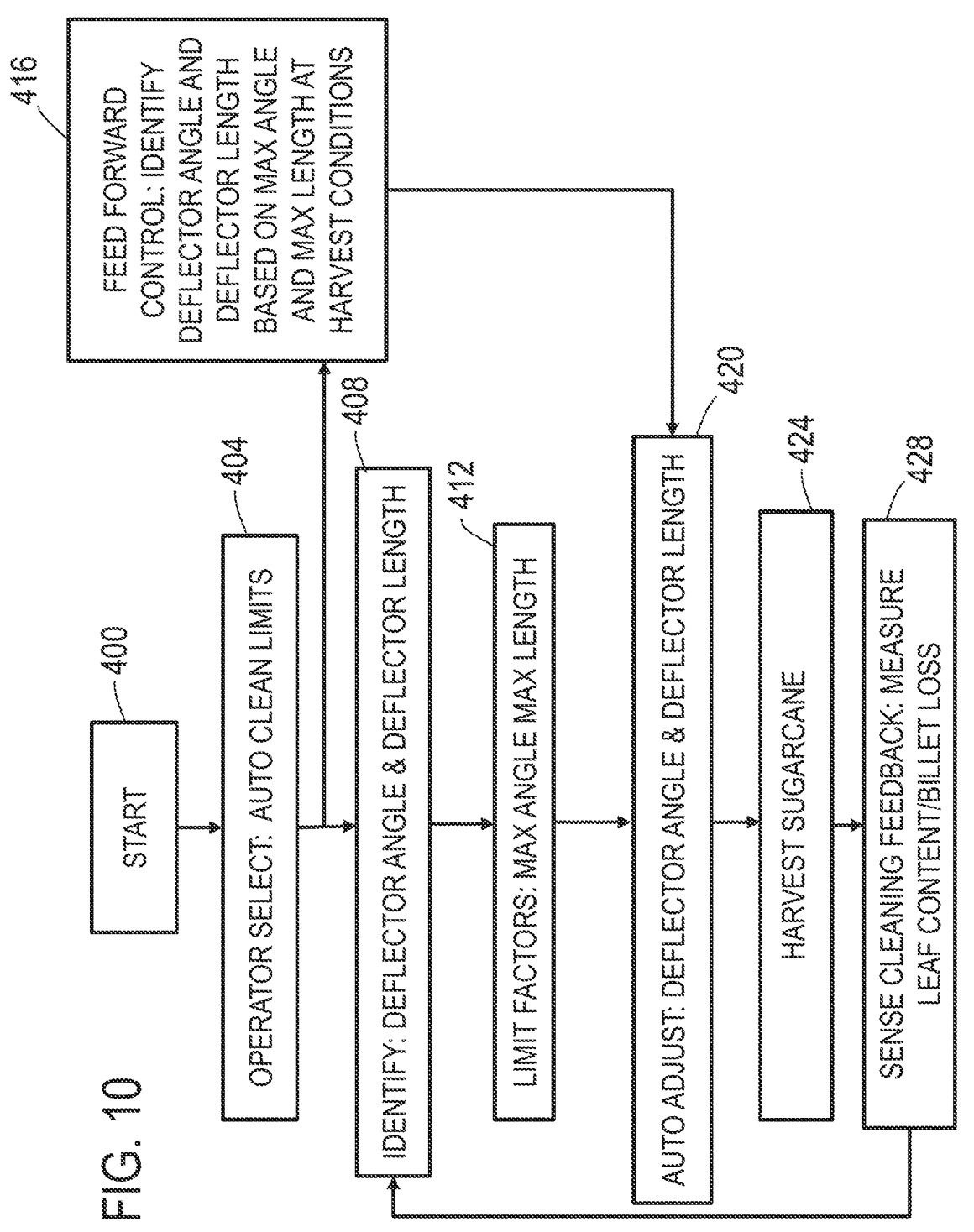
FIG. 10 is a flow chart illustrating a first operational mode for controlling the billet deflector.
Figure 11:
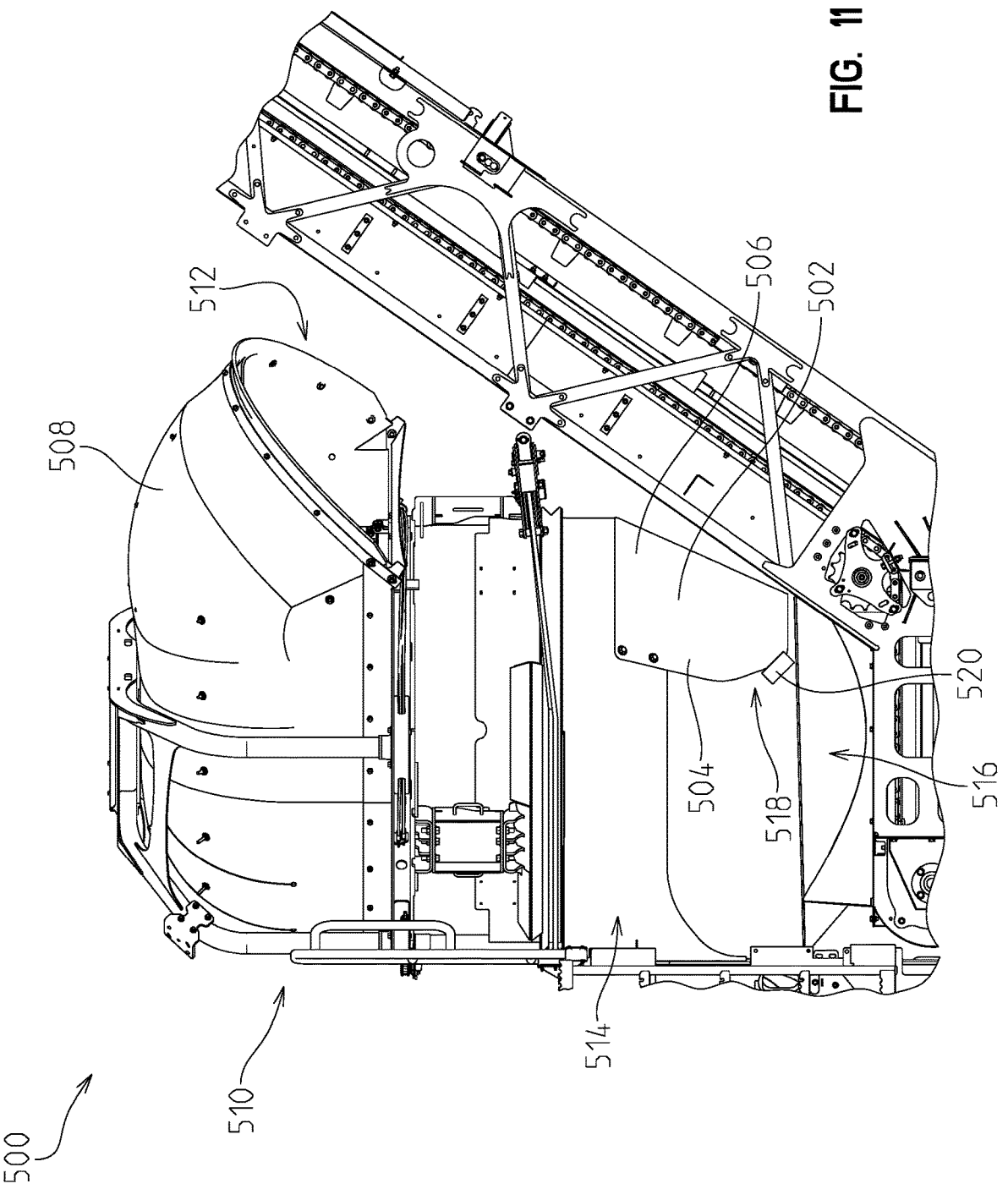
FIG. 11 is a side view of a portion of the sugarcane harvester having a louver with a supplemental air attachment.

FIG. 9 illustrates a schematic representation of a control system having a controller 300, a user interface 304, and a plurality of sensors 308, 312, 316, 320, 324, 328. The controller may be located within the harvester 10 and may be incorporated into an electronic control unit (ECU) of the harvester 10, may be electronically coupleable to the ECU, or may be a separate system operable independent of the ECU. The controller 300 may automatically modify the position (including length, angle, curvature, etc.) of the billet deflector 208 based on various inputs from the user interface 304 and signals received from the sensors 308, 312, 316, 320, 324, 328. Control schemes are shown in FIGS. 10-11. With continued reference to FIG. 9, the user interface 304 may be a console located within the operator's cab 32 having one or more inputs such as a touch screen, switches, dials, and buttons that can be actuated by a user/operator for modifying operation of the harvester 10. The user interface 304 is electrically coupled to the controller 300 such that inputs provided by the user to the user interface 304 are transmitted to the controller 300. Additionally, the controller 300 is operable to provide signals that generate outputs at the user interface 304 indicating information (e.g., vehicle status, vehicle performance) calculated, stored in, or otherwise transmitted by the controller 300. In other implementations, the angle and length of the billet deflector 208 may be manually adjustable (via inputs in the cab, manually at the billet deflector 208).

A sensor 308 for the first adjustment mechanism 224 measures the displacement of the first adjustment mechanism 224. The displacement of the first adjustment mechanism 224 is indicative of an angle of the billet deflector 208 relative to the inlet 212 and fan 108. A sensor 312 for the second adjustment mechanism 228 measures the displacement of the second adjustment mechanism 228, indicative of the length of the billet deflector 208 between the retracted position and the extended position. Various angles and lengths are shown in the different positions of the billet deflector 208 shown in FIGS. 2A-8. The controller 300 is electrically coupled to the sensors 308, 312 and receives signals from the sensors 308, 312 that indicate the displacement of the first and second adjustment mechanisms 224, 228 and the angle and extension of the billet deflector 208 associated therewith.

In some implementations, the harvester 10 is equipped with a billet loss sensor 316 that measures billet loss through the outlet 132 of the hood 128 and a waste harvest sensor 320 (located on the elevator) that measures the amount of extraneous plant matter that is harvested through the collection outlet 216 of the cleaning chamber 120. In other words, the billet loss sensor 316 identifies how much billet collection outlet 216 is lost through the outlet 132 intended for the extraneous plant matter and the waste harvest sensor 320 identifies how much waste (is instead harvested with the billets material B through the collection outlet 216. These sensors 316, 320 may be, for example, optical sensors that provide a signal to the controller 300 that interprets the differences between billet material and the extraneous plan material to provide an estimate of the billet loss or waste harvest, respectively.

One or more environmental sensors 324 may be located on or at a periphery of the harvester 10 to determine different ambient conditions such as temperature, humidity, field conditions such as soil saturation level, plant density, geographical data, and ground angle/gradient. The environmental sensor(s) 324 provide signals to the controller 300 indicative of the volumetric throughput of the harvested material that will eventually be sent through the inlet 212 towards the billet deflector 208. The environmental sensor(s) 324 may additionally provide some characteristics (e.g., density, weight, height) of the harvested plant that aid the sensors 316, 320 in distinguishing between the billet material and the extraneous plant matter. A vehicle speed sensor 328 measures the velocity of the harvester 10. The controller 300 receives signals from the vehicle speed sensor 328 that aids in determining a volumetric throughput of material through the harvester 10.

The controller is further programmed to provide signals to the fan 108 and to the first and second adjustment mechanisms 224, 228 to modify operational parameters (e.g., fan speed, position of the adjustment mechanisms 224, 228) in response to the signals provided by the sensors 308, 312, 316, 320, 324, 328.

FIG. 10 illustrates one implementation of a method of separating the billet material from the extraneous plant material and specifically how to automatically reposition the billet deflector 208 to maintain a desired range of billet loss and/or waste harvest. Beginning at block 400, an operator selects a range of allowable billet loss through the hood outlet 132 and/or allowable waste harvest through the collection outlet 216 of the cleaning system 78 (block 404). These ranges, also referred to as auto clean limits, may include a maximum limit and a minimum limit. In some implementations, the auto clean limits may be manually entered by a user to the user interface 304. In other implementations, the auto clean limits may be estimated or based on past values and with no input from the operator or merely confirmation from an operator. In some implementations, the auto clean limits may default to preset or most recent values unless modified by an operator. A look-up table (e.g., stored in a memory unit of the controller 300) may be provided and/or settings may be suggested based on material throughput or desired residue and cleaning levels. In some implementations, a position sweep may determine an optimal angle and length per harvesting operation. With the auto clean limits determined, the length and angle of the billet deflector 208 are determined (block 408) and adjusted to stay within the limits (total range of motion in length and angle) of the billet deflector 208 (block 412). More specifically, the controller 300 may interpret the signals from the first and second adjustment mechanism sensors 308, 312, and identify the positions of the first and second adjustment mechanisms 224, 228. As the first and second adjustment mechanisms 224, 228 operably drive and control movement of the billet deflector 208, the controller 300 identifies the angle of the billet deflector 208 based on the signal from the first adjustment mechanism position sensor 308 and identifies the length of the billet deflector 208 based on the signal from the second adjustment mechanism position sensor 312. In some implementations, only the length or the angle (or the curvature) of the billet deflector 208 is adjustable and the controller only identifies those positions that are adjustable.

The controller 300 may additionally operate with feed forward control (block 416) as a predictive function that anticipates harvesting changes such as machine speed and crop conditions such as moisture and density. The controller 300 can make adjustments accordingly.

As the harvester 10 operates, the billet loss sensor 316 and waste harvest sensor 320 provide signals to the controller identifying the billet losses and the harvested leaf content, respectively. These values are compared to the selected auto clean limits. If one or both of the sensed billet loss and waste harvest fall outside of the selected range, and/or in response to the predictive functionality of the feed forward control, the controller 300 provides signals to one or both of the first and second adjustment mechanisms 224, 228 to modify the position (length, angle, curvature) of the billet deflector 208 (block 420). For example, if the billet loss is too high, the controller 300 may provide a signal to increase the displacement of the second adjustment mechanism to increase the length of the billet deflector 208. Additionally, or alternatively, the controller 300 may provide a signal to increase the length of the first adjustment mechanism 224 to decrease the impact angle at the billet deflector 208. Additional adjustments, such as adjusting the speed of the fan 108, the chopping speed, harvester speed, may be made to modify the billet loss/waste harvest at this time.

Following block 420, the method advances to block 424 where sugarcane is harvested by the harvester during a harvesting operation. During the harvesting operation, the method advances to block 428 where a leaf content/billet loss is sensed via a sensor. Based on the sensing in block 428, the method may return to block 408 if the deflector length or angle needs adjustment.

In FIG. 11, an implementation of a cleaning system 500 is shown. The cleaning system 500 includes a primary separator 510 having a hood 508 and defining a primary opening 512. The cleaning system 500 includes a rear deflector, herein referred to as a louver 502. The louver 502 may be positioned on an opposite side of the cleaning system 500 from the chopper 76, and the louver 502 may be positioned at least partially lower than the housing inlet 212 to prevent billets from overshooting a basket 516. The louver 502 may have a front surface 504 and a rear surface 506 with one or more sensors 518 coupled to the front surface 504 to detect billet impact. The louver 502 may be removably coupled to the cleaning system 500. In one implementation, the louver 502 may be removably coupled to the exterior of a primary cleaner housing 514, however the louver 502 may also be coupled to the interior of the primary cleaner housing 514. The louver 502 may be positioned within the flow path of a material, such that the material, such as crop billet B, impacts the louver 502 and is physically redirected by the contact. The physical contact between the material and the louver 502 may direct the material to the basket 512. More specifically, the material may impact the one or more sensors 518 coupled to the louver 502.

The one or more sensors 518 may be coupled to a power source. In one implementation, the power source may be a battery, such as, for example, a hardwired connection to a battery of the harvester 10. In another implementation, the power source may be piezoelectric energy harvesting, thermoelectric energy harvesting, solar power, wind power, or any other method of generating power to a sensor known in the art. In one implementation the one or more sensors 518 may be a mass flow sensor and the one or more sensors 518 may detect crop material that has impacted the one or more sensors 518. After impacting the one or more sensors 518, the material may subsequently be directed into the basket 516. In some examples, the one or more sensors 518 may include one or more of accelerometers, pressure bladders, strain gauges, piezo microphones, reed switches, threshold detectors, frequency key matching sensors, frequency filtering sensors, time at level sensors, neural nets, capacitive sensors, electromagnetic near field interference sensors, impact plates, force plates, load cells, or any other sensors known in the art.

The one or more sensors 518 may be communicatively coupled to a controller. The one or more sensors 518 may detect an impact and transmit a signal to the controller. The controller may receive the signal, assess loading of the louver 502 relative to predetermined criteria, and execute a corresponding response strategy. In one implementation, the controller may be located on or in the harvester 10. However, in other implementations, the controller may be remote from the harvester 10. The controller may be wirelessly coupled to the one or more sensors 1202 (see FIG. 12). In another implementation, the controller may be hardwired to the one or more sensor 1202. The predetermined criteria may include one or more of a threshold value and an optimal loading zone. The threshold value may indicate that disproportionate material is impacting one zone of the louver 502. The optimal loading zone may be a zone on the louver 502 which material is directed towards. The assessment of the loading may include determining how many impacts occurred in each zone, whether the impacts in any zone reached the threshold value or rate, and whether the zone that reached the threshold value or rate was the optimal zone. The corresponding response strategy that may be executed may include providing one or more of a first response (a Tier 1 response), a second response (i.e., a Tier 2 response), a third response (i.e., a Tier 3 response), or no response. An example of different Tier responses when the threshold is detected in Zone 1 (see FIG. 12) are shown in Table 1 below.

TABLE 1

Tier Responses Example (Threshold Reached in Zone 1)

A. Tier 1 Adjustment

1) Decrease Deflector Angle
2) Increase Deflector Length
3) Decrease Fan Speed

B. Tier 2 Adjustment

1) Decrease Harvesting Speed
2) Decrease Chopper Speed

TABLE 1-continued

Tier Responses Example (Threshold Reached in Zone 1)

C. Tier 2 Adjustment

1) Decrease Manifold Pressure

Each sensor 1202 may detect an impact from material. In some implementations, each sensor 1202 may detect the force applied by the material on the sensor 1202. The one or more sensors 1202 may be coupled to a controller. In one implementation, the controller may be located on or in the harvester 10, however the controller may also be remote from the harvester 10. The controller may be wirelessly coupled to the one or more sensors 1202. In another implementation, the controller may be hardwired to the one or more sensor 1202. The controller may receive the signal from the one or more sensors 1202, assess the loading of the billet deflector relative to predetermined criteria, and execute a corresponding response strategy or method. The controller may include a memory unit and processor unit. The memory unit may be capable of storing algorithms, processes, programs, software, look up tables, data, charts, diagrams, etc.

Still referring to FIG. 11, there may be an air void near the louver 502 because the louver 502 may at least partially block or alter the flow of air. This may be detrimental because some extraneous plant matter may not be separated from the crop billet B due to this air void. The air void on the rear of the basket/collection chamber prevents sufficient airflow from contacting the incoming mat of cane. This can decrease the probability of billet leaf separation as the cane mat approaches the louver and enters the basket. Therefore, a supplemental air attachment 520, may be coupled to the harvester 10 in the vicinity of the billet impact zone associated with the louver 502 to promote separating the extraneous plant matter from the crop billet B. The supplemental air attachment 520 may include an air compressor, a blower, a fan, or any other mechanism that may compress, or move air.

Figure 12:
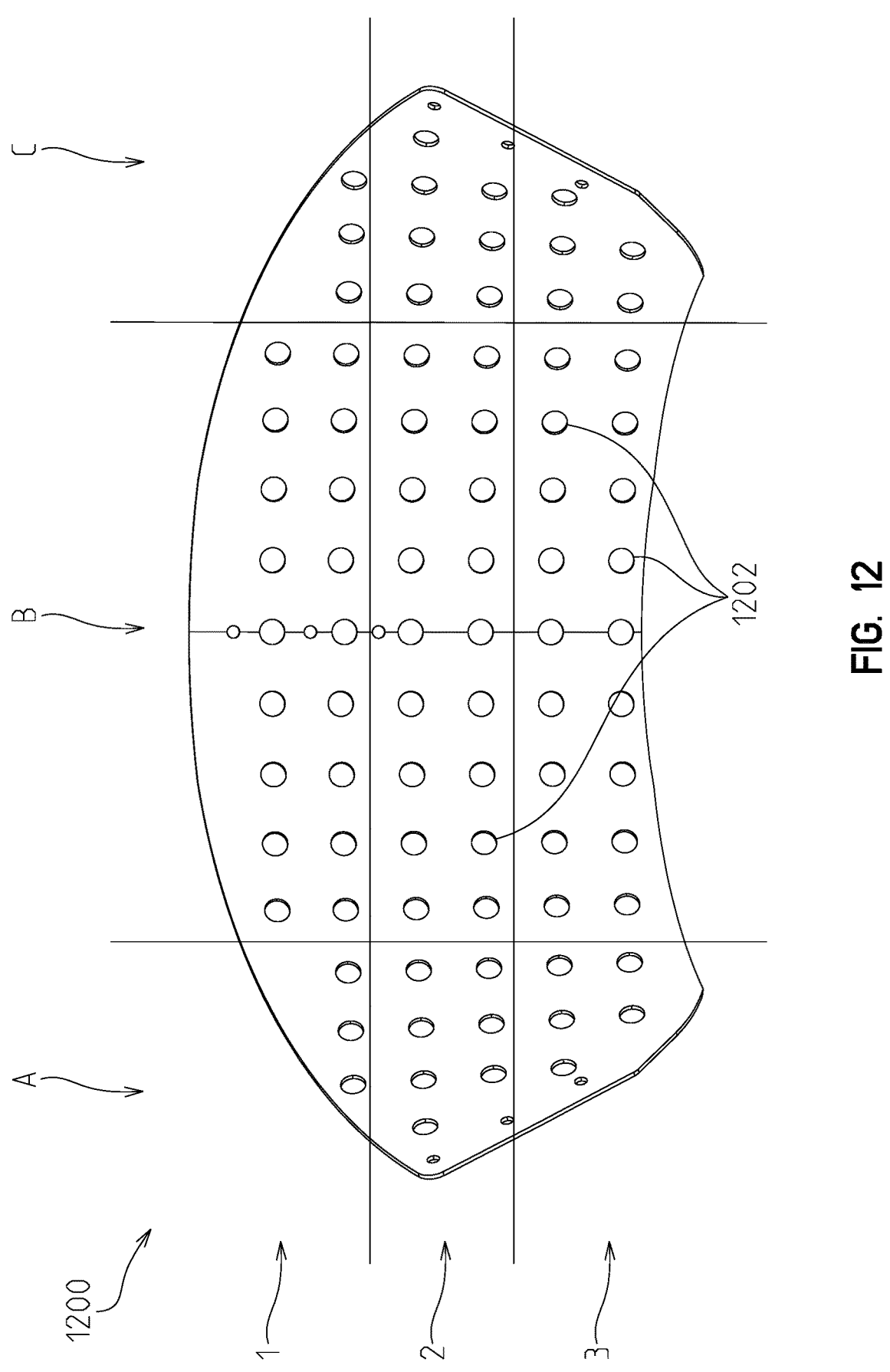
FIG. 12 is a front view of the louver with sensors and without the supplemental air attachment.

FIG. 12 illustrates a louver 1200 with one or more sensors 1202. In this implementation, the louver 1200 with one or more sensors 1202 may be separated into different zones. For example, the louver 1200 may be separated into a top horizontal zone 1 as illustrated by arrow 1 in FIG. 12 (hereinafter "zone 1"), a bottom horizontal zone 3 as illustrated by arrow 3 in FIG. 12 (hereinafter "zone 3") located below zone 1, and a middle horizontal zone 2 as illustrated by arrow 2 in FIG. 12 (hereinafter "zone 2") located between zone 1 and zone 3. In other examples, there may be less than three horizontal zones. In some examples, there may be more than three horizontal zones. The louver 1200 may also be separated into vertical zones, such as vertical zone A as illustrated in by arrow A in FIG. 12 (hereinafter "zone A"), vertical zone B as illustrated by arrow B in FIG. 12 (hereinafter "zone B") and vertical zone C as illustrated by arrow C in FIG. 12 (hereinafter "zone C").

The horizontal zones may intersect with the vertical zones. For example, in FIG. 12, zone 1 may intersect with zone A, and this area of the louver 1200 may be referred to as zone 1A. Zone 1 may also intersect with zone B, and this area of the louver 1200 may be referred to as zone 1B. Zone 1 may also intersect with zone C, and this area of the louver 1200 may be referred to as zone 1C. Similarly, zone 2 may intersect with the vertical zones. Zone 2 may intersect with zone A, and this area of the louver 1200 may be referred to as zone 2A. Zone 2 may also intersect with zone B, and this area of the louver 1200 may be referred to as zone 2B. Zone 2 may also intersect with zone C, and this area of the louver 1200 may be referred to as zone 2C. Finally, Zone 3 may intersect with the vertical zones. For example, zone 3 may intersect with zone A, and this area of the louver 1200 may be referred to as zone 3A. Zone 3 may also intersect with zone B, and this area of the louver 1200 may be referred to as zone 3B. Zone 3 may also intersect with zone C, and this area of the louver 1200 may be referred to as zone 3C.

Although the illustrative implementation of FIG. 12 has three horizontal zones, other implementations may include one horizontal zone, two horizontal zones, four horizontal zones, or five or more horizontal zones. Likewise, while FIG. 12 has three vertical zones, other implementations may include one vertical zone, two vertical zones, four vertical zones, or five or more vertical zones. While FIG. 12 illustrates the zones with a particular number of sensors 1202 in each zone, other implementations may have a different number of sensors in each zone. In other words, any of the zones may include zero sensors 1202, one sensor 1202, or more than one sensor 1202. In one example, the array of sensors 1202 may be positioned in one or more rows. In some examples, the array of sensors 1202 may be positioned in one or more columns. In another implementation, the one or more sensors 1202 may be positioned such that they are not in a row or column configuration. In one implementation, the louver may have an optimal zone and the optimal zone may be located at or near the middle of the louver 1200. Directing billet B to impact the optimal zone of the louver 1200 may promote cleaning extraneous plant matter from the crop billet B. In FIG. 12, for example, the optimal zone may include zone 2B. The optimal zone is defined as a location on the louver 1200 where there is a balance between billet losses and trash or extraneous material extraction.

Figure 12A:
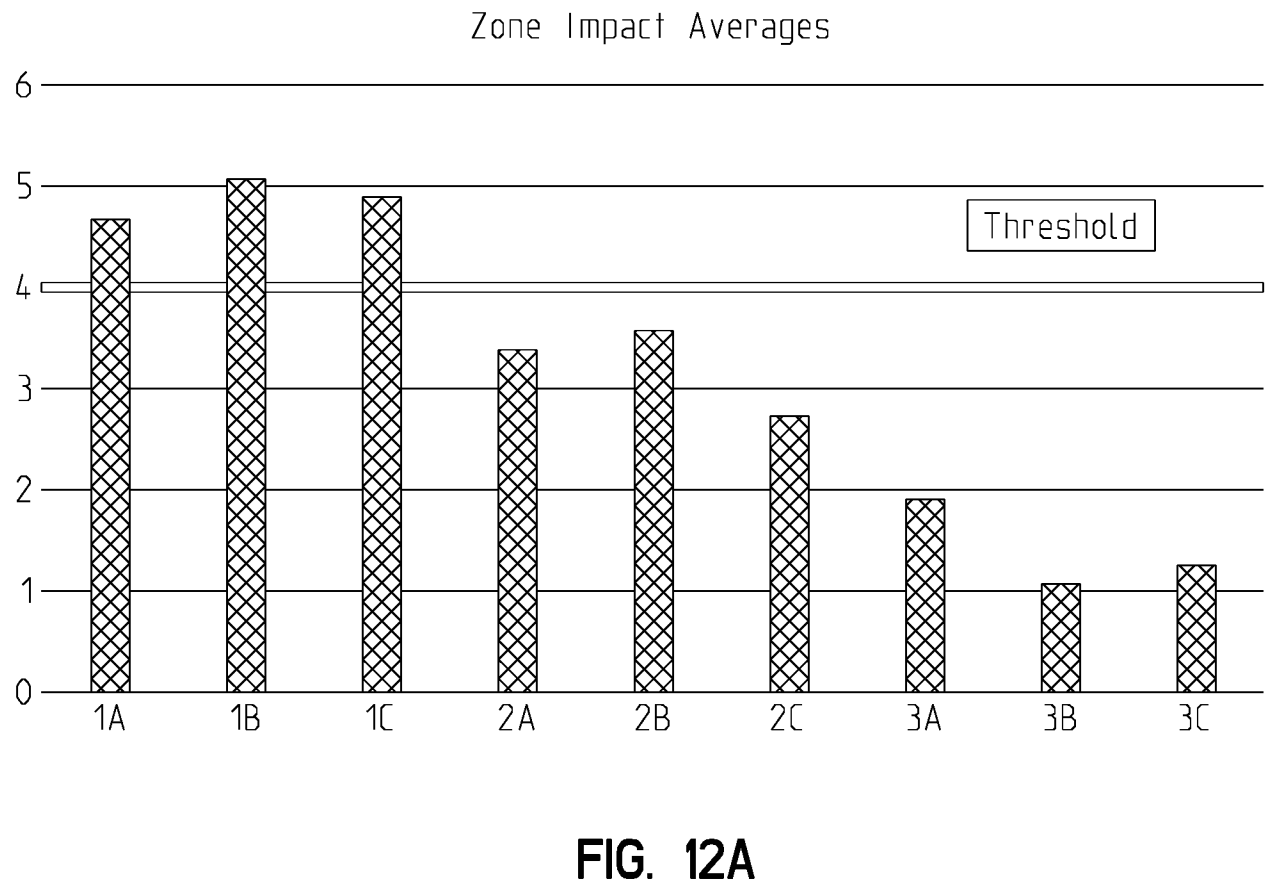

In FIG. 12A, a schematic illustrating the number of impacts sensed by the sensors 1202 in each zone is shown. The zones are reflective of those shown in FIG. 12, i.e., zone 1A, 1B, 1C, 2A, 2B, 2C, 3A, 3B, and 3C. The optimal zone may be defined in one example as zone 2B. In other implementations, the optimal zone may be one or more of the zones in FIG. 12A. As shown in the example of FIG. 12A, the majority of the impacts are in the upper portion of the louver identified by zones 1A, 1B, and 1C, whereas the lowest impact is in the lower portion of the louver identified as zones 3A, 3B, and 3C. A target threshold is shown in FIG. 12A. A trigger or alert can be triggered based on the number of impacts relative to the target threshold, as described further below.

Figure 13:
FIG. 13 is a front view of the louver with sensors and the supplemental air attachment.

FIG. 13 illustrates one implementation of a louver 1300 with one or more sensors 1302 and a supplemental air attachment 1304 coupled to a bottom end or portion 1308 of the louver 1300. In one example, the supplemental air attachment 1304 may have a length 1314 that extends from a first side or portion 1310 of the louver to a second side or portion 1312 of the louver 1300. In one example, the length 1314 of the supplemental air attachment 1304 may extend beyond one or more of the first side 1310 or the second side 1312. The length of the bottom end or portion 1308 of the louver may be defined by the distance between the first side 1310 and the second side 1312 of the louver. In some implementations, the length 1314 of the supplemental air attachment 1304 may be shorter than the length of the bottom end 1308 of the louver 1300. In one example, the length 1314 of the supplemental air attachment 1304 may be between 75-90% of the length of the bottom end 1308 of the louver 1300. In another example, the length 1314 of the supplemental air attachment 1304 may be between 50-75% the length of the bottom end 1308 of the louver 1300. In still another example, the length 1314 of the supplemental air attachment 1304 may be less than 50% the length of the bottom end 1308 of the louver 1300. In some implementations, the supplemental air attachment may or may not encompass the entire circumference, perimeter, or outer edge of the cleaning chamber. In other implementations, the supplemental air attachment may partially encompass the circumference, perimeter, or outer edge of the cleaning chamber.

The supplemental air attachment 1304 may be a fan. The supplemental air attachment 1304, for example, may be on and blowing air, or off and not blowing air. In some implementations, the supplemental air attachment 1304 may blow air at more than one speed. In some examples, the supplemental air attachment 1304 may be moveably coupled to the louver 1300, such as, for example, pivotally or rotatably coupled to the louver 1300. In other examples, the supplemental air attachment 1304 may be fixedly coupled to the louver 1300 such that the supplemental air attachment 1304 does not pivot or rotate.

Figure 14:
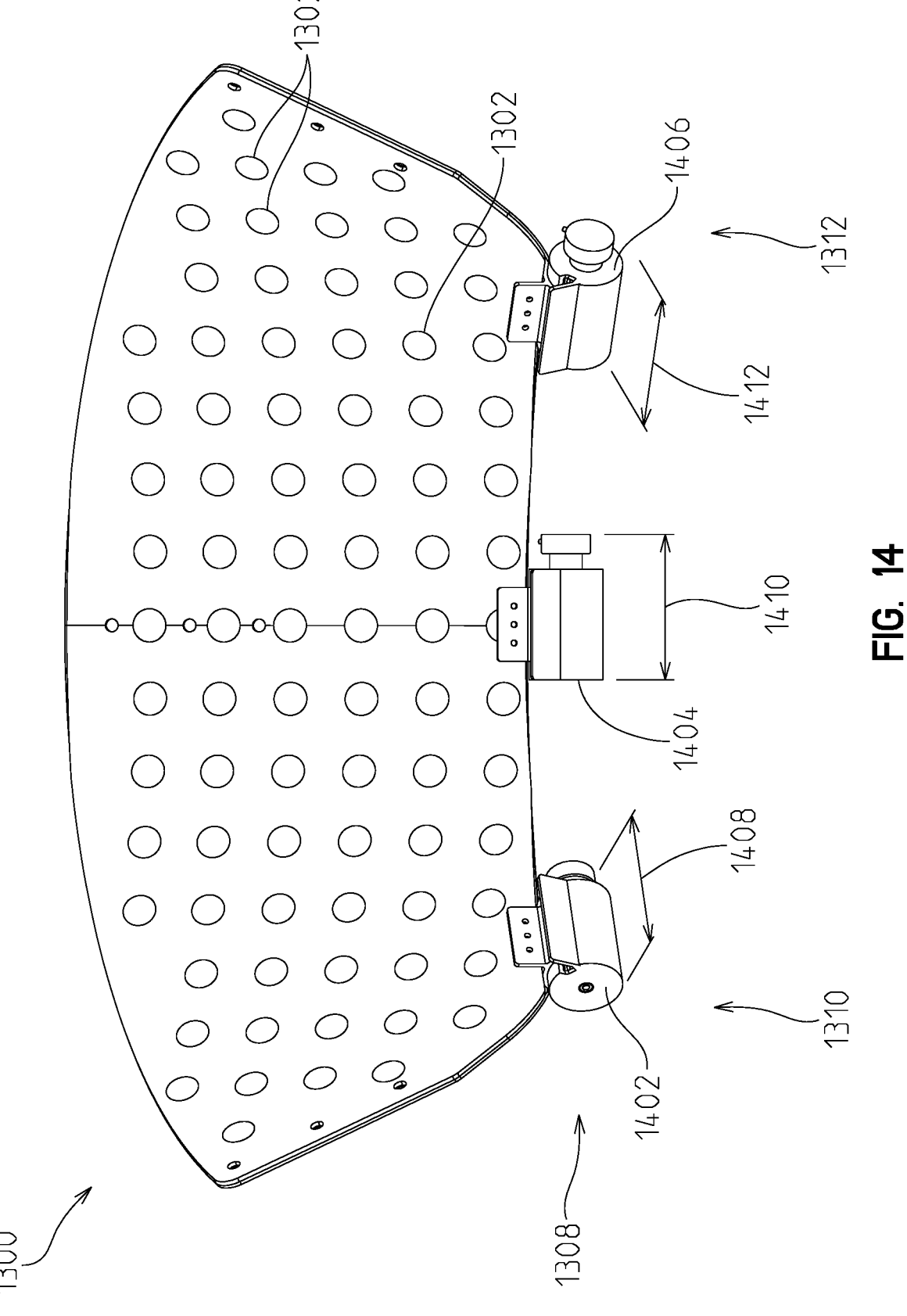
FIG. 14 is a front view of a second implementation of the louver with sensors and the supplemental air attachment.

Referring now to FIG. 14, the louver 1302 may have one or more sensors 1302, and the bottom end 1308 of the louver 1302 may be coupled to more than one supplemental air attachment 1402, 1404, and 1406. In one implementation, there may be two supplemental air attachments 1402, 1404. In another implementation, there may be three supplemental air attachments 1402, 1404, 1406. In some implementations, there may be four or five supplemental air attachments 1402, 1404, 1406. In still other implementations, there may be more than five supplemental air attachments 1402, 1404, 1406. The supplemental air attachments 1402, 1404, and 1406 may each be a fan. However, in other implementations, the supplemental air attachments 1402, 1404, 1406 may each be a charged air attachment (see FIG. 15). In still other implementations, one or more supplemental air attachments 1402, 1404, 1406 may be a fan and one or more supplemental air attachments 1402, 1404, 1406 may be a charged air attachment.

In the front portion of the cleaning chamber, i.e., near the chopping mechanism or chopper, there may be a manifold charged air apparatus for outputting an airflow into the cleaning chamber. In the rear portion of the cleaning chamber, i.e., near the louver 1302, there may be a charged or compressed air apparatus, a blower-style air source, a fan-style air source, or a cross-flow fan apparatus, among other known types of air sources.

In some implementations, all of the supplemental air attachments 1402, 1404, 1406 may be on and blowing air or may be off and not blowing air. In other implementations, one or more of the supplemental air attachments 1402, 1404, 1406 may be on and blowing air and one or more of the supplemental air attachments 1402, 1404, 1406 may be off and not blowing air. Each of the supplemental air attachments 1402, 1404, 1406 may blow air at the same speed or at different speeds. In one example, one supplemental air attachment 1402 may blow air at a first speed, and the other two supplemental air attachments 1404, 1406 may blow air at a second speed. In another implementation, each of the supplemental air attachments 1408, 1410, 1412 may blow air at different speeds. In some implementations, the speed of the supplemental air attachments 1408, 1410, 1412 may be adjustably controllable by a controller (not shown).

In one example, the supplemental air attachments 1402, 1404, 1406 may be blowing air at a first speed and an adjustment may be made. In this example, after the adjustment, the supplemental air attachments 1402, 1404, 1406 may blow air at a second speed. Alternatively, after the adjustment, one or more of the supplemental air attachments 1402, 1404, 1406 may blow air at a second speed and one or more of the supplemental air attachments 1402, 1404, 1406 may blow air at a third speed. In another example, after the adjustment by the controller, one or more supplemental air attachments 1402, 1404, 1406 may blow air at the first speed, one or more supplemental air attachments 1402, 1404, 1406 may blow air at the second speed, and one or more of the supplemental air attachments 1402, 1404, 1406 may blow air at the third speed. In still another example, after the adjustment, one or more supplemental air attachments 1402, 1404, 1406 may be off and one or more supplemental air attachments 1402, 1404, 1406 may operate at either the first speed or a different speed. Different fan speeds are necessary to control loads on the louver.

In another example, one or more supplemental air attachments 1402, 1404, 1406 may blow air at a first speed, one or more supplemental air attachments 1402, 1404, 1406 may blow air at a second speed, and an adjustment may be made by a controller or operator of the harvester 10. In this example, after the adjustment, all of the supplemental air attachments 1402, 1404, 1406 may blow air at a first speed, or all of the supplemental air attachments 1402, 1404, 1406 may blow air at a second speed. Alternatively, after the adjustment, one or more of the supplemental air attachments 1402, 1404, 1406 may blow air at a second speed and one or more of the supplemental air attachments 1402, 1404, 1406 may blow air at a third speed. In another example, after the adjustment, one or more supplemental air attachments 1402, 1404, 1406 may blow air at the first speed, one or more supplemental air attachments 1402, 1404, 1406 may blow air at the second speed, and one or more of the supplemental air attachments 1402, 1404, 1406 may blow air at the third speed. In still another example, after the adjustment, one or more supplemental air attachments 1402, 1404, 1406 may be off and one or more supplemental air attachments 1402, 1404, 1406 may operate at either the first speed, the second speed, or at another speed that is not the first or second speed.

In still another example, an adjustment to the speed may be made as one supplemental air attachment 1402 blows air at a first speed, one supplemental air attachment 1404 blows air at a second speed, one supplemental air attachment 1406 blows air at third speed. In this example, after the adjustment all of the supplemental air attachments 1402, 1404, 1406 may blow air at a first speed, all of the supplemental air attachments 1402, 1404, 1406 may blow air at a second speed, or all of the supplemental air attachments 1402, 1404, 1406 may blow air at the third speed. Alternatively, after the adjustment, one or more of the supplemental air attachments 1402, 1404, 1406 may blow air at a first, second, or third speed and one or more of the supplemental air attachments 1402, 1404, 1406 may blow air at a fourth speed. In another example, after the one or more supplemental air attachments 1402, 1404, 1406 may blow air at the first speed, one or more supplemental air attachments 1402, 1404, 1406 may blow air at the second speed, and one or more of the supplemental air attachments 1402, 1404, 1406 may blow air at the third speed. In still another example, after the adjustment one or more supplemental air attachments 1402, 1404, 1406 may be off and one or more supplemental air attachments 1402, 1404, 1406 may operate at either the first speed, the second speed, the third speed, or at another speed that is not the first, second speed, or third speed.

The supplemental air attachments 1402, 1404, 1406 may have corresponding lengths 1408, 1410, 1412. In one example, the lengths 1408, 1410, 1412 of the supplemental air attachments 1402, 1404, 1406 may be equal. In another example, one or more supplemental air attachments 1402, 1404, 1406 may have a different length than another one of the supplemental air attachments 1402, 1404, 1406. In one example, the combined length of the supplemental air attachments 1402, 1404, 1406 may equal the length of the bottom end 1308 of the louver 1300. In another example, the combined length of the supplemental air attachments 1402, 1404, 1406 may be less than the length of the bottom end 1308 of the louver 1300. In still another example, the combined length of the supplemental air attachments 1402, 1404, 1406 may be greater than the length of the bottom end 1308 of the louver.

Figure 15:
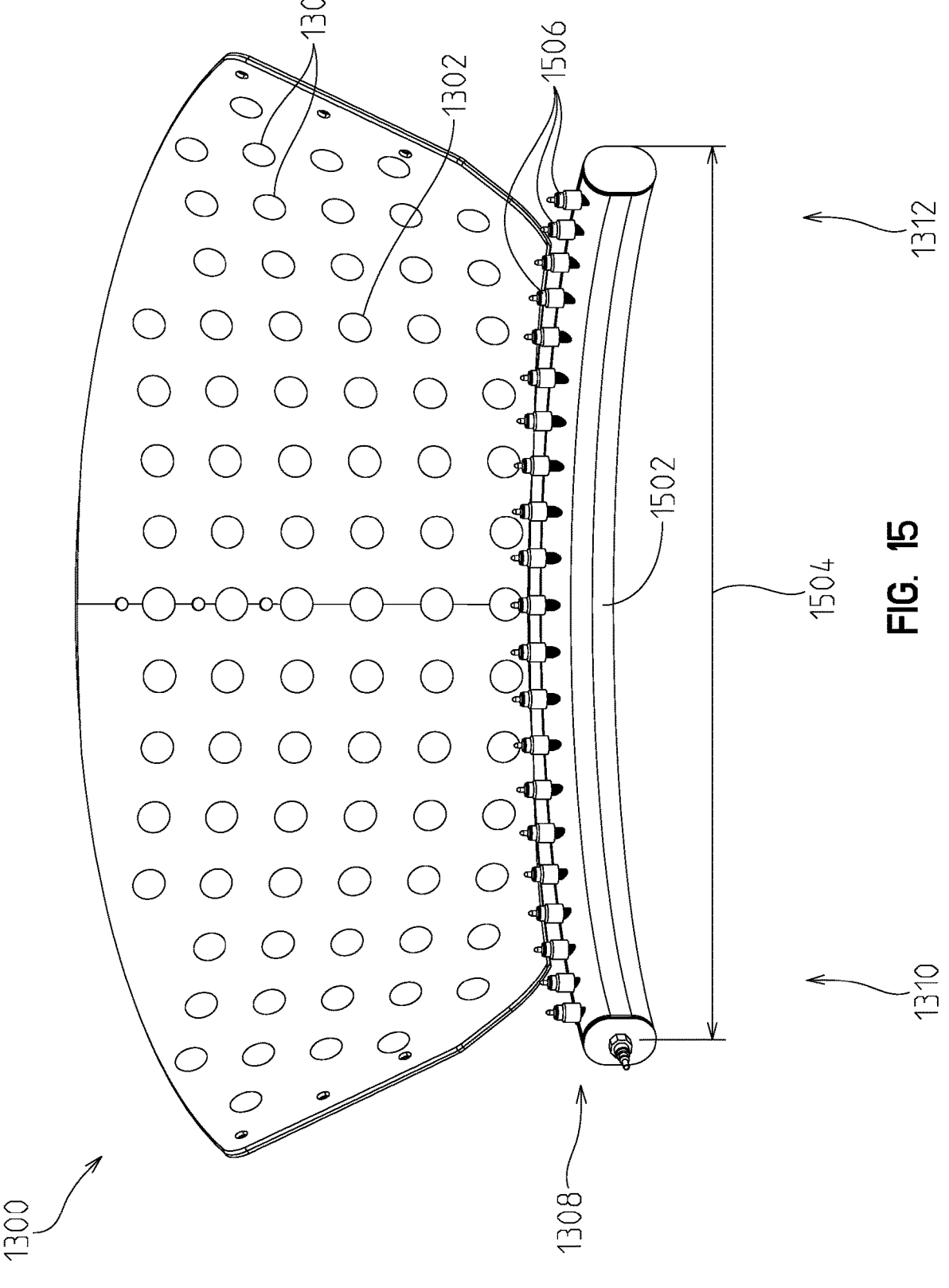
FIG. 15 is a front view of a third implementation of the louver with sensors and the supplemental air attachment.

Referring now to FIG. 15, a louver 1300 with sensors 1302 may be coupled to a charged air attachment 1502 at the bottom end 1308 of the louver 1300. Charged air refers to air that is compressed or pressurized. The charged air attachment 1502 may have one or more nozzles 1506 and the charged air may exit the one or more nozzles 1506 thereby promoting cleaning the extraneous plant matter from the crop billet B. The one or more nozzles 1506 may be positioned to point in an upward direction. In some implements the one or more nozzles 1506 may point towards the fan 108 (see FIG. 1C).

In some implementations, the charged air attachment 1502 may have one or more nozzles 1506. For example, in one such implementation, the charged air attachment 1502 may have up to five nozzles 1506. In other implementations, the charged air attachment 1502 may have up to ten nozzles 1506. In other implementations, the charged air attachment 1502 may have up to fifteen nozzles 1506. In some implementations, the charged air attachment 1502 may have up to twenty nozzles 1506. In some other implementations, the charged air attachment 1502 may have up to twenty-five nozzles 1506. In other implementations, the charged air attachment 1502 may have more than twenty-five nozzles 1506. In several implementations, the charged air attachment 1502 includes a plurality of nozzles 1506.

In one example, the one or more nozzles 1506 may all either be on or off. A solenoid (not shown), for example, may electronically control whether the nozzle 1506 is on or off. In some implementations, each nozzle 1506 may be individually controlled to turn on or off. In some implementations, two or more nozzles 1506 may be linked or fluidly coupled such that when one of the two or more fluidly coupled nozzles 1506 is on, the other fluidly coupled nozzles 1506 is on. Moreover, when one of the fluidly coupled nozzles 1506 is off, the other fluidly coupled nozzles 1506 are off. In some implementations, the air or other fluid may be discharged or sprayed from each nozzle 1506 at the same fluid velocity. In one implementation, each nozzle 1506 may individually adjust the fluid velocity at which air is released from the nozzle 1506. In other implementations, two or more nozzles 1506 may be fluidly coupled, so that the fluid velocity of the air or fluid in one of the fluidly coupled nozzles 1506 is the same as the fluid velocity of the air released from the other fluidly coupled nozzles 1506.

The one or more nozzles 1506 may be moveable relative to the charged air attachment 1502. In one implementation, each nozzle 1506 may be fluidly coupled, such that if one nozzle 1506 moves every nozzle 1506 correspondingly moves. In other implementations, two or more nozzles 1506 may be fluidly coupled such that when one of the fluidly coupled nozzles 1506 moves each of the other fluidly coupled nozzles 1506 move correspondingly. In some implementations, each nozzle 1506 may independently movable. In some implementations, the one or more nozzles 1506 may be automatically moved via a controller. For example, a controller may energize a solenoid to actuate or move the one or more nozzles 1506. In another implementation, the one or more nozzles 1506 may be moved by the command or control of an operator. By adjusting each nozzle, e.g., its orientation or angle, can allow for the nozzle to dispense a unique or individual airflow that is independent relative to the other nozzles. This further assists with interrupting the incoming crop billets and can better shear off the leaf from the billets prior to contacting the louver.

In one example, the charged air attachment 1502 may have a length 1504 that extends from the first side 1310 of the louver 1300 to the second side 1312 of the louver 1300. In one example, the length 1504 of the charged air attachment 1502 may extend beyond one or more of the first side 1310 or the second side 1312. The length of the bottom end 1308 of the louver may be defined by the distance between the first side 1310 and the second side 1312 of the bottom end 1308 of the louver. In some implementations, the length 1504 of the charged air attachment 1502 may be shorter than the length of the bottom end 1308 of the louver 1300. In one example, the length 1504 of the charged air attachment 1502 may be between 75-90% of the length of the bottom end 1308 of the louver 1300. In another example, the length 1504 of the charged air attachment 1502 may be between 50-75% the length of the bottom end 1308 of the louver 1300. In still another example, the length 1504 of the charged air attachment 1502 may be less than 50% the length of the bottom end 1308 of the louver 1300.

Figure 16:
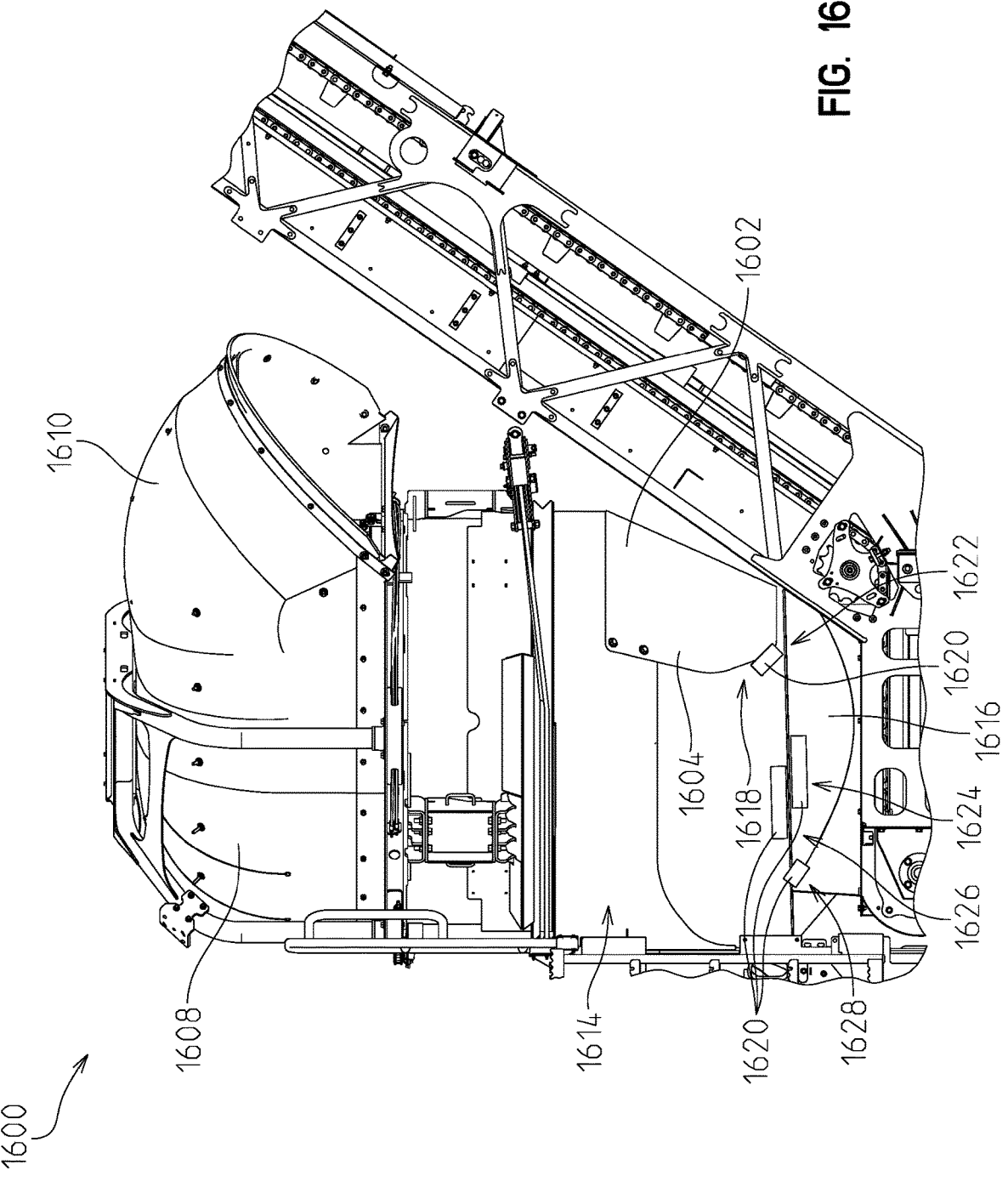
FIG. 16 is a side view of a portion of the sugarcane harvester of FIG. 1 illustrating four charged air attachment positions.

In FIG. 16, an implementation of a cleaning system 1600 is shown including a primary separator 1610, a primary hood 1608, a primary cleaner housing 1614, a louver 1602, and a basket 1616. Here, the basket 1616 is located beneath the primary cleaner housing 1614. The louver 1602 includes a front surface 1604 with one or more sensors 1618 coupled to the front surface 1604. The louver 1602 may be removably coupled to the primary cleaner housing 1614 in some implementations. Moreover, the louver 1602 may be positioned within a flow path of material that enters the primary cleaning chamber 1614 after being chopped by a chopper, such that the material (e.g., crop billet B and other material or debris) contacts the louver 1602 and is redirected by the contact with the louver 1602 to move towards the basket 1616. The physical contact between the material and the louver 1602 directs the material to the basket 1616. As the material contacts the louver 1602, the material may impact one or more sensors 1618 coupled to the front surface 1604 of the louver 1602. As the billet and leaf contact the louver 1602, the leaf and billet may be separated from one another. By introducing the air, the separation of the leaf from the billet due to the airflow may preclude the leaf from reaching the basket.

In one implementation, a charged air attachment 1620 may be disposed in a first position 1622. In the first position 1622, the charged air attachment 1620 may be located below and partially in front of the louver 1602. In some implementations, the charged air attachment 1620 may be coupled to the basket 1616 in a second position 1624, a third position 1626, or a fourth position 1628. As illustrated in FIG. 16, the second and third positions 1624, 1626 may be located on opposite sides of the basket 1616. In the fourth position 1628, the charged air attachment 1620 may be located towards a front portion of the basket 1616. In one example, the charged air attachment 1620 may be located at the second, third, or fourth position 1624, 1626, 1628 where the charged air attachment 1620 may be coupled to the inside of the basket 1616. In another example, the charged air attachment 1620 may located at the second, third, or fourth position 1624, 1626, 1628 and coupled to the top of the basket 1616. In yet another example, the charged air attachment 1620 may located at the second, third, or fourth position 1624, 1626, 1628 and coupled to the outside of the basket 1616. In some implementations, the charged air attachment 1620 may be located at any number of positions including, but not limited to, the first, second, third, and fourth positions. In several implementations, the charged air attachment 1620 may be coupled at one or more locations on the louver 1602, the basket 1616, and the cleaning housing 1614.

In one implementation, the harvester 10 may have one charged air attachment 1620. In another implementation, the harvester 10 may have two charged air attachments 1620. In some implementations, the harvester 10 may have three charged air attachments 1620. In one implementation, the harvester 10 may have four charged air attachments 1620. In other implementations, the harvester 10 may have a plurality of charged air attachments 1620. The charged air attachment 1620 may be removably coupled to the harvester 10. In some implementations, the charged air attachment 1620 may be controllably moveable via a controller such that a charged air attachment 1620 may be moved between the first, second, third, and fourth positions 1622, 1624, 1626, 1628. In one implementation, the charged air attachment 1620 may be pivotally movable relative to the harvester 10. In another implementation, the charged air attachment 1620 may be rotatably movable relative to the harvester 10. In some implementations, a controllable mechanism such as an actuator may be operably controlled to the move the charged air attachment 1620. The actuator may be a linear actuator, an electric actuator, a mechanical actuator, a hydro-mechanical actuator, a rotary actuator, an electro-mechanical actuator, or any other known type of actuator. In other examples, a gear and pinion system may be used to move the charged air attachment 1620. In still other examples, a track may be formed along which the charged air attachment 1620 is movable via a motor (e.g., an electric or hydraulic motor).

Figure 17B:
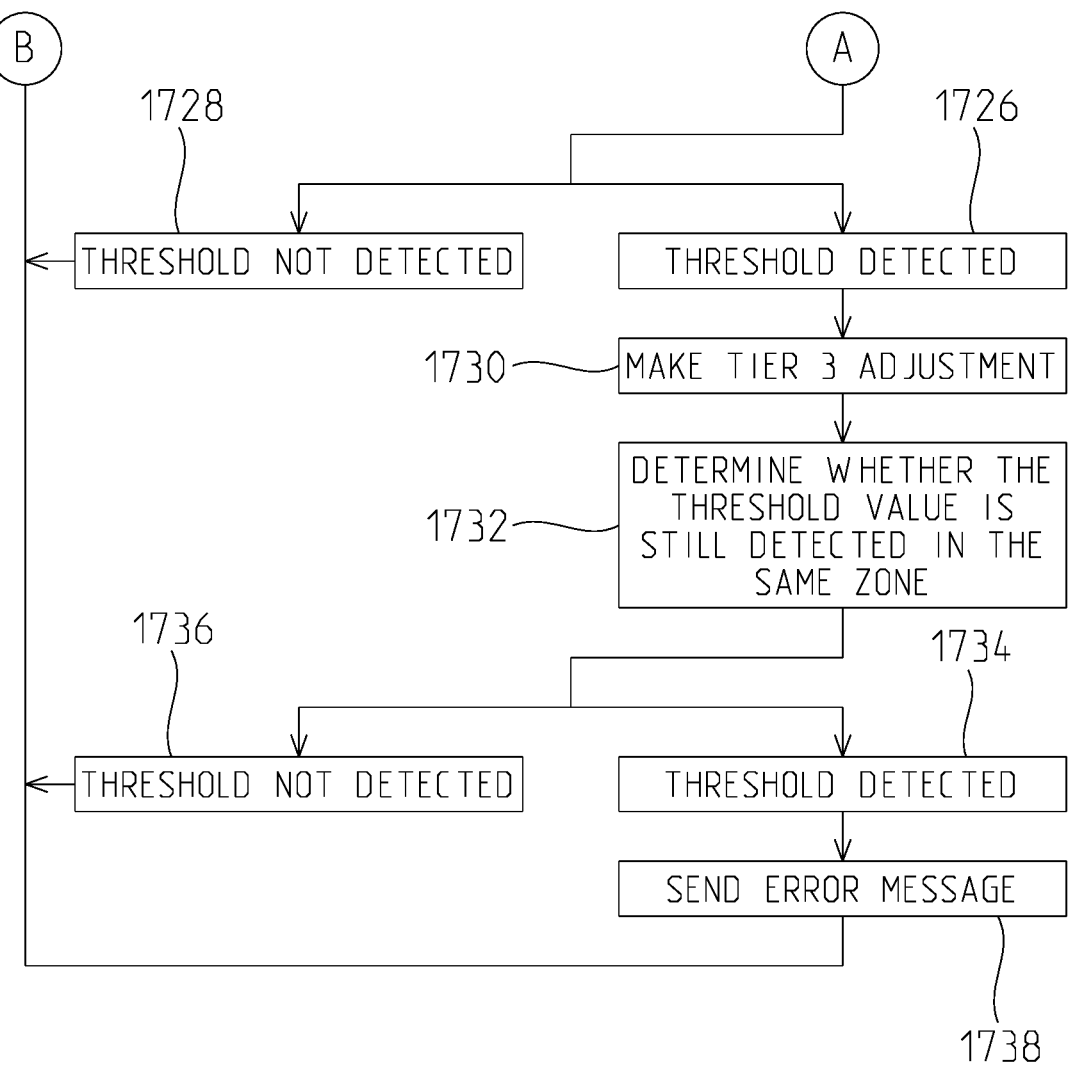
FIG. 17 is a block diagram illustrating one implementation of a method for adjusting crop impact on a louver to promote separating extraneous plant matter from crop billet B.

Turning to FIG. 17, a method 1700 for adjusting crop impact on a louver (e.g., any of the aforementioned louvers) to promote separating extraneous plant matter from crop billet B. The method 1700 may include a set of instructions or blocks that are executable by a controller or operator of a harvester. The controller may be located on the harvester or remote therefrom. In some implementations, the method 1700 may include additional or fewer blocks. In another implementation, the blocks may be executed in a different order.

The method 1700 begins at block 1702 where a threshold value may be set. The threshold value may be representative that one or more zones on the louver are being disproportionally impacted by the material relative to other zones on the louver (i.e., see FIG. 12A for disproportionate zone impact). In other words, the threshold value may be a value, a percentage, etc. The threshold value may be set, for example, by an operator. In some implementations, the threshold value may be automatically set by a controller. In yet other implementations, the threshold value may be predetermined and stored in software or an algorithm which is executable by a processing unit (processor) of the controller. Once the threshold value is set, the method 1700 proceeds to block 1704.

In block 1704, the number of impacts in each zone is determined. To measure the number of impacts in each zone, each sensor on the louver may provide an output when it is impacted by material. The output from the sensor may include a location identifier corresponding to which zone was impacted by the material. In one example, the output may include the location of the impact on the louver. The sensor may send the output to a controller. The controller receives the output from the sensor and determines how many impacts have occurred in each zone on the louver. The number of impacts may be determined by the controller over a predetermined amount of time, for example. After block 1704, the method 1700 advances to block 1706.

In block 1706, the controller calculated the average number of impacts in each zone on the louver. The average may be calculated by dividing the number of impacts in a corresponding zone by the number of sensors in that zone. In one implementation, the average may be calculated over a predetermined period of time (e.g., one second, several seconds, a minute, etc.), and after that period of time the average for each zone may reset. As described above, the controller or an operator may adjust the period of time at any time. After block 1706 is performed, the method 1700 advances to block 1708.

In block 1708, the controller may determine whether the threshold value has been detected in any of the zones. In one example, the controller may determine whether a threshold value has been detected in any zone by comparing the average number of impacts in each zone (calculated in block 1706) with the threshold value that was set in block 1702. In another example, the controller may determine whether a threshold value has been detected by comparing the threshold value to a total number of impacts in each zone within a predetermined time period. If the threshold has not been detected, or the threshold has only been detected in the optimal zone, then the method may proceed to block 1712. Alternatively, if the controller has detected the threshold in one or more zones outside of the optimal zone in block 1710, then the method 1700 may proceed to block 1714.

In block 1712, the controller did not detect the threshold value in any zone outside of the optimal zone and the method 1700 may return to block 1704 where the controller measures the number of impacts in each zone. Alternatively, if the threshold was detected in one or more zones outside of the optimal zone in block 1710, rather than proceeding to block 1712, the method 1700 proceeds to block 1714.

In block 1714, the controller may make one or more Tier 1 adjustments. The Tier 1 adjustment that is selected may be determined based on where the threshold value was detected. In one example, zone 2 may be an optimal zone and zone 1 or zone 3 may detect the threshold value. This may indicate that excessive material is impacting the louver 1200 at a location that is either above or below the optimal zone of the louver 1200 and a vertical adjustment may be advantageous. In this example, the one or more Tier 1 adjustments may include one or more of adjusting the billet deflector angle, altering the billet deflector length, or modifying the fan speed. In another example, zone E may be an optimal zone and zone D or zone F may detect the threshold value. This may indicate that excessive material is impacting the louver 1200 towards the first end 1710 or the second end 1712 relative to the optimal zone of the louver 1200, and a horizontal adjustment may be advantageous. In this example, the one or more Tier 1 adjustments may include adjusting the nozzle 1506 orientation. In another example, more than one zone may detect a threshold value. For example, zones 1D, 1E, and 2E may detect a threshold value and zone 2E may be the optimal zone. In this example, the one or more Tier 1 adjustments may include one or more of adjusting the billet deflector angle, altering the billet deflector length, modifying the fan speed, or adjusting the nozzle 1506 orientation.

The one or more Tier 1 adjustments may include incrementally performing the one or more adjustments. For example, the controller may alter the billet deflector length by two centimeters, determine that the threshold value is still detected in the same zone, and alter the billet deflector length by another two centimeters. Additionally, the controller may adjust the one or more Tier 1 adjustments by varying increments. For example, after the controller alters the billet deflector length by two centimeters, the controller may determine that the threshold value is still detected in the same zone, and further alter the billet deflector length by an additional length (e.g., one centimeter). In one example, the controller may make one Tier 1 adjustment, then determine whether the threshold value is still detected in the same zone. If the threshold value is still detected in that zone, then the controller may make a second Tier 1 adjustment. After making the second Tier 1 adjustment the controller may determine whether the threshold value is still detected in the same zone. If the threshold value is still detected in that zone, then the controller may make a third Tier 1 adjustment. In some examples, the controller may make more than three Tier 1 adjustments.

After making one or more Tier 1 adjustments, the method 1700 may proceed to block 1716. In block 1716, the controller determines whether the threshold value is still detected in the same zone after the one or more Tier 1 adjustments are made. The method 1700 may then proceed to block 1720 if the threshold value is not detected in the same zone in block 1716. After block 1720, the method 1700 returns to block 1704. Alternatively, instead of proceeding to block 1720, the method 1700 may proceed from block 1716 to block 1718 if the controller determines that the threshold value is still detected in the same zone after making one or more Tier 1 adjustments. After block 1718, the method proceeds to block 1722.

In block 1722, and referring to the previous implementations depicted in FIGS. 11-16, the controller may make one or more Tier 2 adjustments. The Tier 2 adjustment that is made may be selected based on where the threshold value was detected. In one example, zone 2 may be the optimal zone and zone 1 or zone 3 may detect the threshold value. This may indicate that excessive material is impacting the louver at a location that is either above or below an optimal zone of the louver, and a vertical adjustment to the impact zone may be advantageous. In this example, the one or more Tier 2 adjustments may include one or more of changing the harvesting speed, altering the fan speed, or modifying the chopper speed. In another example, zone E may be the optimal zone and zone D or zone F may detect the threshold value. This may indicate that excessive material is impacting the louver towards the first end or the second end relative to the optimal zone of the louver, and a horizontal adjustment may be advantageous. In this example, the one or more Tier 2 adjustments may include changing the airflow of the nozzle.

Similar to the Tier 1 adjustments, the Tier 2 adjustments may include incrementally performing the one or more aforementioned adjustments. For example, the controller may reduce the harvesting speed and the controller may then determine if the threshold value is still detected in the same zone. If so, the controller may further reduce the harvesting speed. In one implementation, the controller may make one Tier 2 adjustment, then determine whether the threshold value is still detected in the same zone. If the threshold value is still detected in that zone, then the controller may make a second Tier 2 adjustment. After making the second Tier 2 adjustment, the controller may determine whether the threshold value is still detected in the same zone. If the threshold value is still detected in that zone, then the controller may make a third Tier 2 adjustment. In some implementations, the controller may make more than three Tier 2 adjustments. After the one or more Tier 2 adjustments are made, the method 1700 may proceed to block 1724.

In block 1724, the controller may determine whether the threshold value has been detected in the same zone after the one or more Tier 2 adjustments are made. The method 1700 may then proceed to block 1728 if the threshold value is not detected in block 1724. After block 1728, the method 1700 returns to block 1704. Alternatively, instead of proceeding to block 1728, the method 1700 may advance from block 1724 to block 1726 if the controller determines that the threshold value is still detected after making the one or more Tier 2 adjustments. After block 1726, the method proceeds to block 1730.

In block 1730, the controller may make one or more Tier 3 adjustments. The one or more Tier 3 adjustments that is selected may be determined based on where the threshold value was detected. In one example, zone 2 may be an optimal zone and zone 1 or zone 3 may detect the threshold value. This may indicate that excessive material is impacting the louver at a location that is either above or below an optimal zone of the louver and a vertical adjustment to the impact zone may be advantageous. In this example, the one or more Tier 3 adjustments may include changing the nozzle airflow. In another example, zone E may be an optimal zone and zone D or zone F may detect the threshold value. This may indicate that excessive material is impacting the louver at a location that is right or left relative to the optimal zone of the louver, and a horizontal adjustment to the impact zone may be advantageous. In this example, the one or more Tier 3 adjustments may include adjusting the billet deflector angle or altering the deflector length. In another example, more than one zone may detect a threshold value. For example, zones 1D, 1E, and 2E may detect a threshold value and zone 2E may be the optimal zone. In this example, the one or more Tier 3 adjustments may include one or more of adjusting the nozzle airflow, adjusting the deflector angle, or altering the deflector length.

The one or more Tier 3 adjustments may include incrementally performing the one or more adjustments. For example, the controller may alter the billet deflector length and determine whether the threshold value is still detected in the same zone. If so, the controller may further alter the billet deflector length by an additional amount. In one example, the controller may make one Tier 3 adjustment, then determine whether the threshold value is still detected in the same zone. If the threshold value is still detected in that zone, then the controller may make a second Tier 3 adjustment. After making the second Tier 3 adjustment the controller may determine whether the threshold value is still detected in the same zone. If the threshold value is still detected in that zone, then the controller may make a third Tier 3 adjustment. In some examples, the controller may make more than three Tier 3 adjustments.

After making one or more Tier 3 adjustments, the method 1700 may proceed to block 1732. In block 1732, the controller determines whether the threshold value is still detected in the same zone after the one or more Tier 3 adjustments are made. The method 1700 may then proceed to block 1736 if the threshold value is not detected in block 1732. After block 1736, the method 1700 return to block 1704. Alternatively, instead of proceeding to block 1736, the method 1700 may proceed to block 1734 if the controller determines that the threshold value is still detected after making one or more Tier 3 adjustments. After block 1734, the method proceeds to block 1738.

In block 1738, the controller may display an error message on a display in the cab of the harvester 10 or send the error message to a remote location such as a laptop, mobile phone, or other device. After block 1738, the method may proceed to block 1704.

In FIGS. 18-24, an implementation is illustrated of a louver 1800 with one or more sensors 1802 coupled to a front side or portion 1822 of the louver 1800. The louver 1800 also includes a charged air attachment 1804 located near or at a bottom end or portion 1808 of the louver 1800. In this illustrative implementation, the charged air attachment 1804 may have one or more nozzles 1806 thereby promoting cleaning the extraneous plant matter from the crop billet B. The charged air attachment 1804 may have one or more coupling mechanisms 1814, 1816, 1818. The one or more coupling mechanisms 1814, 1816, 1818 may be coupled to one or more of a top portion, side portion, rear portion, or front portion of the charged air attachment 1804. The coupling mechanism may be one or more of a screw, bolt, bracket, washer, nut, adhesive, weld, or the like.

In the present disclosure, there may be different air sources used at different locations to promote leaf separation, enhance trash extraction, reduce billet losses, etc. In one example, charged or compressed air is a more concentrated, intense air stream emitted from air source that imparts on the incoming billet stream stronger impact forces that would allow the air flow to manipulate the trajectory of the billets and allow for the leaf to be separated from the billet. While higher forces are generated via the charged or compressed air, the air stream output is narrower and may not interact with as much material as intended on the mat. In another example, blowers and fans may be utilized in a broader application by impacting more of the material in the mat, but with lesser intensity than the charged or compressed air. As a result, the blower and fans may have less ability to dislodge the leaf from the incoming billet. In other examples, charged or compressed and crossflow (e.g., blowers or fans) may be used in combination to facilitate greater leaf extraction and billet cleaning.

Moreover, charged or compressed air may provide high intensity concentrated air streams with higher impact forces/ effective lengths. Axial or cross flow or prop driven fans may provide lower intensity streams with a wider, shorter coverage. Supplemental air in the rear portion of the cleaning chamber uses louver impact of billet leaf unit to further separate leaf trash from severed billets, eliminates an air void due to the louver, and provides for a low risk of billets losses in the rear portion due to a downward trajectory of cane mat. Supplemental air in the front portion of the cleaning chamber directs the cane mat into the extended deflector, and this impact with additional airflow promotes billet leaf separation. In the same way, the supplemental air in the front portion prevents the lower portion of the can mat from nose diving into the basket after the mat contacts the billet deflector. Once the crop is static, no further leaf separation occurs. Further, there is a lack of air voids on the front portion of the cleaning system. The supplemental air source will work in tandem with the extended billet deflector to promote billet leaf unit impacts on the louver.

In some implementations of the present disclosure, it is desirable to agitate the crop, promote the mat to travel the full trajectory, and to provide additional airflow at key spots along the trajectory. With supplemental air on the sides and periphery of the basket, this supplemental air will contribute to both the functionality of the rear and front air flows.

Figures 18, 19:
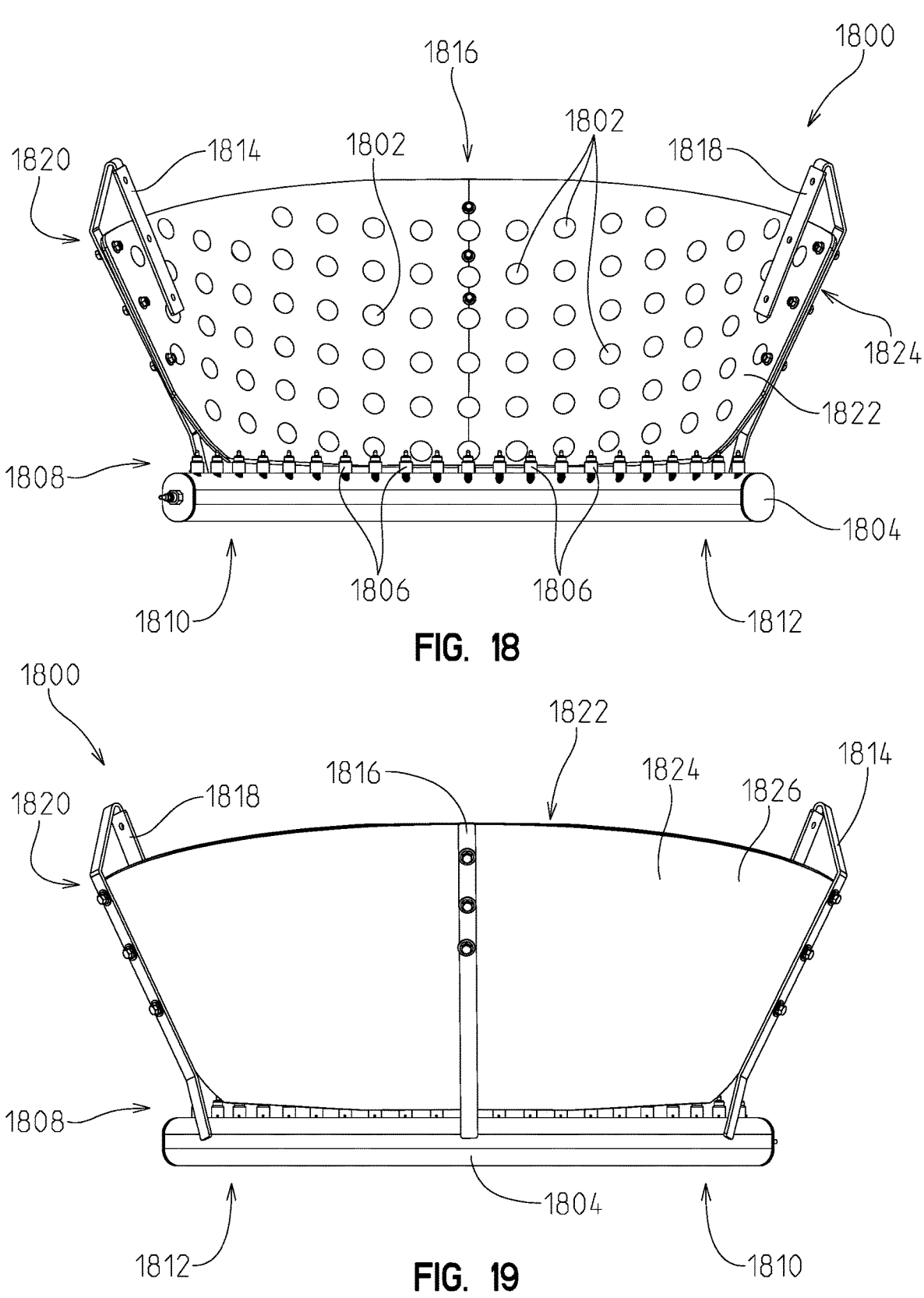
FIG. 18 is a front view of another implementation of the louver with one or more coupling mechanisms.
FIG. 19 is a rear view of one implementation of the louver of FIG. 18 with a rear cover.

As shown in the illustrative implementation of FIG. 18, the charged air attachment 1804 may have a first, second, and third coupling mechanism 1814, 1816, 1818. In this implementation, the first coupling mechanism 1814 may be located at a first side or portion 1810 of the louver 1800, the third coupling mechanism 1818 may be located at a second side or portion 1812 of the louver 1800, and the second coupling mechanism 1816 may be located between the first coupling mechanism 1814 and the third coupling mechanism 1818.

In some implementations, the charged air attachment 1804 may have one coupling mechanism 1814, 1816, 1818 that may couple the charged air attachment 1804 to the louver 1800. In these implementations, the coupling mechanism 1814 may be located at the first side or portion 1810 of the louver 1800, the second side or portion 1812 of the louver 1800, or at a location therebetween. In another implementation, there may be two coupling mechanisms 1814, 1816, 1818. In this implementation, one coupling mechanism may be located closer to the first side or portion 1810 of the louver 1800 and the other coupling mechanism may be located closer to the second side or portion 1812 of the louver 1800. In another example with two coupling mechanisms, one coupling mechanism may be positioned having the same distance between the first and second side or portion 1810, 1812 as the other coupling mechanism 1814. In this example, the two coupling mechanisms may be positioned similarly relative to the first and second sides or portions 1810, 1812 of the louver 1800, but the one or first coupling mechanism may be located closer to the bottom end or portion 1808 of the louver 1800 and the second or other coupling mechanism 1816 may be located closer to a top end or portion 1820 of the louver 1800. In other implementations, the one or more coupling mechanisms 1814, 1816, 1818 may extend beyond the first side or portion 1810 of the louver 1800, the second side or portion 1812 of the louver 1800, or both the first and second side or portions 1810, 1812. In other implementations, there may be more than three coupling mechanisms 1814, 1816, 1818 coupled to the louver. In any event, the one or more coupling mechanisms may be used for coupling the charged air attachment 1804 to the louver 1800. In some implementations, one or more nozzles may be intermeshed or interwoven into the louver 1800 alongside or adjacent the sensors.

In some implementations, the harvester may not include a louver. In these implementations, a rear surface or wall of the housing of the cleaning chamber may be used in the same way as a louver. Thus, the principles and teachings of the present disclosure may apply to a wall or surface of the housing in addition to a louver. An air source can therefore be coupled to a metal, plastic, rubber, or other material at or near the wall to provide an air stream in the cleaning chamber.

Still referring to FIGS. 18-24, each coupling mechanism 1814, 1816, 1818 may be coupled to the louver 1800 in one or more locations. In one example, the coupling mechanisms 1814, 1816, 1818 may be coupled to the louver 1800 in such a manner that there is little to no interference with a sensor 1802 located adjacent or in close proximity to the coupling mechanism. In other words, the one or more sensors 1802 located in close proximity or adjacent to a coupling mechanism may function similarly to one or more sensors 1802 that are not located in close proximity or adjacent to the coupling mechanism.

As described, the one or more coupling mechanisms 1814, 1816, 1818 couple the louver 1800 and the charged air attachment 1804 to one another. In some examples, the one or more coupling mechanisms may couple the louver 1300 and/or the charged air attachment 1804 to the harvester 10. In some examples, one or more coupling mechanisms 1814, 1816, 1818 may couple the charged air attachment 1804 to the louver 1800, and one or more coupling mechanisms 1814, 1816, 1818 may couple the louver 1800 to the harvester 10. In some examples, the same coupling mechanisms 1814, 1816, 1818 that couple the charged air attachment 1804 to the louver 1800 may couple the louver 1800 to the harvester 10. In other examples, several coupling mechanisms 1814, 1816, 1818 may couple the charged air attachment 1804 to the louver 1800 while different coupling mechanisms 1814, 1816, 1818 couple the louver 1800 to the harvester 10.

Figures 20, 21:
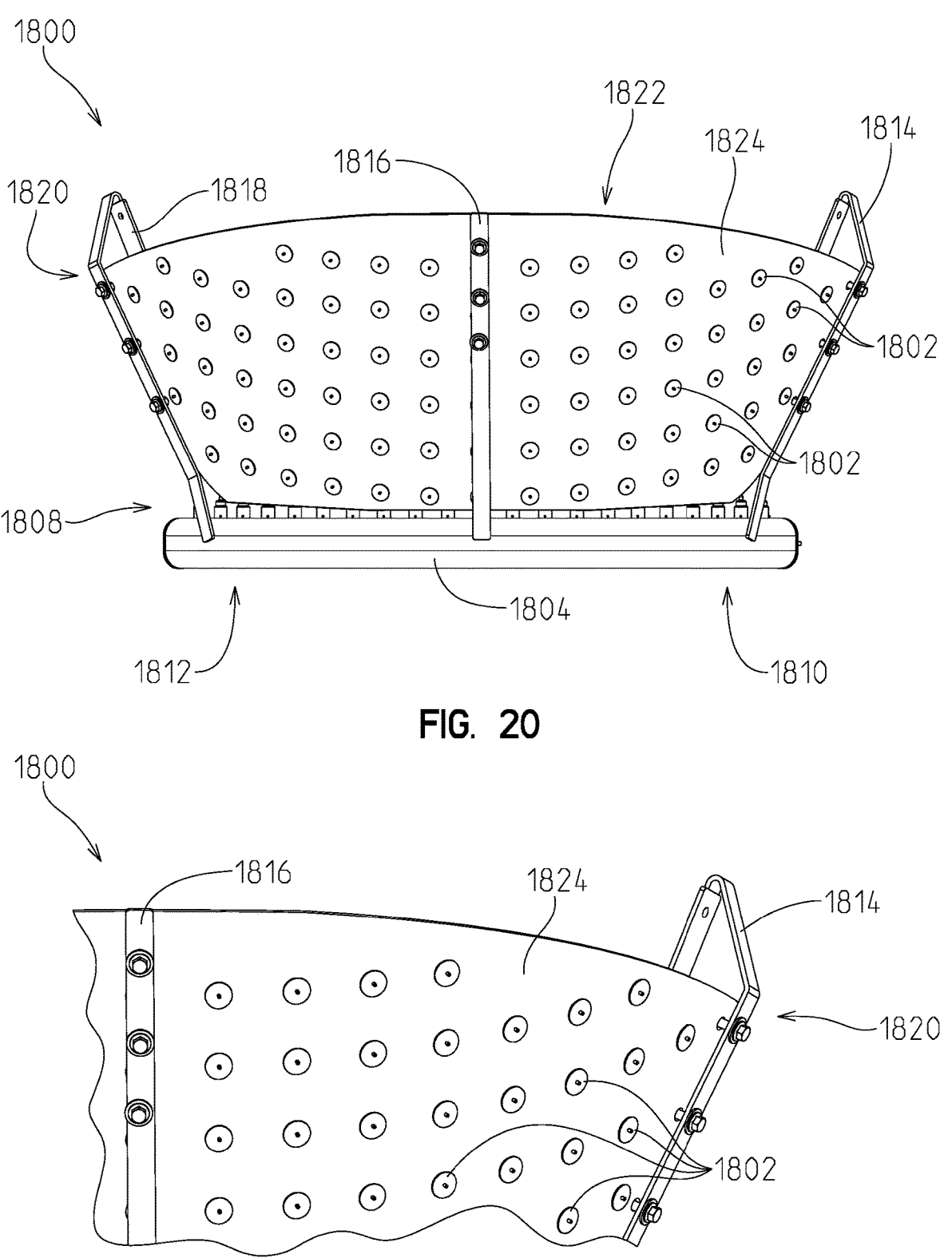
FIG. 20 is a rear view of a second implementation of the louver of FIG. 18 without a rear cover.
FIG. 21 is a rear view of the top end of the first side of the louver of FIG. 20.
Figure 22:
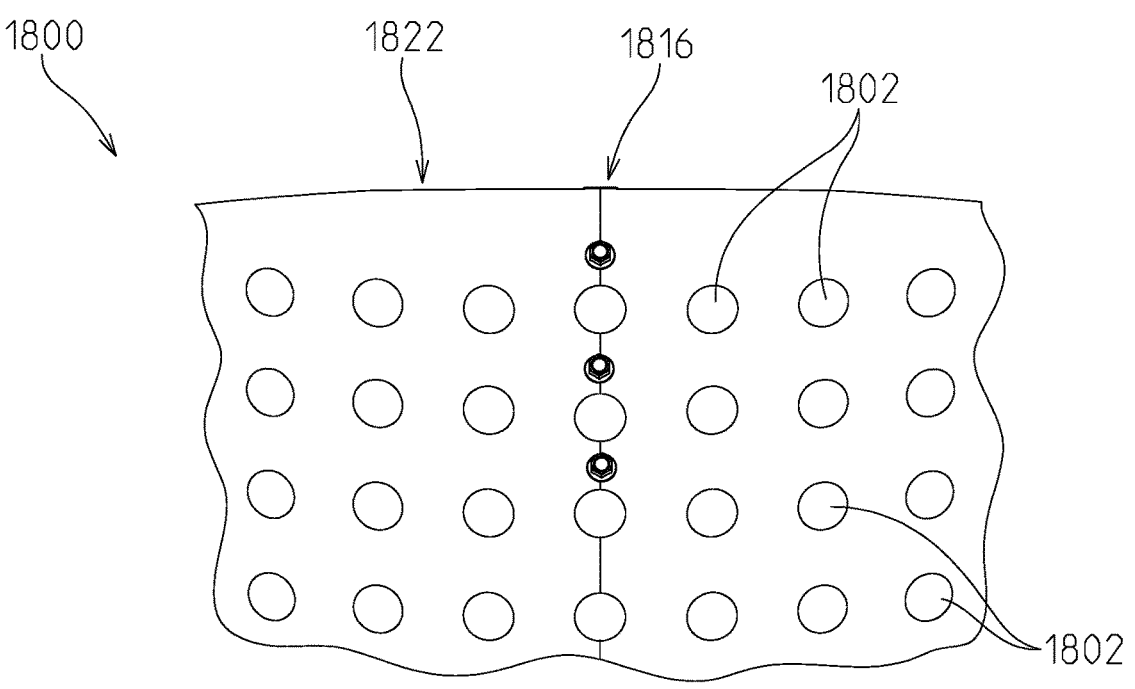
FIG. 22 is a zoomed-in front view of the louver of FIG. 18.
Figure 23:
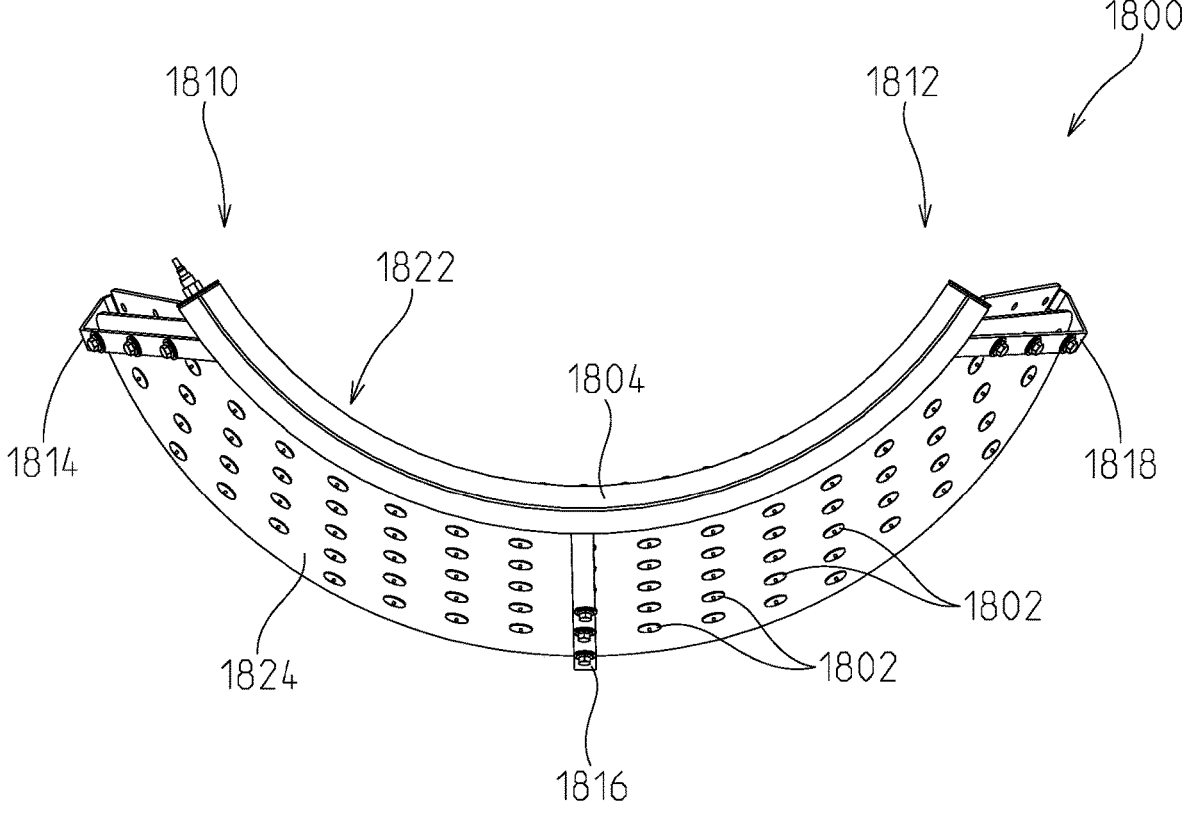
FIG. 23 is a bottom view of the louver of FIG. 20.

As illustrated in FIGS. 18-20, in some implementations, the louver 1800 may have a rear cover 1826. The rear cover 1826 may at least partially cover a rear side or portion 1824 of the louver 1800. In other implementations, as illustrated in FIGS. 20-24, the louver 1800 may not have a rear cover 1826.

Figures 24, 25:
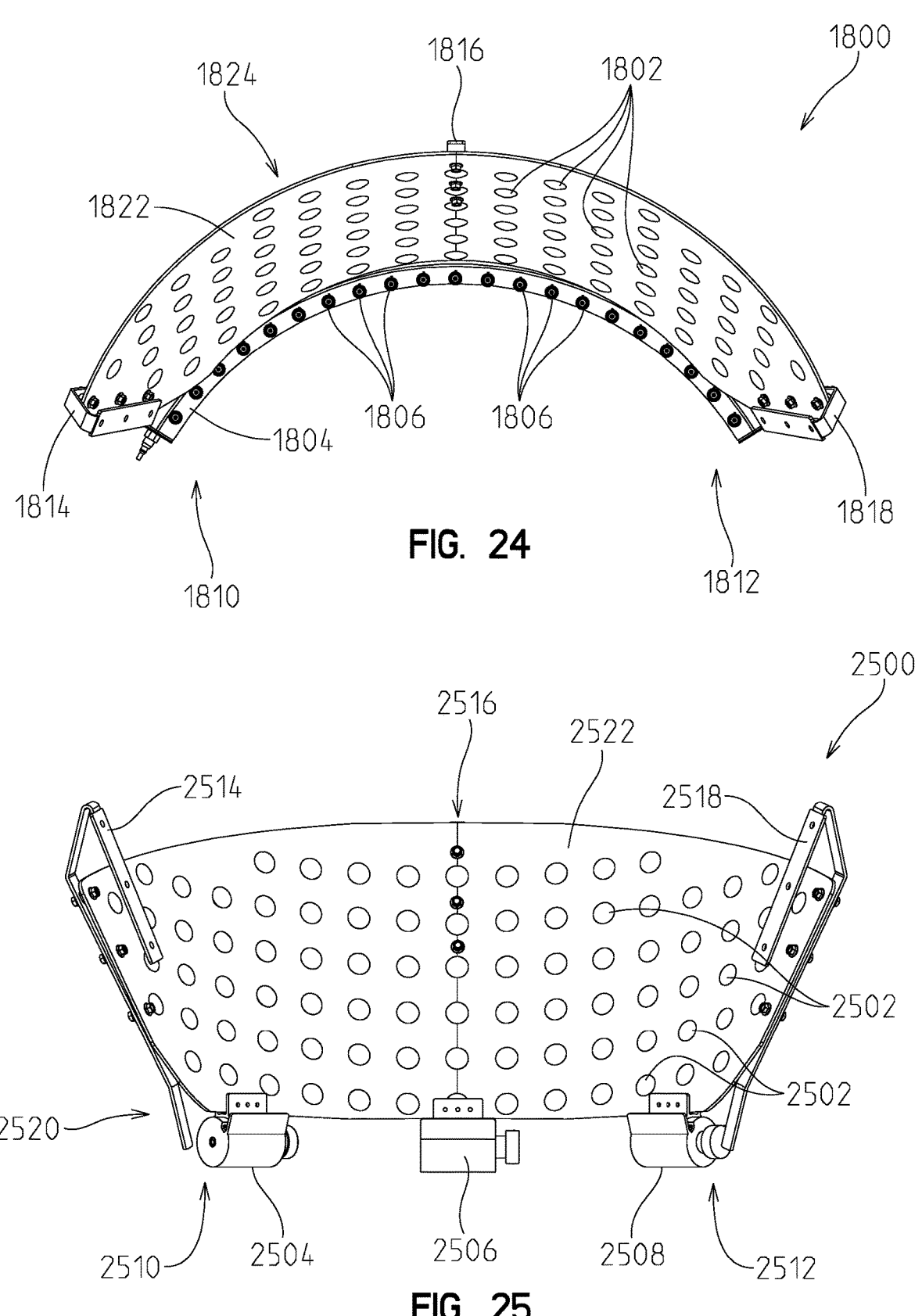
FIG. 24 is an overhead view of the louver of FIG. 20.
FIG. 25 is a front view of another implementation of a louver with sensors, one or more supplemental air attachments, and one or more coupling mechanisms.
Figures 26, 27:
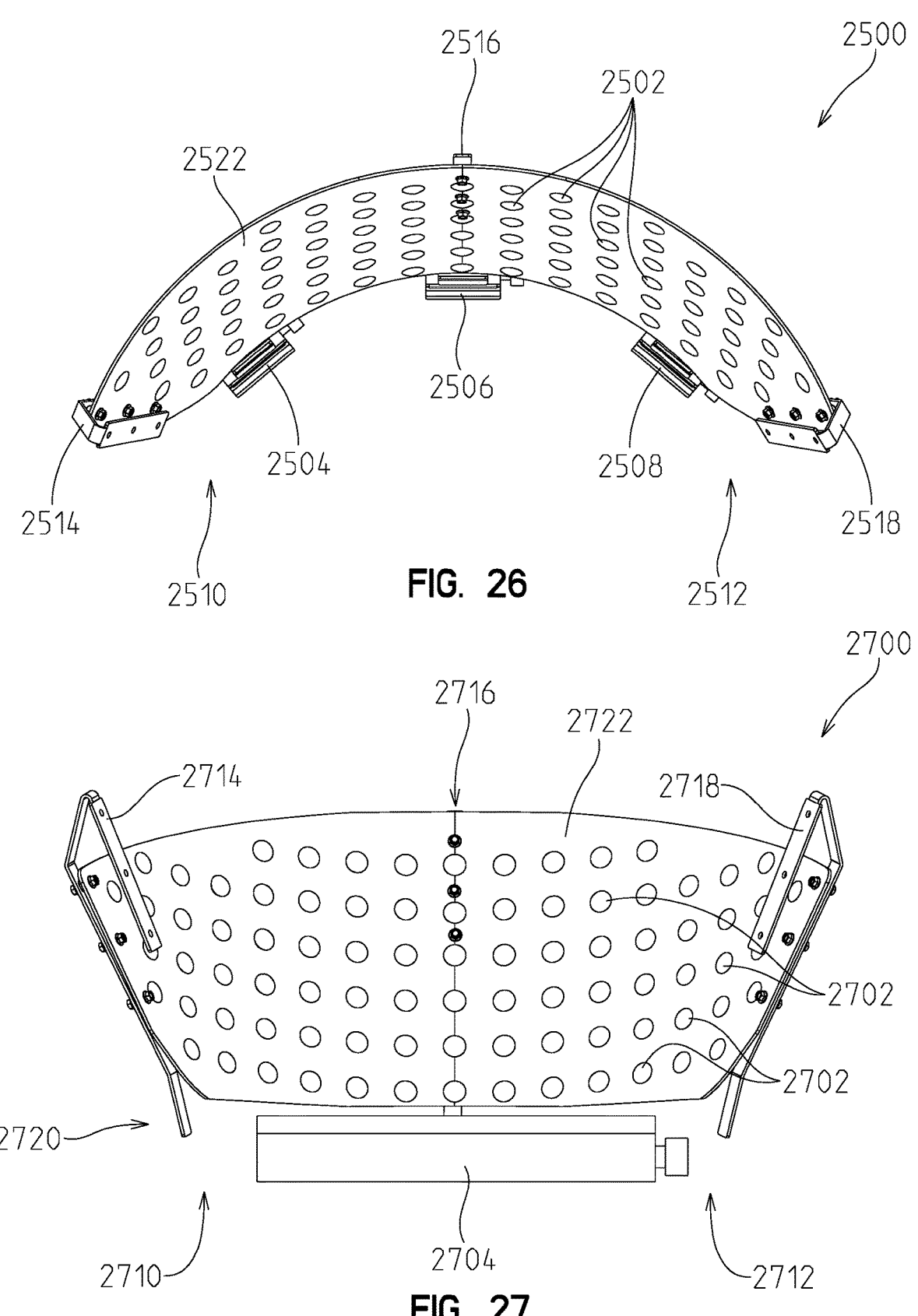
FIG. 26 is an overhead view of the louver of FIG. 25.
FIG. 27 is a front view of another implementation of a louver with sensor, a supplemental air attachment, and one or more coupling mechanisms.

Referring now to FIGS. 25-26, one implementation of a louver 2500 is shown to include one or more sensors 2502 coupled to a front side or portion 2522 of the louver 2500 and one or more charged air attachments 2504, 2506, 2508 coupled at or in proximity to a bottom end or portion 2520 of the louver 2500. In one implementation, each charged air attachment 2504, 2506, 2508 may be directly coupled to the louver 2500 at a first side or portion 2510, a second side or portion 2512, or at a location inbetween the first and second sides or portions 2510, 2512 of the louver 2500. In some implementations, the charged air attachments 2504, 2506, 2508 may be coupled to the louver 2500 via one or more coupling mechanisms 2514, 2516, 2518. The one or more coupling mechanisms 2514, 2516, 2518 may be coupled to one or more of a top portion, side portion, rear portion, or front portion of the charged air attachment 2504, 2506, 2508. The coupling mechanism may be one or more of a screw, bolt, bracket, washer, clip, nut, adhesive, weld, or the like.

In one implementation, the first charged air attachment 2504 may be coupled to the louver 2500 via the first coupling mechanism 2514, the second charged air attachment 2506 may be coupled to the louver 2500 via the second coupling mechanism 2516, and the third charged air attachment 1508 may be coupled to the louver 2500 via the third charged air attachment 2518. In another implementation, one coupling mechanism may couple more than one charged air attachment to the louver 2500. For example, the second coupling mechanism 2516 may couple each of the charged air attachments 2504, 2506, 2508 to the louver 2500. In another implementation, the second coupling mechanism 2516 may couple the first and second charged air attachments 2504, 2506 to the louver 2500, and another coupling mechanism 2514 or 2518 may couple the third charged air attachment 2506 to the louver 2500. In another alternative example, the first coupling mechanism 2614 may couple the first and second charged air attachments 2504, 2506 to the louver 2500 and another coupling mechanism 2516 or 2518 may couple the third charged air attachment 2508 to the louver 2500. In still another example, the third coupling mechanism 2618 may couple the second and third charged air attachments 2506, 2508 to the louver 2500 and another coupling mechanism 2514 or 2516 may couple the first charged air attachment 2504 to the louver 2500.

In some implementations, one or more of the coupling mechanism 2514, 2516, 2518 may couple the louver 2500 to the harvester 10. In some examples, the one or more coupling mechanisms 2514, 2516, 2518 may couple the louver 2500 to both the harvester 10 and to one or more charged air attachments 2504, 2506, 2512. In some implementations, one or more coupling mechanisms may couple the louver 2500 to the harvester 10, and one or more other coupling mechanisms may couple the louver 2500 to the one or more charged air attachment 2504, 2506, 2508.

In some implementations, each coupling mechanism 2514, 2516, 2518 may be coupled to the louver 2500 in a plurality of locations. In one non-limiting example, each coupling mechanism is coupled to the louver in three locations. In another non-limiting example, each coupling mechanism 2514, 2516, 2518 may be coupled to the louver 2500 in one or two locations. In still other non-limiting examples, each coupling mechanism 2514, 2516, 2518 may be coupled to the louver 2500 in more than three locations. In one example, the coupling mechanisms 2514, 2516, 2518 may be coupled to the louver 2500 in such a manner that there is little to no interference with a sensor 2502 located adjacent or in close proximity to the coupling mechanism. In other words, the one or more sensors 2502 located in close proximity or adjacent to a coupling mechanism may function similarly to one or more sensors 2502 that are not located in close proximity or adjacent to the coupling mechanism.

Figures 28, 29:
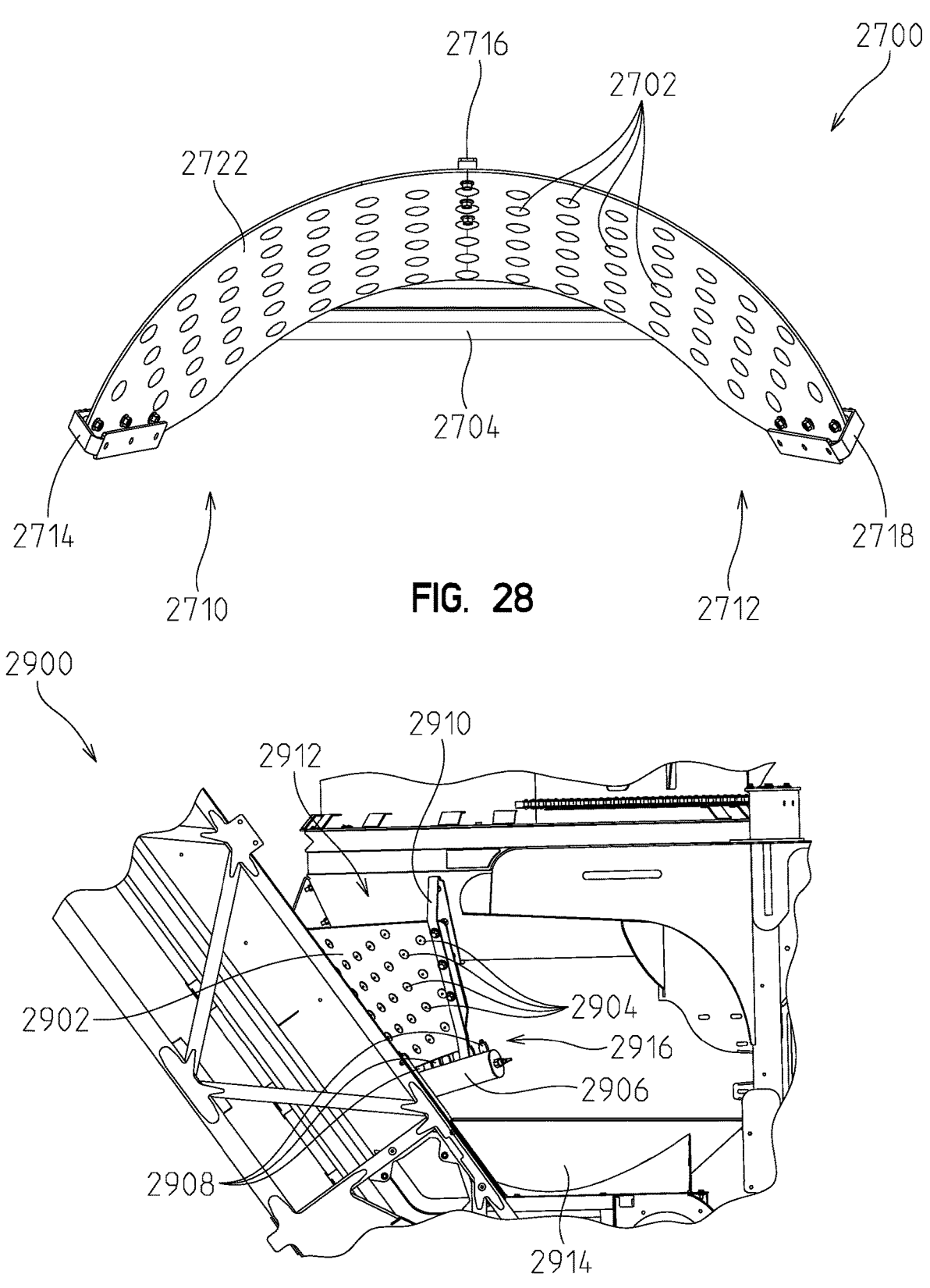
FIG. 28 is an overhead view of the louver of FIG. 27.
FIG. 29 is a side view of the cleaning arrangement illustrating the louver being coupled to the cleaning arrangement with one or more coupling mechanisms.

Referring now to FIGS. 27-28, a louver 2700 may have one or more sensors 2702 coupled to a front side or portion 2722 of the louver 2700 and a charged air attachment 2704 coupled near a bottom end or portion 2720 of the louver 2700. In one implementation, the charged air attachment 2704 may be directly coupled to the louver 2700 at a location at or near a first side or portion 2710 of the louver 2700, a second side or portion 2712 of the louver 2700, or a location therebetween. In some implementations, the charged air attachment 2704 may be coupled to the louver 2700 via one or more coupling mechanisms 2714, 2716, 2718. The one or more coupling mechanisms 2714, 2716, 2718 may be coupled to one or more of a top portion, side portion, rear portion, or front portion of the charged air attachment 2704. The coupling mechanism may be one or more of a screw, bolt, bracket, washer, nut, clip, adhesive, weld, or the like.

As illustrated in FIGS. 27-28, the charged air attachment 2704 may be coupled to the louver 2700 by one coupling mechanism 2716. In other examples, the charged air attachment 2704 may be coupled to the louver 2700 by more than one coupling mechanism 2714, 2716, 2718. In some implementations, the louver 2700 may be coupled to the harvester 10 via the first and third coupling mechanisms 2714, 2718. In other implementations, the louver 2700 may be coupled to the harvester 10 via one coupling mechanism 2714. In still other implementations, the louver 2700 may be coupled to the harvester 10 via more than two coupling mechanisms 2714, 2716, 2718. In some implementations, one or more coupling mechanisms 2714, 2716, 2718 may couple the louver 2700 to both the charged air attachment 2704 and to the harvester 10.

In some examples, each coupling mechanism 2714, 2716, 2718 may be coupled to the louver 2700 at one or more locations. In one example, the coupling mechanisms 2714, 2716, 2718 may be coupled to the louver 2700 in such a manner that there is little to no interference with a sensor 2702 located adjacent or in close proximity to the coupling mechanism. In other words, the one or more sensors 2702 located in close proximity or adjacent to a coupling mechanism may function similarly to one or more sensors 2702 that are not located in close proximity or adjacent to the coupling mechanism.

Figure 30:
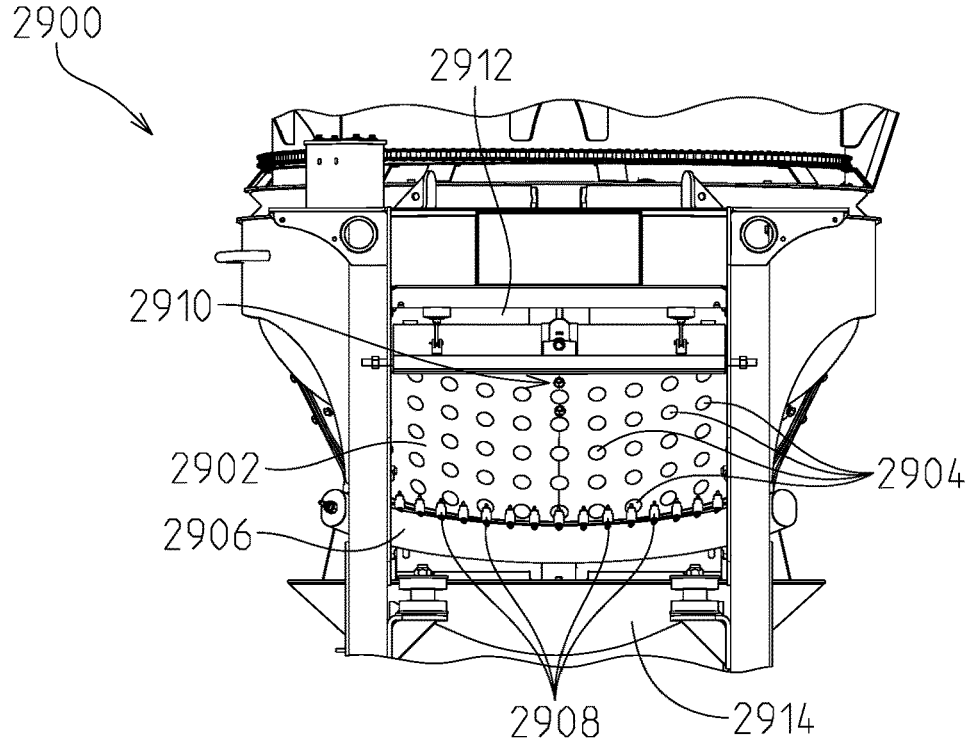
FIG. 30 is a front view of the cleaning arrangement of FIG. 29.
Figure 31:
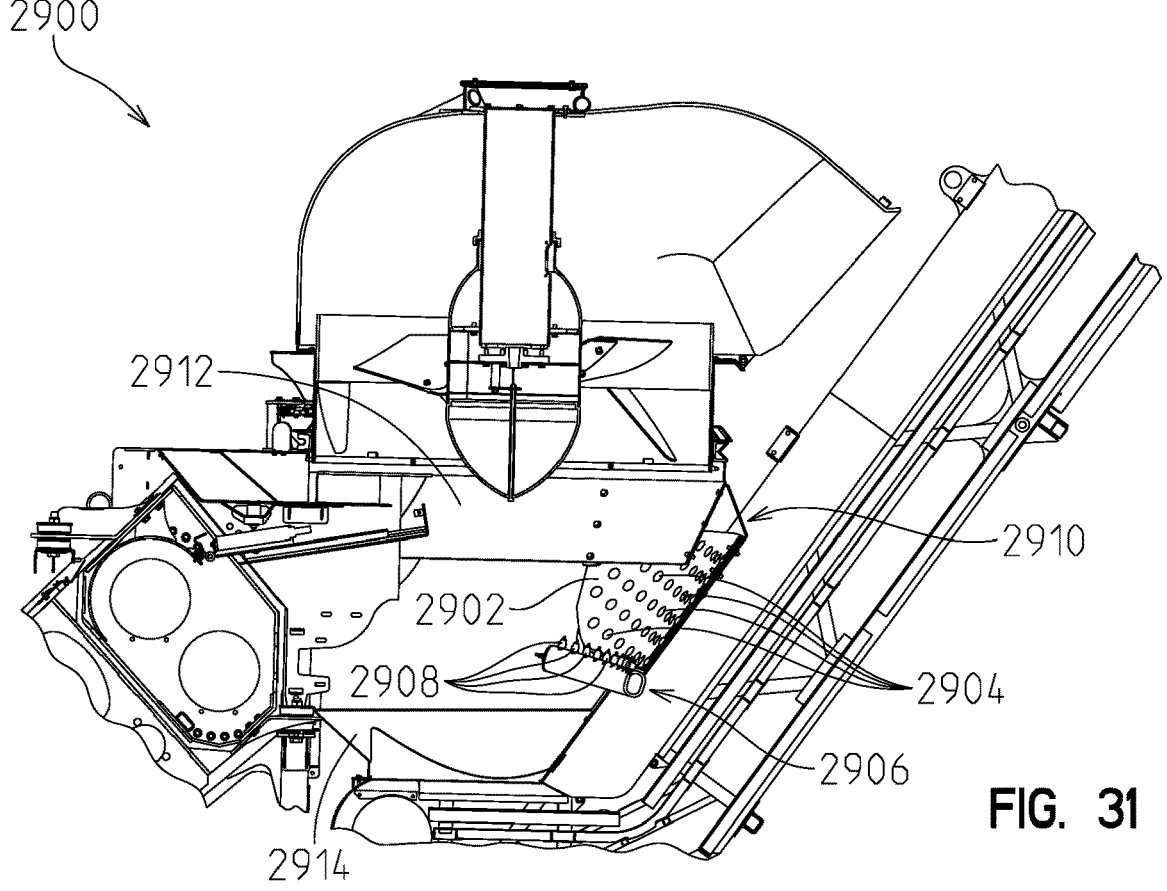
FIG. 31 is a second implementation of a side view of the cleaning arrangement of FIG. 29.

Referring now to FIGS. 29-31, a cleaning system 2900 is illustrated. The cleaning system 2900 may include a primary cleaner housing 2912, a louver 2902, a supplemental air attachment 2906 and a basket 2914. The louver 2902 may have one or more sensors 2904 coupled to a front portion thereof to sense contact by material (e.g., crop billet) with the louver 2900. The supplemental air attachment 2906 may be positioned at or near a bottom end or portion 2916 of the louver 2902. In some examples, the supplemental air attachment 2906 may have one or more nozzles 2908 that may promote cleaning extraneous plant matter from crop billet.

In one implementation, the crop billet and other material may enter the cleaning system 2900 as a chopped mat via the chopper, as described above. As the crop billet and other material enters the cleaning system, the crop billets and other material may impact the louver 2902. As this happens, one or more sensors 2904 coupled to the louver 2902 may sense the contact of the crop billet and other material with the louver 2900. As described above, each sensor 2902 may be electrically coupled to a controller (not shown) and outputs when the sensor 2902 senses impact on the louver 2900. After contact, the louver 2900 may direct the crop billet into the basket 2914. During operation, the supplemental air attachment 2906 may direct a flow of air or other fluid towards the crop billet before, during, and after the crop billet impacts the louver 2902. The flow of air from the air attachment 2906 may promote the extraction of extraneous plant matter from the crop billet.

The louver 2902 may be coupled to the harvester 10, and in particular the primary cleaning housing 2912, via one or more coupling mechanisms 2910. In one example, there may be one coupling mechanism 2910. In another example, there may be two or three coupling mechanisms 2910. In still another example, there may be more than three coupling mechanisms 2910. In some implementations, the coupling mechanism 2910 may couple the louver 2902 to both the supplemental air attachment 2906 and to the harvester 10. In other implementations, the coupling mechanism 2910 may couple the louver 2902 to only the harvester 10. In still other implementations, the coupling mechanism 2910 may couple the supplemental air attachment 2906 to the harvester 10.

Figure 32:
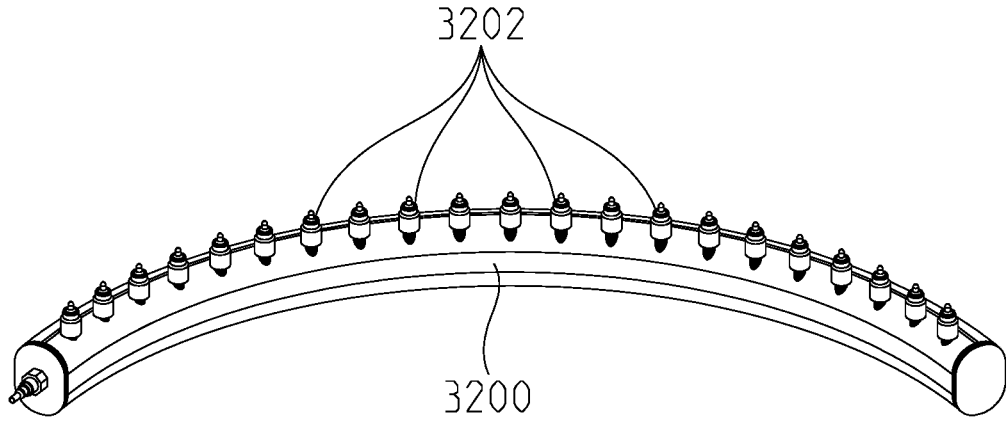
FIG. 32 is a perspective view of one example of the supplemental air attachment.
Figure 33:
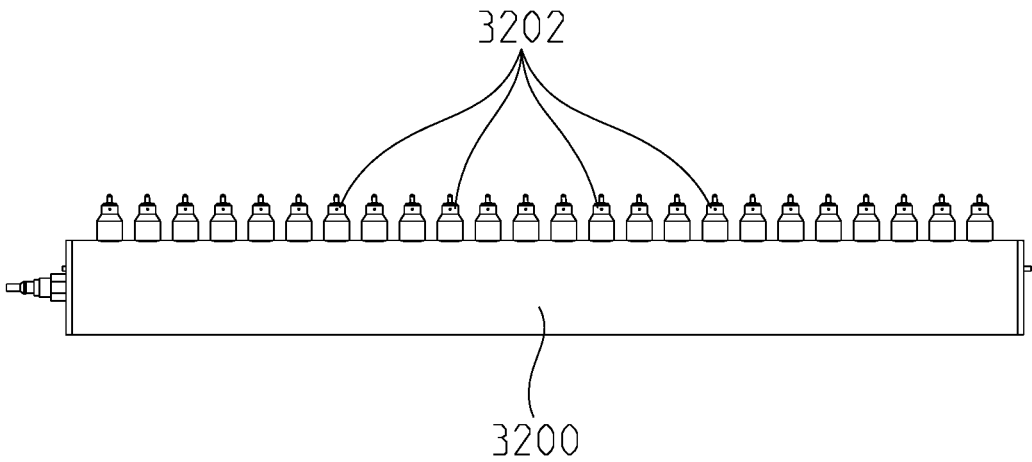
FIG. 33 is a side view of another implementation of the supplemental air attachment.

In FIGS. 32-33, an implementation of a supplemental air attachment 3200 is shown including a charged air attachment that discharges compressed or pressurized air. The supplemental air attachment 3200 may have one or more nozzles 3202 that may guide, direct, or otherwise regulate an airflow. As illustrated in FIG. 32, the supplemental air attachment 3200 may be curved. In other examples, as illustrated in FIG. 33, the supplemental air attachment 3200 may be straight. In still other example, the supplemental air attachment 3200 may have one or more other shapes.

In FIGS. 34-37, another implementation of a supplemental air attachment 3400 is shown. Here, the supplemental air attachment 3400 may be a blower or a fan. In this implementation, the supplemental air attachment 3400 may include a rotating member 3402 with one or more cogs 3404 extending from the rotating member 3402. The rotating member 3402 may rotate about a rotational axis 3406, thereby rotating the cogs 3404 about the axis 3406. The rotating cogs 3404 may create an airflow. In some implementations, the supplemental air attachment may have a cover 3408, and the cover may direct the airflow from the cogs 3404.

In a further implementation, as illustrated in FIGS. 34-35, there may be one supplemental air attachment. However, as illustrated in FIG. 37, there may be three supplemental air attachments 3702, 3704, 3706. In another implementation, there may be two supplemental air attachments 3702, 3704. In still other implementations, there may be more than three supplemental air attachments.

Figure 38A:
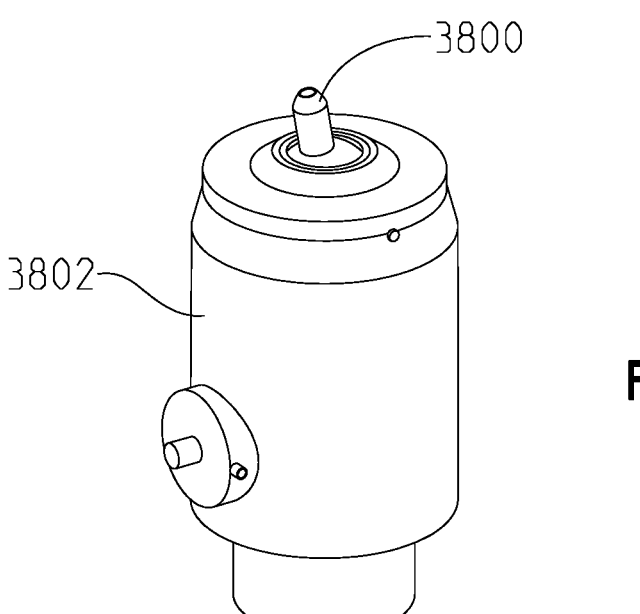
FIG. 38A is a side view of a nozzle within a housing.
Figure 38B:
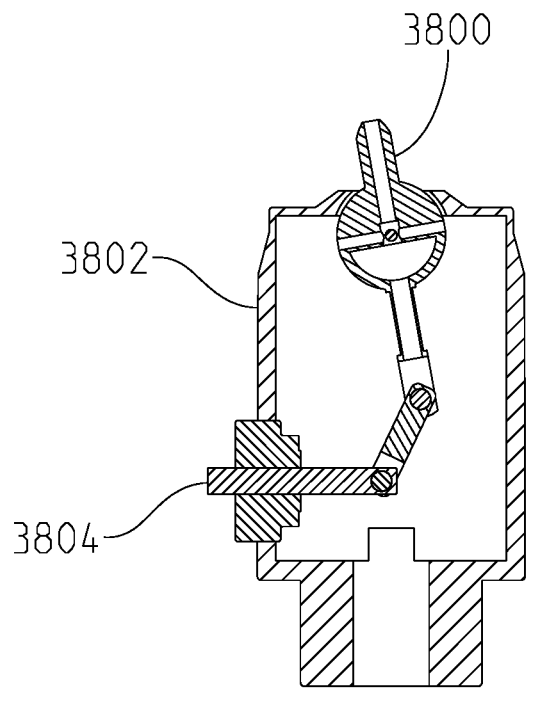
FIG. 38B is a cross-sectional side view of an nozzle within a housing.
Figure 39:
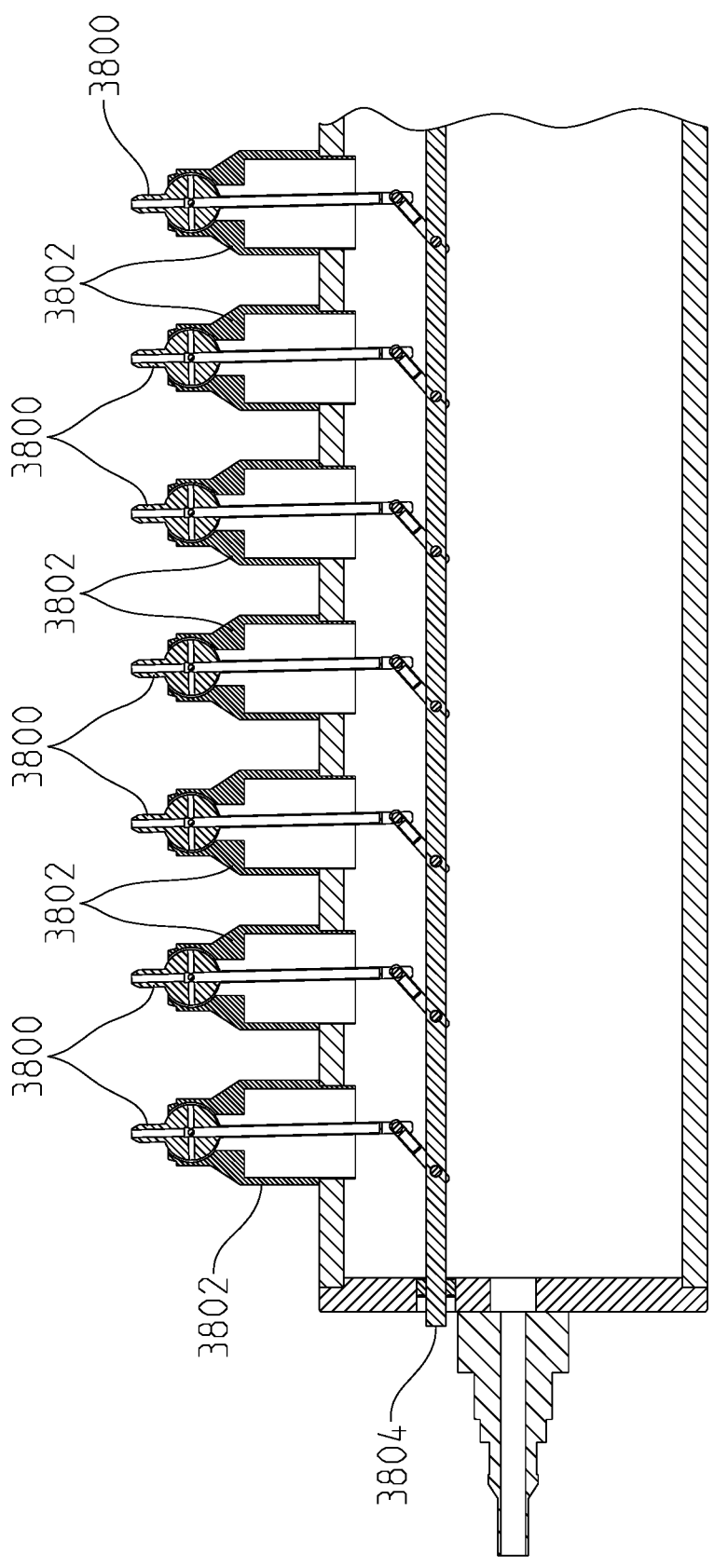
FIG. 39 is a cross-sectional side view of a supplemental air attachment with two or more nozzles connected by a linkage.

Referring to FIGS. 38A and 38B, an implementation of a nozzle 3800 of a supplemental air attachment is shown. The nozzle 3800 may be located at least partially within a housing 3802. The nozzle 3800 may move with respect to the housing 3802. For example, the nozzle 3800 may rotate with respect to the housing 3802. In another example, the nozzle 3800 may pivot within the housing 3802. The nozzle 3800 may include a linkage 3804. The linkage 3804 may be actuated to control the direction in which the nozzle 3800 is moved and oriented. In some implementations, each nozzle may individually have a linkage 3804. In another implementation, as illustrated in FIG. 39, one linkage may control the movement of more than one nozzle 3800. In this implementation, movement of one linkage 3804 may move more than one nozzle 3800. In some implementations, a controller (not shown) may actuate the linkage to induce movement of the one or more nozzles 3800. The controller may actuate an actuator such as a linear actuator, an electric actuator, a mechanical actuator, a hydro-mechanical actuator, a rotary actuator, an electro-mechanical actuator, or any other known type of actuator.

Figures 40, 41:
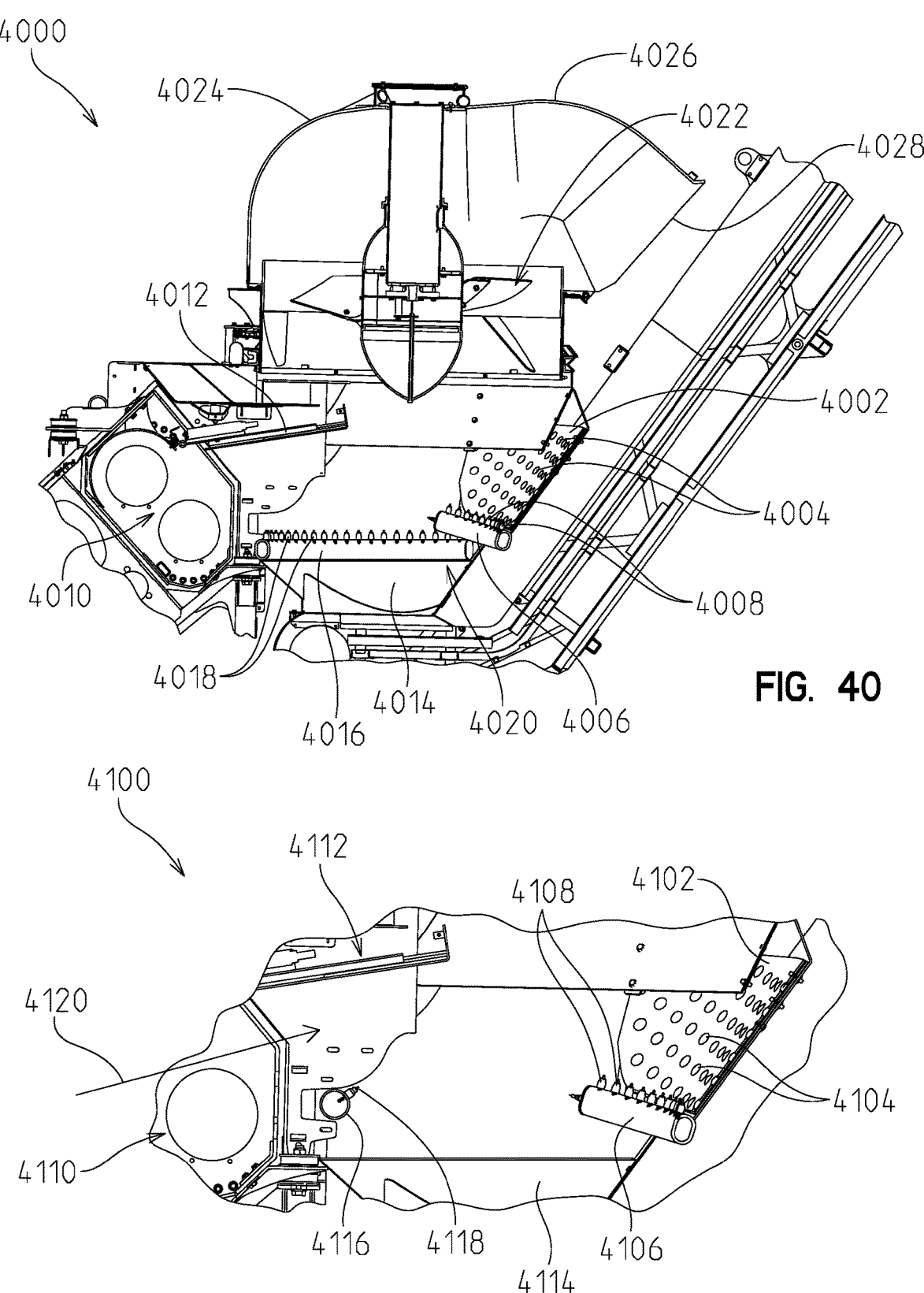
FIG. 40 is a partial side view of a cleaning system with a plurality of air attachment assemblies.
FIG. 41 is a partial side view of a cleaning system with a plurality of air attachment assemblies.

In FIG. 40, another implementation of a cleaning system 4000 for a harvester 10 is disclosed. In this implementation, the illustrated cleaning system 4000 includes a primary separator 4024 having a primary hood 4026 that forms a primary opening 4028, as described above. The cleaning system 4000 includes a fan 4022 as shown. Chopped material, such as billet and other material, may be dispensed via a chopper 4010 into the interior of a cleaning housing of the cleaning system 4000. As previously described in other implementations, the billet and other material may come into contact with a billet deflector 4012 which redirects the billet and other material towards a louver 4002.

The louver 4002 of FIG. 40 is shown including a plurality of sensors 4004 coupled to a front surface thereof. Each of the plurality of sensors 4004 may be located in a defined area or zone on the louver 4002 as previously described. The plurality of sensors 4004 may be in communication with a control system including a controller which receives outputs from each of the plurality of sensors 4004 which sense when billet or other material contacts the louver 4002. As the billet and other material contacts the louver 4002, the billet may be guided into a basket 4014 where it is collected. The remaining material may be cleaned or removed from the billet via one or more charged air attachment assemblies.

In FIG. 40, the illustrated implementation of the cleaning system 4000 shows a first charged air attachment assembly including a first air attachment 4006 having a first plurality of nozzles 4008 for discharging charged or compressed air therefrom. The first air attachment 4006 may be coupled to the louver 4002 in any manner described in this disclosure. In FIG. 40, the first air attachment 4006 is coupled and located at a position below most, if not all, of the plurality of sensors 4008. In one implementation, the first air attachment 4006 is coupled to a bottom portion of the louver 4002 via one or more coupling mechanisms (not shown). In another implementation, the first air attachment 4006 may be coupled to the cleaning housing or other structure other than the louver, but still is positioned towards a bottom portion or below the louver 4006.

As also shown in FIG. 40, a second charged air attachment assembly is shown including a second air attachment 4016. The second air attachment 4016 includes one or more nozzles 4018. In FIG. 40, each of the second plurality of nozzles 4018 is shown coupled to a manifold or the like that forms the second air attachment 4016. The second air attachment 4016 is located at an upper and outer periphery 4020 of the basket 4014. In this implementation, charged air may be discharged from each of the second plurality of nozzles 4018 to remove extraneous material from the billets after they are deflected by the billet deflector 4012 and/or louver 4002. The first plurality of nozzles 4008 may also discharge pressurized air as the billets and other material contact and deflect from the louver 4002.

Referring to FIG. 41, a further implementation is shown of a cleaning system 4100 on a harvester 10. The cleaning system 4100 includes a louver 4102 having a plurality of sensors 4104 located thereon. The plurality of sensors 4104 may be coupled to the louver 4102 in any known manner (e.g., mechanical fastener, adhesive, welding, integrally coupled, etc.). Although not shown in FIG. 41, the plurality of sensors 4104 may be in communication with a control system including a controller which receives outputs from each of the plurality of sensors 4104 which sense when billet or other material contacts the louver 4102. As the billet and other material contacts the louver 4102, the billet may be guided into a basket 4114 where it is collected. The remaining material may be cleaned or removed from the billet via one or more charged air attachment assemblies.

The cleaning system 4100 may be located downstream of a chopper 4110. Billet and other material may be chopped into smaller pieces via the chopper 4110 and discharged into the cleaning system 4100. The billet and other material may form a mat-like structure as it flows from the chopper 4110 along a flow path indicated by arrow 4120 in FIG. 41. The billet and other material may then engage a billet deflector 4112 which redirects the billet towards the louver 4102.

The billet and other material can be cleaned as it travels through the cleaning system 4100 via one or more charged air attachment assemblies. In FIG. 41, the cleaning system 4100 includes a first charged air attachment assembly and a second charged air attachment assembly. The first charged air attachment assembly includes a first air attachment 4106. The first air attachment 4106 may include a manifold which is supplied with pressurized or charged air to be dispensed or discharged via one or more nozzles 4108. Each of the one or more nozzles 4108 may be controlled via a controller of a control system. The one or more nozzles may be controlled together or independently. In some implementations, two or more of the nozzles may be controlled simultaneously. In other implementations, each nozzle is independently controlled. Although not shown, a hydraulic system having a hydraulic valve for each nozzle may be provided for fluidly supplying each nozzle with charged air. Alternatively, the hydraulic system may include a single valve for hydraulically supplying charged air to each of the nozzles. In other implementations, the hydraulic system may include a plurality of valves which each may be controlled for supplying two or more of the nozzles at the same time. In some implementations, each nozzle may be electronically controlled between an active and an inactive state. When active, each nozzle may discharge compressed or charged air. When inactive, each nozzle may be turned off and unable to discharge compressed or charged air.

The first air attachment 4106 may be located below the sensors 4104. In one implementation, the first air attachment 4106 is coupled to a bottom portion of the louver 4102 via a coupling mechanism. In another implementation, the first air attachment 4106 may be coupled to the harvester 10 or cleaning housing of the cleaning system 4100. The first air attachment 4106 and, more specifically, the first plurality of nozzles 4108 may be positioned at or below a bottom portion of the louver 4102. Each of the plurality of nozzles 4108 may be oriented to discharge air in a direction towards the louver and the plurality of sensors 4102. In one example, the plurality of nozzles 4108 may be oriented in a vertically upward direction towards a top end of the cleaning system 4100. In another example, the plurality of nozzles 4108 may be angularly disposed relative to the louver 4102. The plurality of nozzles 4108 may be pivotally controlled via a controller to change orientation as needed. In some implementations, the plurality of nozzles may be oriented to discharge charged or compressed air towards the billets and other material before and after contact with the louver 4102.

In FIG. 41, the illustrated implementation also includes a second charged air attachment assembly. The second charged air attachment assembly includes a second air attachment 4116 forming a manifold or header for supplying air or other fluid to a second plurality of nozzles 4118. The second air attachment 4116 is located adjacent to the chopper 4110 and coupled to the cleaning housing or other part of the cleaning system 4100. In some implementations, the second air attachment 4116 is coupled to the harvester 10. In other implementations, the second air attachment 4116 may be coupled to the basket 4114. The second air attachment 4116 is located generally below the billet deflector 4112 and downstream (e.g., rearward) from the chopper 4110. The second plurality of nozzles 4118 may be oriented towards the louver 4102. In some implementations, the second plurality of nozzles 4118 may be oriented towards the billet deflector 4112. In one implementation, a space or gap between the first air attachment 4106 and the second air attachment 4116 is an opening where billet is able to fall into the basket 4114. As shown in FIG. 41, the location of the second air attachment 4116 and the second plurality of nozzles 4118 is below the chopped mat of billet and other material flowing along direction 4120 after being discharged from the chopper 4110. In this location, the billet and other material being discharged into the cleaning system 4100 may receive charged air from the second plurality of nozzles 4118. The second plurality of nozzles 4118 may be pivotally controlled via a controller to change orientation as needed. In some implementations, the second plurality of nozzles 4118 may be oriented to discharge charged or compressed air towards the billets and other material before and after contact with the billet deflector 4112.

The second air attachment 4116 may include a manifold which is supplied with pressurized or charged air to be dispensed or discharged via one or more nozzles 4118. Each of the one or more nozzles 4118 may be controlled via a controller of a control system. The one or more nozzles 4118 may be controlled together or independently. In some implementations, two or more of the nozzles 4118 may be controlled simultaneously. In other implementations, each nozzle 4118 is independently controlled. Although not shown, a hydraulic system having a hydraulic valve for each nozzle 4118 may be provided for fluidly supplying each nozzle 4118 with charged air. Alternatively, the hydraulic system may include a single valve for hydraulically supplying charged air to each of the nozzles 4118. In other implementations, the hydraulic system may include a plurality of valves which each may be controlled for supplying two or more of the nozzles 4118 at the same time. In some implementations, each nozzle 4118 may be electronically controlled between an active and an inactive state. When active, each nozzle may discharge compressed or charged air. When inactive, each nozzle 4118 may be turned off and unable to discharge compressed or charged air. In several implementations, each of the nozzles 4108, 4118 may be controlled via a solenoid control valve. In other implementations, one or more solenoid valves may control the operation of the nozzles 4108, 4118.

While air is generally described herein as the fluid discharged by the air attachment in this disclosure, it is to be understood in some implementations other types of fluid (gas or liquid or combination thereof) may be used.

While exemplary implementations incorporating the principles of the present disclosure have been described herein, the present disclosure is not limited to such implementations. Instead, this application is intended to cover any variations, uses, or adaptations of the disclosure using its general principles. Further, this application is intended to cover such departures from the present disclosure as come within known or customary practice in the art to which this disclosure pertains.

What is claimed is:

1. A sugarcane harvester, comprising:
a chopper to chop stalks of sugarcane into billets and discharge the billets into a cleaning chamber,
an extractor to induce a flow of air in the cleaning chamber to extract crop residue from billets discharged from the chopper,
a member comprising an impact surface positioned on an opposite side of the cleaning chamber from the chopper to deflect billets,
one or more impact sensors mounted to the impact surface to detect billet contact on the impact surface and configured to generate one or more billet contact signals, and
a controller in communication with the one or more impact sensors, the controller configured to
receive the one or more billet contact signals,
assess loading of the impact surface relative to predetermined criteria, and
execute a corresponding response strategy;
wherein the one or more billet contact signals corresponds to a location of impact on the impact surface and a magnitude of loading on the impact surface.

2. The sugarcane harvester of claim 1, further comprising one or more impact sensors mounted to the impact surface, the impact surface defining a plurality of zones.

3. The sugarcane harvester of claim 2, wherein the member comprises a louver or a wall of the cleaning chamber.

4. The sugarcane harvester of claim 2, wherein the one or more sensors comprises a plurality of sensors, where at least two of the plurality of sensors are different types of sensors from one another.

5. The sugarcane harvester of claim 2, wherein the one or more billet contact signals identifies a first zone of the plurality of zones on the impact surface.

6. The sugarcane harvester of claim 2, wherein the one or more billet contact signals corresponds to a mass flow or quantity of billets contacting the impact surface in each of the plurality of zones on the impact surface.

7. The sugarcane harvester of claim 2, wherein the controller is configured to assess the number or rate of impacts in each of the plurality of zones over a given period of time.

8. The sugarcane harvester of claim 7, wherein the controller is configured to compare the number or rate of impacts in each of the plurality of zones over a given period of time to a threshold.

9. The sugarcane harvester of claim 8, wherein the controller is configured to determine if the number or rate of impacts exceeds the threshold in an optimal zone or a non-optimal zone, where the optimal zone is one of the plurality of zones and the non-optimal zone is another of the plurality of zones.

10. The sugarcane harvester of claim 9, wherein the controller is configured to make no adjustment to the harvester as the response strategy when the number or rate of impacts exceeds the threshold in the optimal zone.

11. The sugarcane harvester of claim 9, wherein the controller is configured to make an adjustment to the harvester as the response strategy when the number or rate of impacts exceeds the threshold in the non-optimal zone.

12. The sugarcane harvester of claim 11, wherein the adjustment to the harvester comprises one or more of adjusting an angle or length of a deflector, fan speed, chopper speed, harvester speed, a manifold pressure, blower or fan speed at a rear of the cleaning chamber, nozzle orientation, or nozzle operation.

13. A sugarcane harvester, comprising:

a chopper configured to chop stalks of sugarcane into crop billets for discharge into a cleaning chamber;

a housing forming the cleaning chamber, the housing comprising an inlet;

a fan configured to produce a primary flow of air to flow through the inlet and into the housing to separate crop residue from the crop billets discharged from the chopper;

a louver positioned on an opposite side of the cleaning chamber from the chopper to direct the crop billets into a basket for collection;

a billet deflector disposed in the housing and configured to deflect crop billets from the chopper towards the louver;

a plurality of sensors coupled to an impact surface of the louver and configured to detect impact between the impact surface and the crop billets, the sensor configured to generate a billet impact signal; and a controller in communication with the plurality of sensors, the controller configured to:

receive the billet impact signal from the one or more sensors, assess loading of the louver relative to predetermined criteria, and execute a corresponding response strategy.

14. The sugarcane harvester of claim 13, wherein the impact surface defines a plurality of zones including at least one optimal zone and at least one non-optimal zone.

15. The sugarcane harvester of claim 14, wherein:

the controller is configured to compare the number or rate of impacts of crop billets in each of the plurality of zones over a given period of time to a threshold;

the controller is configured to make an adjustment to the harvester as the response strategy when the number or rate of impacts exceeds the threshold in the non-optimal zone.

16. The sugarcane harvester of claim 15, wherein the adjustment to the harvester comprises one or more of adjusting an angle or length of the billet deflector, fan speed, chopper speed, harvester speed, a manifold pressure, nozzle orientation, or nozzle operation.

17. A method of controlling impact of crop billets on a louver located in a housing of a cleaning chamber of a sugarcane harvester, comprising:

providing a chopper, a billet deflector, a fan, a plurality of sensors coupled to an impact surface of the louver, and a controller;

chopping stalks of sugarcane by the chopper into crop billets and discharging the crop billets into the cleaning chamber of the sugarcane harvester;

deflecting the crop billets by the billet deflector in the cleaning chamber towards the louver;

blowing air into the cleaning chamber via the fan to separate crop residue from the crop billets;

sensing, via a plurality of sensors, impact by the crop billets on the impact surface of the louver;

communicating, via at least one of the plurality of sensors, a billet impact signal to the controller;

determining a number or rate of impacts of crop billets on a plurality of zones on the impact surface;

comparing the number or rate of impacts of crop billets on each of the plurality of zones to a threshold; and triggering a response by the controller to control the impact of the crop billets on the impact surface of the louver.

18. The method of claim 17, further comprising:

detecting, by the controller, the number or rate of impacts of crop billets in an optimal zone of the plurality of zones on the impact surface of the louver exceeds the threshold; and determining, by the controller, not to make any adjustment to the sugarcane harvester as the response.

19. The method of claim 17, further comprising:

detecting, by the controller, the number or rate of impacts of crop billets in a non-optimal zone of the plurality of zones on the impact surface of the louver exceeds the threshold;

determining, by the controller, to make any adjustment to the sugarcane harvester as the response; and adjusting one or more of adjusting an angle or length of the billet deflector, fan speed, chopper speed, harvester speed, a manifold pressure, blower or fan speed at a rear of the cleaning chamber, a nozzle orientation of an air attachment, or an operation status of a nozzle of an air attachment.

* * * * *